US008719171B2

(12) United States Patent
Bourne et al.

(10) Patent No.: US 8,719,171 B2
(45) Date of Patent: May 6, 2014

(54) ISSUING A PUBLISHER USE LICENSE OFF-LINE IN A DIGITAL RIGHTS MANAGEMENT (DRM) SYSTEM

(75) Inventors: Steve Bourne, Seattle, WA (US); Blair Brewster Dillaway, Clyde Hill, WA (US); Pierre Jacomet, Sammamish, WA (US); Rushmi U. Malaviarachchi, Bellevue, WA (US); Kumar B. Parambir, Bellevue, WA (US); Yevgeniy Eugene Rozenfeld, Bellevue, WA (US); Chandramouli Venkatesh, Sammamish, WA (US); Charles F. Rose, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 246 days.

(21) Appl. No.: 12/832,831

(22) Filed: Jul. 8, 2010

(65) Prior Publication Data

US 2010/0281253 A1    Nov. 4, 2010

Related U.S. Application Data

(63) Continuation of application No. 12/053,090, filed on Mar. 21, 2008, which is a continuation of application No. 10/373,621, filed on Feb. 25, 2003, now Pat. No. 7,370,212.

(51) Int. Cl.
*G06F 21/00* (2013.01)
*G06Q 20/00* (2012.01)

(52) U.S. Cl.
USPC ............................................. 705/59

(58) Field of Classification Search
USPC ............ 705/59, 16, 21, 71; 380/44, 262, 278, 380/279
See application file for complete search history.

(56) References Cited

U.S. PATENT DOCUMENTS

| | | |
|---|---|---|
| 3,718,906 A | 2/1973 | Lightner |
| 4,183,085 A | 1/1980 | Roberts |
| 4,202,051 A | 5/1980 | Davida et al. |
| 4,323,921 A | 4/1982 | Guillou |
| 4,405,829 A | 9/1983 | Rivest |
| 4,528,643 A | 7/1985 | Freeny, Jr. |
| 4,529,870 A | 7/1985 | Chaum |

(Continued)

FOREIGN PATENT DOCUMENTS

| | | |
|---|---|---|
| AU | 9741703 | 3/1998 |
| CA | 2373542 | 11/2002 |

(Continued)

OTHER PUBLICATIONS

United States Advisory Action mailed Jan. 19, 2007, in U.S. Appl. No. 09/482,843 (4 pages).

(Continued)

*Primary Examiner* — Dante Ravetti
(74) *Attorney, Agent, or Firm* — Ben Tabor; Kate Drakos; Micky Minhas

(57) ABSTRACT

A publishing user publishes digital content and issues to itself a corresponding digital publisher license to allow itself to render the published digital content. The publishing user is supplied with a publishing certificate from a digital rights management (DRM) server, where the publishing certificate allows the publishing user to so publish the digital content and to so issue the publisher license.

7 Claims, 17 Drawing Sheets

(56) References Cited

U.S. PATENT DOCUMENTS

| | | |
|---|---|---|
| 4,558,176 A | 12/1985 | Arnold |
| 4,620,150 A | 10/1986 | Germer |
| 4,658,093 A | 4/1987 | Hellman |
| 4,683,553 A | 7/1987 | Mollier |
| 4,747,139 A | 5/1988 | Taaffe |
| 4,750,034 A | 6/1988 | Lem |
| 4,799,259 A | 1/1989 | Ogrodski |
| 4,817,094 A | 3/1989 | Lebizay |
| 4,827,508 A | 5/1989 | Shear |
| 4,855,730 A | 8/1989 | Venners |
| 4,855,922 A | 8/1989 | Huddleston |
| 4,857,999 A | 8/1989 | Welsh |
| 4,910,692 A | 3/1990 | Outram |
| 4,916,738 A | 4/1990 | Chandra et al. |
| 4,926,479 A | 5/1990 | Goldwasser et al. |
| 4,953,209 A | 8/1990 | Ryder, Sr. et al. |
| 4,959,774 A | 9/1990 | Davis |
| 4,967,273 A | 10/1990 | Greenberg |
| 4,977,594 A | 12/1990 | Shear |
| 5,001,752 A | 3/1991 | Fischer |
| 5,008,935 A | 4/1991 | Roberts |
| 5,012,514 A | 4/1991 | Renton |
| 5,029,206 A | 7/1991 | Marino et al. |
| 5,047,928 A | 9/1991 | Wiedemer |
| 5,048,086 A | 9/1991 | Bianco et al. |
| 5,050,213 A | 9/1991 | Shear |
| 5,103,392 A | 4/1992 | Mori |
| 5,103,476 A | 4/1992 | Waite et al. |
| 5,109,413 A | 4/1992 | Comerford et al. |
| 5,117,457 A | 5/1992 | Comerford et al. |
| 5,124,117 A | 6/1992 | Tatebayashi et al. |
| 5,142,578 A | 8/1992 | Matyas et al. |
| 5,159,633 A | 10/1992 | Nakamura |
| 5,163,092 A | 11/1992 | McNesby et al. |
| 5,177,790 A | 1/1993 | Hazard |
| 5,193,573 A | 3/1993 | Chronister |
| 5,204,897 A | 4/1993 | Wyman |
| 5,222,134 A | 6/1993 | Waite et al. |
| 5,241,602 A | 8/1993 | Lee et al. |
| 5,249,184 A | 9/1993 | Woest |
| 5,257,282 A | 10/1993 | Adkisson et al. |
| 5,260,999 A | 11/1993 | Wyman |
| 5,261,002 A | 11/1993 | Perlman et al. |
| 5,267,316 A | 11/1993 | Merino Gonzalez et al. |
| 5,269,019 A | 12/1993 | Peterson |
| 5,274,368 A | 12/1993 | Breeden |
| 5,287,537 A | 2/1994 | Newmark et al. |
| 5,301,268 A | 4/1994 | Takeda |
| 5,303,370 A | 4/1994 | Brosh |
| 5,319,705 A | 6/1994 | Halter et al. |
| 5,327,365 A | 7/1994 | Fujisaki et al. |
| 5,335,346 A | 8/1994 | Fabbio |
| 5,355,161 A | 10/1994 | Bird |
| 5,369,262 A | 11/1994 | Dvorkis |
| 5,406,630 A | 4/1995 | Piosenka |
| 5,410,598 A | 4/1995 | Shear |
| 5,414,861 A | 5/1995 | Horning |
| 5,437,040 A | 7/1995 | Campbell |
| 5,438,508 A | 8/1995 | Wyman |
| 5,440,640 A | 8/1995 | Anshel et al. |
| 5,442,704 A | 8/1995 | Holtey |
| 5,444,780 A | 8/1995 | Hartman, Jr. |
| 5,444,782 A | 8/1995 | Adams et al. |
| 5,448,045 A | 9/1995 | Clark |
| 5,457,699 A | 10/1995 | Bode |
| 5,459,867 A | 10/1995 | Adams |
| 5,469,506 A | 11/1995 | Berson et al. |
| 5,473,692 A | 12/1995 | Davis |
| 5,479,514 A | 12/1995 | Klonowski |
| 5,485,577 A | 1/1996 | Eyer et al. |
| 5,490,216 A | 2/1996 | Richardson, III |
| 5,500,897 A | 3/1996 | Hartman, Jr. |
| 5,502,766 A | 3/1996 | Boebert et al. |
| 5,509,070 A | 4/1996 | Schull |
| 5,513,319 A | 4/1996 | Finch |
| 5,522,040 A | 5/1996 | Hofsäss |
| 5,530,846 A | 6/1996 | Strong |
| 5,535,276 A | 7/1996 | Ganesan |
| 5,552,776 A | 9/1996 | Wade |
| 5,553,139 A | 9/1996 | Ross et al. |
| 5,553,143 A | 9/1996 | Ross et al. |
| 5,557,765 A | 9/1996 | Lipner et al. |
| 5,563,799 A | 10/1996 | Brehmer |
| 5,568,552 A | 10/1996 | Davis |
| 5,570,465 A | 10/1996 | Tsakanikas |
| 5,586,291 A | 12/1996 | Lasker |
| 5,588,060 A | 12/1996 | Aziz |
| 5,604,755 A | 2/1997 | Bertin et al. |
| 5,629,980 A | 5/1997 | Stefik et al. |
| 5,634,012 A | 5/1997 | Stefik et al. |
| 5,636,292 A | 6/1997 | Rhoads |
| 5,638,443 A | 6/1997 | Stefik et al. |
| 5,638,513 A | 6/1997 | Ananda |
| 5,666,416 A | 9/1997 | Micali |
| 5,668,877 A | 9/1997 | Aziz |
| 5,671,412 A | 9/1997 | Christiano |
| 5,673,316 A | 9/1997 | Auerbach et al. |
| 5,708,709 A | 1/1998 | Rose |
| 5,710,706 A | 1/1998 | Märkl |
| 5,710,887 A | 1/1998 | Chelliah et al. |
| 5,715,403 A | 2/1998 | Stefik |
| 5,717,757 A | 2/1998 | Micali |
| 5,721,788 A | 2/1998 | Powell |
| 5,724,425 A | 3/1998 | Chang et al. |
| 5,726,898 A | 3/1998 | Jacobs |
| 5,740,246 A | 4/1998 | Saito |
| 5,745,573 A | 4/1998 | Lipner et al. |
| 5,745,879 A | 4/1998 | Wyman |
| 5,754,657 A | 5/1998 | Schipper et al. |
| 5,754,763 A | 5/1998 | Bereiter |
| 5,757,908 A | 5/1998 | Cooper et al. |
| 5,758,068 A | 5/1998 | Brandt et al. |
| 5,758,069 A | 5/1998 | Olsen |
| 5,761,669 A | 6/1998 | Montague et al. |
| 5,763,832 A | 6/1998 | Anselm |
| 5,764,275 A | 6/1998 | Lappington |
| 5,765,152 A | 6/1998 | Erickson |
| 5,768,382 A | 6/1998 | Schneier |
| 5,771,354 A | 6/1998 | Crawford |
| 5,774,870 A | 6/1998 | Storey |
| 5,787,179 A | 7/1998 | Ogawa et al. |
| 5,790,664 A | 8/1998 | Coley et al. |
| 5,793,839 A | 8/1998 | Farris |
| 5,793,868 A | 8/1998 | Micali |
| 5,796,967 A | 8/1998 | Filepp et al. |
| 5,799,088 A | 8/1998 | Raike |
| 5,799,090 A | 8/1998 | Angert |
| 5,802,592 A | 9/1998 | Chess |
| 5,809,144 A | 9/1998 | Sirbu et al. |
| 5,809,145 A | 9/1998 | Byrne et al. |
| 5,812,857 A | 9/1998 | Nelson et al. |
| 5,825,876 A | 10/1998 | Peterson, Jr. |
| 5,825,877 A | 10/1998 | Dan |
| 5,825,879 A | 10/1998 | Davis |
| 5,825,883 A | 10/1998 | Archibald |
| 5,841,865 A | 11/1998 | Sudia |
| 5,844,986 A | 12/1998 | Davis |
| 5,845,065 A | 12/1998 | Conte |
| 5,845,281 A | 12/1998 | Benson et al. |
| 5,852,665 A | 12/1998 | Gressel et al. |
| 5,864,620 A | 1/1999 | Pettitt et al. |
| 5,872,846 A | 2/1999 | Ichikawa |
| 5,875,236 A | 2/1999 | Jankowitz |
| 5,883,670 A | 3/1999 | Sporer |
| 5,883,955 A | 3/1999 | Ronning |
| 5,883,958 A | 3/1999 | Ishiguro et al. |
| 5,892,900 A | 4/1999 | Ginter et al. |
| 5,892,906 A | 4/1999 | Chou |
| 5,893,086 A | 4/1999 | Schmuck |
| 5,905,799 A | 5/1999 | Ganesan |
| 5,910,987 A | 6/1999 | Ginter et al. |
| 5,915,025 A | 6/1999 | Saito et al. |
| 5,917,912 A | 6/1999 | Ginter et al. |
| 5,925,127 A | 7/1999 | Ahmad |

(56) References Cited

U.S. PATENT DOCUMENTS

| | | |
|---|---|---|
| 5,926,624 A | 7/1999 | Katz et al. |
| 5,933,498 A | 8/1999 | Schneck et al. |
| 5,934,422 A | 8/1999 | Steed |
| 5,935,248 A | 8/1999 | Kuroda |
| 5,943,248 A | 8/1999 | Clapp |
| 5,943,422 A | 8/1999 | Van Wie et al. |
| 5,948,061 A | 9/1999 | Merriman |
| 5,949,877 A | 9/1999 | Traw |
| 5,949,879 A | 9/1999 | Benson et al. |
| 5,951,642 A | 9/1999 | Onoe et al. |
| 5,953,420 A | 9/1999 | Matyas, Jr. et al. |
| 5,953,502 A | 9/1999 | Helbig, Sr. |
| 5,956,408 A | 9/1999 | Arnold |
| 5,958,050 A | 9/1999 | Barnes et al. |
| 5,982,891 A | 11/1999 | Ginter et al. |
| 5,982,898 A | 11/1999 | Hsu et al. |
| 5,983,238 A | 11/1999 | Becker et al. |
| 5,983,350 A | 11/1999 | Minear et al. |
| 5,991,399 A | 11/1999 | Graunke et al. |
| 5,991,406 A | 11/1999 | Lipner et al. |
| 5,994,710 A | 11/1999 | Knee |
| 5,995,625 A | 11/1999 | Sudia et al. |
| 5,999,629 A | 12/1999 | Maher et al. |
| 5,999,921 A | 12/1999 | Arsenault |
| 6,002,772 A | 12/1999 | Saito |
| 6,005,945 A | 12/1999 | Whitehouse |
| 6,006,332 A | 12/1999 | Rabne et al. |
| 6,009,177 A | 12/1999 | Sudia |
| 6,021,438 A | 2/2000 | Duvvoori |
| 6,023,510 A | 2/2000 | Epstein |
| 6,023,766 A | 2/2000 | Yamamura |
| 6,026,293 A | 2/2000 | Osborn |
| 6,028,596 A | 2/2000 | Oka |
| 6,047,242 A | 4/2000 | Benson |
| 6,049,789 A | 4/2000 | Frison |
| 6,049,878 A | 4/2000 | Caronni et al. |
| 6,058,188 A | 5/2000 | Chandersekaran et al. |
| 6,058,476 A | 5/2000 | Matsuzaki |
| 6,061,451 A | 5/2000 | Muratani et al. |
| 6,061,794 A | 5/2000 | Angelo |
| 6,069,647 A | 5/2000 | Sullivan et al. |
| 6,072,874 A | 6/2000 | Shin et al. |
| 6,073,124 A | 6/2000 | Krishnan et al. |
| 6,078,667 A | 6/2000 | Johnson |
| 6,078,909 A | 6/2000 | Knutson |
| 6,085,976 A | 7/2000 | Sehr |
| 6,094,486 A | 7/2000 | Marchant |
| 6,094,487 A | 7/2000 | Butler et al. |
| 6,101,606 A | 8/2000 | Diersch et al. |
| 6,105,069 A | 8/2000 | Franklin |
| 6,112,181 A | 8/2000 | Shear et al. |
| 6,119,229 A | 9/2000 | Martinez |
| 6,122,741 A | 9/2000 | Patterson et al. |
| 6,131,162 A | 10/2000 | Yoshiura et al. |
| 6,138,236 A | 10/2000 | Mirov et al. |
| 6,141,754 A | 10/2000 | Choy |
| 6,147,773 A | 11/2000 | Taylor |
| 6,148,417 A | 11/2000 | da Silva |
| 6,151,676 A | 11/2000 | Cuccia et al. |
| 6,157,721 A | 12/2000 | Shear et al. |
| 6,158,011 A | 12/2000 | Chen et al. |
| 6,158,657 A | 12/2000 | Hall, III et al. |
| 6,163,512 A | 12/2000 | Jeun |
| 6,167,358 A | 12/2000 | Othmer et al. |
| 6,170,060 B1 | 1/2001 | Mott et al. |
| 6,175,825 B1 | 1/2001 | Fruechtel |
| 6,182,219 B1 | 1/2001 | Feldbau |
| 6,185,678 B1 | 2/2001 | Arbaugh |
| 6,188,995 B1 | 2/2001 | Garst et al. |
| 6,189,146 B1 | 2/2001 | Misra et al. |
| 6,192,392 B1 | 2/2001 | Ginter |
| 6,199,068 B1 | 3/2001 | Carpenter |
| 6,199,169 B1 | 3/2001 | Voth |
| 6,202,151 B1 | 3/2001 | Musgrave et al. |
| 6,212,634 B1 | 4/2001 | Geer et al. |
| 6,219,652 B1 | 4/2001 | Carter et al. |
| 6,219,788 B1 | 4/2001 | Flavin et al. |
| 6,223,291 B1 | 4/2001 | Puhl |
| 6,226,618 B1 | 5/2001 | Downs et al. |
| 6,226,747 B1 | 5/2001 | Larsson et al. |
| 6,230,185 B1 | 5/2001 | Salas et al. |
| 6,230,272 B1 | 5/2001 | Lockhart et al. |
| 6,233,567 B1 | 5/2001 | Cohen |
| 6,233,600 B1 | 5/2001 | Salas et al. |
| 6,233,684 B1 | 5/2001 | Stefik et al. |
| 6,233,685 B1 | 5/2001 | Smith |
| 6,236,728 B1 | 5/2001 | Marchant |
| 6,237,098 B1 | 5/2001 | Libicki |
| 6,240,183 B1 | 5/2001 | Marchant |
| 6,243,439 B1 | 6/2001 | Arai |
| 6,243,470 B1 | 6/2001 | Coppersmith |
| 6,243,692 B1 | 6/2001 | Floyd et al. |
| 6,253,193 B1 | 6/2001 | Ginter et al. |
| 6,253,224 B1 | 6/2001 | Brice, Jr. |
| 6,256,774 B1 | 7/2001 | O'Leary et al. |
| 6,260,141 B1 | 7/2001 | Park |
| 6,263,313 B1 | 7/2001 | Milsted et al. |
| 6,263,431 B1 | 7/2001 | Lovelace |
| 6,266,420 B1 | 7/2001 | Langford et al. |
| 6,272,469 B1 | 8/2001 | Koritzinsky et al. |
| 6,275,586 B1 | 8/2001 | Kelly |
| 6,279,111 B1 | 8/2001 | Jensenworth |
| 6,279,156 B1 | 8/2001 | Amberg et al. |
| 6,286,051 B1 | 9/2001 | Becker et al. |
| 6,289,319 B1 | 9/2001 | Lockwood |
| 6,289,452 B1 | 9/2001 | Arnold et al. |
| 6,295,577 B1 | 9/2001 | Anderson |
| 6,298,446 B1 | 10/2001 | Schreiber |
| 6,301,361 B1 | 10/2001 | Mischenko et al. |
| 6,301,660 B1 | 10/2001 | Benson |
| 6,303,924 B1 | 10/2001 | Adan |
| 6,304,915 B1 | 10/2001 | Nguyen et al. |
| 6,304,973 B1 | 10/2001 | Williams |
| 6,314,408 B1 | 11/2001 | Salas et al. |
| 6,314,409 B2 | 11/2001 | Schneck |
| 6,321,314 B1 | 11/2001 | Van Dyke |
| 6,321,335 B1 | 11/2001 | Chu |
| 6,324,287 B1 | 11/2001 | Angert |
| 6,324,683 B1 | 11/2001 | Fuh et al. |
| 6,327,652 B1 | 12/2001 | England |
| 6,330,670 B1 | 12/2001 | England et al. |
| 6,332,025 B2 | 12/2001 | Takahashi et al. |
| 6,334,189 B1 | 12/2001 | Granger |
| 6,335,972 B1 | 1/2002 | Chandersekaran et al. |
| 6,343,280 B2 | 1/2002 | Clark |
| 6,345,256 B1 | 2/2002 | Milsted et al. |
| 6,345,294 B1 | 2/2002 | O'Toole |
| 6,353,888 B1 | 3/2002 | Kakehi et al. |
| 6,360,320 B1 | 3/2002 | Ishiguro et al. |
| 6,363,488 B1 | 3/2002 | Ginter |
| 6,367,017 B1 | 4/2002 | Gray |
| 6,373,047 B1 | 4/2002 | Adan |
| 6,374,354 B1 | 4/2002 | Walmsley et al. |
| 6,374,355 B1 | 4/2002 | Patel |
| 6,374,357 B1 | 4/2002 | Mohammed et al. |
| 6,385,596 B1 | 5/2002 | Wiser et al. |
| 6,385,727 B1 | 5/2002 | Cassagnol |
| 6,389,535 B1 | 5/2002 | Thomlinson et al. |
| 6,389,537 B1 | 5/2002 | Davis |
| 6,389,538 B1 | 5/2002 | Gruse et al. |
| 6,389,541 B1 | 5/2002 | Patterson |
| 6,393,125 B1 | 5/2002 | Barbir |
| 6,393,427 B1 | 5/2002 | Vu |
| 6,397,259 B1 | 5/2002 | Lincke et al. |
| 6,398,245 B1 | 6/2002 | Gruse et al. |
| 6,404,888 B1 | 6/2002 | Barbir |
| 6,405,923 B1 | 6/2002 | Seysen |
| 6,408,170 B1 | 6/2002 | Schmidt |
| 6,409,089 B1 | 6/2002 | Eskicioglu |
| 6,411,941 B1 | 6/2002 | Mullor et al. |
| 6,418,421 B1 | 7/2002 | Hurtado et al. |
| 6,424,714 B1 | 7/2002 | Wasilewski |
| 6,424,715 B1 | 7/2002 | Saito |
| 6,425,081 B1 | 7/2002 | Iwamura |

(56) References Cited

U.S. PATENT DOCUMENTS

| | | |
|---|---|---|
| 6,438,690 B1 | 8/2002 | Patel et al. |
| 6,441,813 B1 | 8/2002 | Ishibashi |
| 6,442,529 B1 | 8/2002 | Krishan |
| 6,442,690 B1 | 8/2002 | Howard et al. |
| 6,446,207 B1 | 9/2002 | Vanstone et al. |
| 6,449,719 B1 | 9/2002 | Baker |
| 6,460,140 B1 | 10/2002 | Schoch |
| 6,463,534 B1 | 10/2002 | Geiger |
| 6,475,180 B2 | 11/2002 | Peterson et al. |
| 6,477,649 B2 | 11/2002 | Kambayashi |
| 6,490,680 B1 | 12/2002 | Scheidt |
| 6,496,858 B1 | 12/2002 | Frailong |
| 6,502,079 B1 | 12/2002 | Ball et al. |
| 6,505,300 B2 | 1/2003 | Chan et al. |
| 6,507,909 B1 | 1/2003 | Zurko et al. |
| 6,523,119 B2 | 2/2003 | Pavlin et al. |
| 6,527,638 B1 | 3/2003 | Walker et al. |
| 6,530,023 B1 | 3/2003 | Nissl |
| 6,532,451 B1 | 3/2003 | Schell et al. |
| 6,539,364 B2 | 3/2003 | Moribatake et al. |
| 6,549,626 B1 | 4/2003 | Al-Salqan |
| 6,550,011 B1 | 4/2003 | Sims, III |
| 6,557,104 B2 | 4/2003 | Vu et al. |
| 6,557,105 B1 | 4/2003 | Tardo et al. |
| 6,560,581 B1 | 5/2003 | Fox et al. |
| 6,560,651 B2 | 5/2003 | Katz et al. |
| 6,564,995 B1 | 5/2003 | Montgomery |
| 6,567,793 B1 | 5/2003 | Hicks |
| 6,571,216 B1 | 5/2003 | Garg et al. |
| 6,574,609 B1 | 6/2003 | Downs et al. |
| 6,574,611 B1 | 6/2003 | Matsuyama et al. |
| 6,574,612 B1 | 6/2003 | Baratti et al. |
| 6,581,162 B1 | 6/2003 | Angelo et al. |
| 6,581,331 B1 | 6/2003 | Kral |
| 6,585,158 B2 | 7/2003 | Norskog |
| 6,587,684 B1 | 7/2003 | Hsu et al. |
| 6,587,837 B1 | 7/2003 | Spagna et al. |
| 6,609,201 B1 | 8/2003 | Folmsbee |
| 6,615,349 B1 | 9/2003 | Hair |
| 6,615,350 B1 | 9/2003 | Schell et al. |
| 6,625,729 B1 | 9/2003 | Angelo |
| 6,631,478 B1 | 10/2003 | Wang |
| 6,640,304 B2 | 10/2003 | Ginter et al. |
| 6,646,244 B2 | 11/2003 | Aas |
| 6,654,389 B1 | 11/2003 | Brunheroto et al. |
| 6,664,948 B2 | 12/2003 | Crane |
| 6,665,303 B1 | 12/2003 | Saito et al. |
| 6,665,409 B1 | 12/2003 | Rao |
| 6,668,246 B1 | 12/2003 | Yeung et al. |
| 6,671,737 B1 | 12/2003 | Snowdon et al. |
| 6,671,803 B1 | 12/2003 | Pasieka |
| 6,671,813 B2 | 12/2003 | Ananda |
| 6,678,828 B1 | 1/2004 | Pham et al. |
| 6,681,017 B1 | 1/2004 | Matias et al. |
| 6,684,198 B1 | 1/2004 | Shimizu et al. |
| 6,684,332 B1 | 1/2004 | Douglas |
| 6,690,556 B2 | 2/2004 | Smola |
| 6,694,000 B2 | 2/2004 | Ung |
| 6,697,945 B2 | 2/2004 | Ishiguro et al. |
| 6,701,433 B1 | 3/2004 | Schell et al. |
| 6,704,873 B1 | 3/2004 | Underwood |
| 6,708,176 B2 | 3/2004 | Strunk |
| 6,711,263 B1 | 3/2004 | Nordenstam et al. |
| 6,714,921 B2 | 3/2004 | Stefik et al. |
| 6,715,049 B1 | 3/2004 | Hayakashi |
| 6,716,652 B1 | 4/2004 | Ortlieb |
| 6,728,880 B1 | 4/2004 | Sites |
| 6,738,810 B1 | 5/2004 | Kramer |
| 6,741,851 B1 | 5/2004 | Lee et al. |
| 6,763,458 B1 | 7/2004 | Watanabe |
| 6,765,470 B2 | 7/2004 | Shinzaki |
| 6,772,340 B1 | 8/2004 | Peinado et al. |
| 6,775,655 B1 | 8/2004 | Peinado et al. |
| 6,781,956 B1 | 8/2004 | Cheung |
| 6,791,157 B1 | 9/2004 | Casto |
| 6,792,531 B2 | 9/2004 | Heiden |
| 6,792,537 B1 | 9/2004 | Liu et al. |
| 6,799,270 B1 | 9/2004 | Bull et al. |
| 6,801,998 B1 | 10/2004 | Hanna et al. |
| 6,807,542 B2 | 10/2004 | Bantz et al. |
| 6,816,596 B1 | 11/2004 | Peinado et al. |
| 6,816,809 B2 | 11/2004 | Circenis |
| 6,816,900 B1 | 11/2004 | Vogel |
| 6,820,063 B1 | 11/2004 | England et al. |
| 6,826,606 B2 | 11/2004 | Freeman |
| 6,826,690 B1 | 11/2004 | Hind |
| 6,829,708 B1 | 12/2004 | Peinado et al. |
| 6,832,319 B1 | 12/2004 | Bell et al. |
| 6,834,352 B2 | 12/2004 | Shin |
| 6,839,841 B1 | 1/2005 | Medvinsky |
| 6,844,871 B1 | 1/2005 | Hinckley |
| 6,847,942 B1 | 1/2005 | Land |
| 6,850,252 B1 | 2/2005 | Hoffberg |
| 6,851,051 B1 | 2/2005 | Bolle |
| 6,856,997 B2 | 2/2005 | Lee et al. |
| 6,859,790 B1 | 2/2005 | Nonaka et al. |
| 6,868,433 B1 | 3/2005 | Philyaw |
| 6,871,283 B1 | 3/2005 | Zurko |
| 6,873,975 B1 | 3/2005 | Hatakeyama et al. |
| 6,889,246 B1 | 5/2005 | Kawamoto et al. |
| 6,895,504 B1 | 5/2005 | Zhang |
| 6,898,286 B2 | 5/2005 | Murray |
| 6,918,034 B1 | 7/2005 | Sengodan et al. |
| 6,920,567 B1 | 7/2005 | Doherty et al. |
| 6,922,724 B1 | 7/2005 | Freeman |
| 6,934,840 B2 | 8/2005 | Rich et al. |
| 6,934,942 B1 | 8/2005 | Chilimbi |
| 6,948,073 B2 | 9/2005 | England et al. |
| 6,954,728 B1 | 10/2005 | Kusumoto |
| 6,957,186 B1 | 10/2005 | Guheen |
| 6,959,288 B1 | 10/2005 | Medina et al. |
| 6,959,290 B2 | 10/2005 | Stefik et al. |
| 6,959,291 B1 | 10/2005 | Armstrong |
| 6,961,426 B2 | 11/2005 | Vesely |
| 6,961,858 B2 | 11/2005 | Fransdonk |
| 6,973,444 B1 | 12/2005 | Blinn et al. |
| 6,976,162 B1 | 12/2005 | Ellison |
| 6,976,163 B1 | 12/2005 | Hind |
| 6,978,367 B1 | 12/2005 | Hind et al. |
| 6,983,049 B2 | 1/2006 | Wee et al. |
| 6,983,050 B1 | 1/2006 | Yacobi |
| 6,986,042 B2 | 1/2006 | Griffin |
| 6,990,174 B2 | 1/2006 | Eskelinen |
| 6,993,137 B2 | 1/2006 | Fransdonk |
| 6,993,648 B2 | 1/2006 | Goodman |
| 7,000,100 B2 | 2/2006 | Lacombe |
| 7,000,829 B1 | 2/2006 | Harris |
| 7,006,633 B1 | 2/2006 | Reece |
| 7,010,032 B1 | 3/2006 | Kikuchi et al. |
| 7,010,808 B1 | 3/2006 | Leung et al. |
| 7,013,384 B2 | 3/2006 | Challener |
| 7,016,498 B2 | 3/2006 | Peinado et al. |
| 7,017,188 B1 | 3/2006 | Schmeidler et al. |
| 7,020,704 B1 | 3/2006 | Lipscomb et al. |
| 7,020,781 B1 | 3/2006 | Saw et al. |
| 7,024,393 B1 | 4/2006 | Peinado et al. |
| 7,028,149 B2 | 4/2006 | Grawrock |
| 7,028,180 B1 | 4/2006 | Aull |
| 7,036,011 B2 | 4/2006 | Grimes et al. |
| 7,043,633 B1 | 5/2006 | Fink |
| 7,047,222 B1 | 5/2006 | Bush |
| 7,047,404 B1 | 5/2006 | Doonan et al. |
| 7,051,005 B1 | 5/2006 | Peinado |
| 7,052,530 B2 | 5/2006 | Edlund |
| 7,054,468 B2 | 5/2006 | Yang |
| 7,055,169 B2 | 5/2006 | Delpuch |
| 7,058,819 B2 | 6/2006 | Okaue |
| 7,069,442 B2 | 6/2006 | Sutton, II |
| 7,069,595 B2 | 6/2006 | Cognigni |
| 7,073,056 B2 | 7/2006 | Kocher |
| 7,073,063 B2 | 7/2006 | Peinado |
| 7,076,652 B2 | 7/2006 | Ginter |
| 7,080,039 B1 | 7/2006 | Marsh |
| 7,080,043 B2 | 7/2006 | Chase, Jr. et al. |

(56) References Cited

U.S. PATENT DOCUMENTS

| | | |
|---|---|---|
| 7,089,594 B2 | 8/2006 | Lal et al. |
| 7,095,852 B2 | 8/2006 | Wack |
| 7,096,469 B1 | 8/2006 | Kubala |
| 7,097,357 B2 | 8/2006 | Johnson |
| 7,103,574 B1 | 9/2006 | Peinado et al. |
| 7,107,462 B2 | 9/2006 | Fransdonk |
| 7,113,912 B2 | 9/2006 | Stefik |
| 7,116,969 B2 | 10/2006 | Park |
| 7,117,183 B2 | 10/2006 | Blair |
| 7,120,250 B2 | 10/2006 | Candelore |
| 7,121,460 B1 | 10/2006 | Parsons |
| 7,123,608 B1 | 10/2006 | Scott |
| 7,124,938 B1 | 10/2006 | Marsh |
| 7,127,513 B2 | 10/2006 | Karger et al. |
| 7,127,579 B2 | 10/2006 | Zimmer |
| 7,130,951 B1 | 10/2006 | Christie |
| 7,133,846 B1 | 11/2006 | Ginter et al. |
| 7,136,838 B1 | 11/2006 | Peinado et al. |
| 7,136,945 B2 | 11/2006 | Gibbs et al. |
| 7,143,066 B2 | 11/2006 | Shear et al. |
| 7,143,297 B2 | 11/2006 | Buchheit et al. |
| 7,145,919 B2 | 12/2006 | Krishnarajah et al. |
| 7,146,504 B2 | 12/2006 | Parks et al. |
| 7,162,645 B2 | 1/2007 | Iguchi |
| 7,171,539 B2 | 1/2007 | Mansell |
| 7,171,662 B1 | 1/2007 | Misra et al. |
| 7,174,320 B2 | 2/2007 | Rothrock |
| 7,174,452 B2 | 2/2007 | Carr |
| 7,174,457 B1 | 2/2007 | England |
| 7,200,760 B2 | 4/2007 | Riebe |
| 7,203,966 B2 | 4/2007 | Abburi et al. |
| 7,207,039 B2 | 4/2007 | Komarla |
| 7,213,005 B2 | 5/2007 | Mourad et al. |
| 7,213,266 B1 | 5/2007 | Maher |
| 7,216,363 B2 | 5/2007 | Serkowski et al. |
| 7,216,368 B2 | 5/2007 | Ishiguro |
| 7,219,842 B2 | 5/2007 | Wang et al. |
| 7,222,062 B2 | 5/2007 | Goud |
| 7,224,805 B2 | 5/2007 | Hurst |
| 7,228,437 B2 | 6/2007 | Spagna et al. |
| 7,233,948 B1 | 6/2007 | Shamoon |
| 7,234,144 B2 | 6/2007 | Wilt |
| 7,236,455 B1 | 6/2007 | Proudler |
| 7,243,366 B2 | 7/2007 | Medvinsky et al. |
| 7,254,836 B2 | 8/2007 | Alkove |
| 7,260,721 B2 | 8/2007 | Tanaka |
| 7,266,569 B2 | 9/2007 | Cutter et al. |
| 7,266,714 B2 | 9/2007 | Davies et al. |
| 7,275,159 B2 | 9/2007 | Hull et al. |
| 7,278,165 B2 | 10/2007 | Molaro |
| 7,278,168 B1 * | 10/2007 | Chaudhury et al. ............ 726/30 |
| 7,287,280 B2 | 10/2007 | Young |
| 7,296,154 B2 | 11/2007 | Evans |
| 7,296,296 B2 | 11/2007 | Dunbar |
| 7,299,292 B2 | 11/2007 | Morten et al. |
| 7,299,358 B2 | 11/2007 | Chateau |
| 7,308,573 B2 | 12/2007 | Kostal et al. |
| 7,310,732 B2 | 12/2007 | Matsuyama |
| 7,315,941 B2 | 1/2008 | Ramzan |
| 7,319,579 B2 | 1/2008 | Peinado et al. |
| 7,319,759 B1 | 1/2008 | Peinado et al. |
| 7,325,139 B2 | 1/2008 | Ishiguro et al. |
| 7,336,791 B2 | 2/2008 | Ishiguro |
| 7,343,496 B1 | 3/2008 | Hsiang |
| 7,353,209 B1 | 4/2008 | Peinado |
| 7,353,402 B2 | 4/2008 | Bourne et al. |
| 7,356,709 B2 | 4/2008 | Gunyakti |
| 7,359,807 B2 | 4/2008 | Frank |
| 7,360,253 B2 | 4/2008 | Frank |
| 7,370,212 B2 | 5/2008 | Bourne et al. |
| 7,376,976 B2 | 5/2008 | Fierstein |
| 7,382,883 B2 | 6/2008 | Cross |
| 7,383,205 B1 | 6/2008 | Peinado |
| 7,392,429 B2 | 6/2008 | Frank |
| 7,395,245 B2 | 7/2008 | Okamoto et al. |
| 7,395,452 B2 | 7/2008 | Nicholson et al. |
| 7,406,446 B2 | 7/2008 | Frank |
| 7,421,413 B2 | 9/2008 | Frank |
| 7,426,752 B2 | 9/2008 | Agrawal |
| 7,441,121 B2 | 10/2008 | Cutter et al. |
| 7,441,246 B2 | 10/2008 | Auerbach |
| 7,451,202 B2 | 11/2008 | Nakahara |
| 7,461,249 B1 | 12/2008 | Pearson |
| 7,464,103 B2 | 12/2008 | Siu |
| 7,475,137 B2 | 1/2009 | Holden et al. |
| 7,484,103 B2 | 1/2009 | Woo et al. |
| 7,490,356 B2 | 2/2009 | Lieblich |
| 7,493,487 B2 | 2/2009 | Phillips |
| 7,494,277 B2 | 2/2009 | Setala |
| 7,500,267 B2 | 3/2009 | McKune |
| 7,502,945 B2 | 3/2009 | Bourne et al. |
| 7,519,816 B2 | 4/2009 | Phillips |
| 7,526,649 B2 | 4/2009 | Wiseman |
| 7,529,927 B2 | 5/2009 | Peinado et al. |
| 7,539,863 B2 | 5/2009 | Phillips et al. |
| 7,540,024 B2 | 5/2009 | Phillips et al. |
| 7,549,060 B2 | 6/2009 | Bourne et al. |
| 7,552,331 B2 | 6/2009 | Evans |
| 7,558,463 B2 | 7/2009 | Jain |
| 7,562,220 B2 | 7/2009 | Frank |
| 7,565,325 B2 | 7/2009 | Lenard |
| 7,568,096 B2 | 7/2009 | Evans |
| 7,584,502 B2 | 9/2009 | Alkove |
| 7,590,841 B2 | 9/2009 | Sherwani |
| 7,596,784 B2 | 9/2009 | Abrams |
| 7,610,631 B2 | 10/2009 | Frank |
| 7,617,401 B2 | 11/2009 | Marsh |
| 7,644,239 B2 | 1/2010 | Ergan |
| 7,653,943 B2 | 1/2010 | Evans |
| 7,665,143 B2 | 2/2010 | Havens |
| 7,669,056 B2 | 2/2010 | Frank |
| 7,676,846 B2 | 3/2010 | Robert et al. |
| 7,680,744 B2 | 3/2010 | Blinn |
| 7,694,153 B2 | 4/2010 | Ahdout |
| 7,703,141 B2 | 4/2010 | Alkove |
| 7,739,505 B2 | 6/2010 | Reneris |
| 7,752,674 B2 | 7/2010 | Evans |
| 7,770,205 B2 | 8/2010 | Frank |
| 7,809,646 B2 | 10/2010 | Rose |
| 7,810,163 B2 | 10/2010 | Evans |
| 7,814,532 B2 | 10/2010 | Cromer |
| 7,856,404 B2 | 12/2010 | Evans et al. |
| 7,877,607 B2 | 1/2011 | Circenis |
| 7,891,007 B2 | 2/2011 | Waxman |
| 7,900,140 B2 | 3/2011 | Mohammed |
| 7,903,117 B2 | 3/2011 | Howell |
| 7,958,029 B1 | 6/2011 | Bobich |
| 7,979,721 B2 | 7/2011 | Westerinen |
| 8,060,923 B2 | 11/2011 | Cutter |
| 8,074,287 B2 | 12/2011 | Barde |
| 2001/0005201 A1 | 6/2001 | Digiorgio et al. |
| 2001/0010076 A1 | 7/2001 | Wray |
| 2001/0011253 A1 | 8/2001 | Coley et al. |
| 2001/0021252 A1 | 9/2001 | Carter |
| 2001/0034711 A1 | 10/2001 | Tashenberg |
| 2001/0044782 A1 | 11/2001 | Hughes |
| 2001/0049667 A1 | 12/2001 | Moribatake et al. |
| 2001/0051996 A1 | 12/2001 | Cooper et al. |
| 2001/0052077 A1 | 12/2001 | Fung et al. |
| 2001/0053223 A1 | 12/2001 | Ishibashi et al. |
| 2001/0056413 A1 | 12/2001 | Suzuki et al. |
| 2001/0056539 A1 | 12/2001 | Pavlin et al. |
| 2002/0002597 A1 | 1/2002 | Morrell, Jr. |
| 2002/0002674 A1 | 1/2002 | Grimes et al. |
| 2002/0004773 A1 | 1/2002 | Xu et al. |
| 2002/0006204 A1 | 1/2002 | England et al. |
| 2002/0007310 A1 | 1/2002 | Long |
| 2002/0007454 A1 * | 1/2002 | Tarpenning et al. .......... 713/156 |
| 2002/0007456 A1 | 1/2002 | Peinado et al. |
| 2002/0013772 A1 * | 1/2002 | Peinado ........................ 705/51 |
| 2002/0018566 A1 | 2/2002 | Kawatsura et al. |
| 2002/0019814 A1 | 2/2002 | Ganesan |
| 2002/0023212 A1 | 2/2002 | Proudler |
| 2002/0026574 A1 | 2/2002 | Watanabe et al. |

(56) References Cited

U.S. PATENT DOCUMENTS

| | | |
|---|---|---|
| 2002/0038231 A1 | 3/2002 | Hasebe |
| 2002/0044654 A1 | 4/2002 | Maeda et al. |
| 2002/0046098 A1 | 4/2002 | Maggio |
| 2002/0048369 A1 | 4/2002 | Ginter et al. |
| 2002/0049679 A1 | 4/2002 | Russell et al. |
| 2002/0055906 A1 | 5/2002 | Katz |
| 2002/0056042 A1 | 5/2002 | van der Kaay |
| 2002/0056747 A1 | 5/2002 | Matsuyama et al. |
| 2002/0063933 A1 | 5/2002 | Maeda et al. |
| 2002/0065781 A1 | 5/2002 | Hillegass et al. |
| 2002/0067767 A1 | 6/2002 | Sugahara |
| 2002/0073068 A1 | 6/2002 | Guha |
| 2002/0083319 A1 | 6/2002 | Ishiguro et al. |
| 2002/0091569 A1 | 7/2002 | Kitaura |
| 2002/0095603 A1 | 7/2002 | Godwin |
| 2002/0107701 A1 | 8/2002 | Batty |
| 2002/0107806 A1 | 8/2002 | Higashi et al. |
| 2002/0108050 A1 | 8/2002 | Raley et al. |
| 2002/0111916 A1 | 8/2002 | Coronna |
| 2002/0112171 A1 | 8/2002 | Ginter et al. |
| 2002/0118835 A1 | 8/2002 | Uemura |
| 2002/0123964 A1 | 9/2002 | Kramer |
| 2002/0123968 A1 | 9/2002 | Okayama et al. |
| 2002/0124212 A1 | 9/2002 | Nitschke |
| 2002/0129359 A1 | 9/2002 | Lichner |
| 2002/0138549 A1 | 9/2002 | Urien |
| 2002/0141451 A1 | 10/2002 | Gates |
| 2002/0144131 A1 | 10/2002 | Spacey |
| 2002/0147601 A1 | 10/2002 | Fagan |
| 2002/0147782 A1 | 10/2002 | Dimitrova |
| 2002/0147912 A1 | 10/2002 | Shmueli |
| 2002/0152393 A1 | 10/2002 | Thoma et al. |
| 2002/0156743 A1 | 10/2002 | DeTreville |
| 2002/0157002 A1 | 10/2002 | Messerges et al. |
| 2002/0166056 A1 | 11/2002 | Johnson et al. |
| 2002/0169954 A1 | 11/2002 | Bandini et al. |
| 2002/0169974 A1 | 11/2002 | McKune |
| 2002/0178071 A1 | 11/2002 | Walker |
| 2002/0184482 A1 | 12/2002 | Lacombe |
| 2002/0184508 A1 | 12/2002 | Bialick |
| 2002/0184515 A1 | 12/2002 | Oho et al. |
| 2002/0186843 A1 | 12/2002 | Weinstein et al. |
| 2002/0190876 A1 | 12/2002 | Lai et al. |
| 2002/0193101 A1 | 12/2002 | McAlinden |
| 2002/0194132 A1 | 12/2002 | Pearson |
| 2002/0194474 A1 | 12/2002 | Natsuno et al. |
| 2002/0198845 A1 | 12/2002 | Lao et al. |
| 2002/0198846 A1 | 12/2002 | Lao |
| 2003/0005135 A1 | 1/2003 | Inoue |
| 2003/0005335 A1 | 1/2003 | Watanabe |
| 2003/0014323 A1 | 1/2003 | Scheer |
| 2003/0014496 A1 | 1/2003 | Spencer et al. |
| 2003/0018491 A1 | 1/2003 | Nakahara et al. |
| 2003/0021416 A1 | 1/2003 | Brown |
| 2003/0023564 A1 | 1/2003 | Padhye et al. |
| 2003/0027549 A1 | 2/2003 | Kiel |
| 2003/0028454 A1 | 2/2003 | Ooho et al. |
| 2003/0028490 A1 | 2/2003 | Miura et al. |
| 2003/0035409 A1 | 2/2003 | Wang |
| 2003/0037246 A1 | 2/2003 | Goodman |
| 2003/0037261 A1 | 2/2003 | Meffert et al. |
| 2003/0040960 A1 | 2/2003 | Eckmann |
| 2003/0041008 A1 | 2/2003 | Grey et al. |
| 2003/0041257 A1 | 2/2003 | Wee et al. |
| 2003/0046026 A1 | 3/2003 | Levy |
| 2003/0046238 A1 | 3/2003 | Nonaka et al. |
| 2003/0048473 A1 | 3/2003 | Rosen |
| 2003/0053630 A1 | 3/2003 | Elliott et al. |
| 2003/0056107 A1 | 3/2003 | Cammack |
| 2003/0056118 A1 | 3/2003 | Troyansky et al. |
| 2003/0063750 A1 | 4/2003 | Medvinsky |
| 2003/0065918 A1 | 4/2003 | Willey |
| 2003/0069854 A1 | 4/2003 | Hsu et al. |
| 2003/0069981 A1 | 4/2003 | Trovato |
| 2003/0078853 A1 | 4/2003 | Peinado et al. |
| 2003/0079038 A1 | 4/2003 | Robbin et al. |
| 2003/0081592 A1 | 5/2003 | Krishnarajah et al. |
| 2003/0084104 A1 | 5/2003 | Salem et al. |
| 2003/0084278 A1 | 5/2003 | Cromer |
| 2003/0084285 A1 | 5/2003 | Cromer |
| 2003/0084306 A1 | 5/2003 | Abburi et al. |
| 2003/0084337 A1 | 5/2003 | Simionescu |
| 2003/0084352 A1 | 5/2003 | Schwartz |
| 2003/0088500 A1 | 5/2003 | Shinohara |
| 2003/0093694 A1 | 5/2003 | Medvinsky |
| 2003/0097596 A1 | 5/2003 | Muratov |
| 2003/0108164 A1 | 6/2003 | Laurin et al. |
| 2003/0110388 A1 | 6/2003 | Pavlin |
| 2003/0115457 A1* | 6/2003 | Wildish et al. ............... 713/157 |
| 2003/0115458 A1 | 6/2003 | Song |
| 2003/0120935 A1 | 6/2003 | Teal |
| 2003/0126519 A1 | 7/2003 | Odorcic |
| 2003/0131252 A1 | 7/2003 | Barton |
| 2003/0131353 A1 | 7/2003 | Blom et al. |
| 2003/0133576 A1 | 7/2003 | Grumiaux |
| 2003/0135380 A1 | 7/2003 | Lehr |
| 2003/0149670 A1 | 8/2003 | Cronce |
| 2003/0149671 A1 | 8/2003 | Yamamoto |
| 2003/0154393 A1 | 8/2003 | Young |
| 2003/0156572 A1 | 8/2003 | Hui |
| 2003/0156719 A1 | 8/2003 | Cronce |
| 2003/0161473 A1 | 8/2003 | Fransdonk |
| 2003/0163383 A1 | 8/2003 | Engelhart |
| 2003/0163712 A1 | 8/2003 | LaMothe |
| 2003/0167392 A1 | 9/2003 | Fransdonk |
| 2003/0172345 A1 | 9/2003 | Engelsberg et al. |
| 2003/0172376 A1 | 9/2003 | Coffin, III et al. |
| 2003/0185395 A1 | 10/2003 | Lee |
| 2003/0185399 A1 | 10/2003 | Ishiguro |
| 2003/0187801 A1 | 10/2003 | Chase et al. |
| 2003/0188117 A1 | 10/2003 | Yoshino et al. |
| 2003/0188165 A1 | 10/2003 | Sutton, II |
| 2003/0188179 A1 | 10/2003 | Challener |
| 2003/0194092 A1 | 10/2003 | Parks et al. |
| 2003/0194094 A1 | 10/2003 | Lampson et al. |
| 2003/0196102 A1 | 10/2003 | McCarroll |
| 2003/0196106 A1 | 10/2003 | Erfani |
| 2003/0198350 A1 | 10/2003 | Foster et al. |
| 2003/0200336 A1 | 10/2003 | Pal |
| 2003/0204738 A1 | 10/2003 | Morgan |
| 2003/0208338 A1 | 11/2003 | Challener |
| 2003/0208573 A1 | 11/2003 | Harrison |
| 2003/0229702 A1 | 12/2003 | Hensbergen |
| 2003/0233553 A1 | 12/2003 | Parks et al. |
| 2003/0236820 A1 | 12/2003 | Tierney et al. |
| 2003/0236978 A1 | 12/2003 | Evans et al. |
| 2004/0001088 A1 | 1/2004 | Stancil |
| 2004/0001594 A1 | 1/2004 | Krishnaswamy et al. |
| 2004/0003139 A1 | 1/2004 | Cottrille et al. |
| 2004/0003190 A1 | 1/2004 | Childs |
| 2004/0003268 A1 | 1/2004 | Bourne et al. |
| 2004/0003269 A1 | 1/2004 | Waxman et al. |
| 2004/0003270 A1 | 1/2004 | Bourne et al. |
| 2004/0003288 A1 | 1/2004 | Wiseman |
| 2004/0010440 A1 | 1/2004 | Lenard |
| 2004/0010602 A1 | 1/2004 | Van Vleck et al. |
| 2004/0010684 A1 | 1/2004 | Douglas |
| 2004/0019456 A1 | 1/2004 | Circenis |
| 2004/0023636 A1 | 2/2004 | Gurel |
| 2004/0030898 A1* | 2/2004 | Tsuria et al. ............... 713/171 |
| 2004/0030912 A1 | 2/2004 | Merkle, Jr. |
| 2004/0034816 A1 | 2/2004 | Richard |
| 2004/0039916 A1 | 2/2004 | Aldis et al. |
| 2004/0039924 A1 | 2/2004 | Baldwin |
| 2004/0039932 A1 | 2/2004 | Elazar et al. |
| 2004/0039960 A1 | 2/2004 | Kassayan |
| 2004/0042451 A1 | 3/2004 | Takaku |
| 2004/0044629 A1 | 3/2004 | Rhodes |
| 2004/0045027 A1 | 3/2004 | Takamura et al. |
| 2004/0054630 A1 | 3/2004 | Ginter |
| 2004/0054678 A1 | 3/2004 | Okamoto et al. |
| 2004/0054907 A1 | 3/2004 | Chateau |
| 2004/0054908 A1 | 3/2004 | Circenis |
| 2004/0054909 A1 | 3/2004 | Serkowski |

(56) References Cited

U.S. PATENT DOCUMENTS

| | | |
|---|---|---|
| 2004/0054912 A1 | 3/2004 | Adent et al. |
| 2004/0064351 A1 | 4/2004 | Mikurak |
| 2004/0064707 A1 | 4/2004 | McCann |
| 2004/0067746 A1 | 4/2004 | Johnson |
| 2004/0073670 A1 | 4/2004 | Chack |
| 2004/0080541 A1 | 4/2004 | Saiga et al. |
| 2004/0083289 A1 | 4/2004 | Karger et al. |
| 2004/0088541 A1 | 5/2004 | Messerges et al. |
| 2004/0088548 A1 | 5/2004 | Smetters |
| 2004/0093371 A1 | 5/2004 | Burrows |
| 2004/0093508 A1 | 5/2004 | Foerstner |
| 2004/0103305 A1 | 5/2004 | Ginter |
| 2004/0107125 A1 | 6/2004 | Guheen |
| 2004/0107356 A1 | 6/2004 | Shamoon |
| 2004/0107359 A1 | 6/2004 | Kawano |
| 2004/0107368 A1 | 6/2004 | Colvin |
| 2004/0111615 A1 | 6/2004 | Nyang |
| 2004/0123127 A1 | 6/2004 | Teicher |
| 2004/0125755 A1 | 7/2004 | Roberts |
| 2004/0125757 A1 | 7/2004 | Mela et al. |
| 2004/0125791 A1 | 7/2004 | Hoffmann |
| 2004/0127196 A1 | 7/2004 | Dabbish et al. |
| 2004/0128251 A1 | 7/2004 | Adam |
| 2004/0133794 A1 | 7/2004 | Kocher et al. |
| 2004/0139027 A1 | 7/2004 | Molaro |
| 2004/0139312 A1 | 7/2004 | Medvinsky |
| 2004/0143736 A1 | 7/2004 | Cross et al. |
| 2004/0143760 A1 | 7/2004 | Alkove et al. |
| 2004/0146015 A1 | 7/2004 | Cross |
| 2004/0158709 A1 | 8/2004 | Narin et al. |
| 2004/0158731 A1 | 8/2004 | Narin et al. |
| 2004/0158742 A1 | 8/2004 | Srinivasan |
| 2004/0168073 A1 | 8/2004 | Bourne et al. |
| 2004/0168077 A1 | 8/2004 | Waxman et al. |
| 2004/0184605 A1 | 9/2004 | Soliman |
| 2004/0193919 A1 | 9/2004 | Dabbish |
| 2004/0199769 A1 | 10/2004 | Proudler |
| 2004/0205028 A1 | 10/2004 | Verosub et al. |
| 2004/0205357 A1 | 10/2004 | Kuo et al. |
| 2004/0205510 A1 | 10/2004 | Rising |
| 2004/0210535 A1 | 10/2004 | Erickson |
| 2004/0220858 A1 | 11/2004 | Maggio |
| 2004/0225519 A1 | 11/2004 | Martin |
| 2004/0225894 A1 | 11/2004 | Colvin |
| 2004/0236717 A1 | 11/2004 | Demartini et al. |
| 2004/0243819 A1 | 12/2004 | Bourne et al. |
| 2004/0249759 A1 | 12/2004 | Higashi et al. |
| 2004/0255000 A1 | 12/2004 | Simionescu |
| 2004/0261093 A1 | 12/2004 | Rebaud et al. |
| 2004/0268120 A1 | 12/2004 | Mirtal |
| 2005/0002525 A1 | 1/2005 | Alkove et al. |
| 2005/0005114 A1 | 1/2005 | Medvinsky |
| 2005/0008240 A1 | 1/2005 | Banerji et al. |
| 2005/0010531 A1 | 1/2005 | Kushalnagar et al. |
| 2005/0010536 A1 | 1/2005 | Cochran et al. |
| 2005/0010766 A1 | 1/2005 | Holden et al. |
| 2005/0015343 A1 | 1/2005 | Nagai |
| 2005/0021944 A1 | 1/2005 | Craft |
| 2005/0021989 A1 | 1/2005 | Johnson et al. |
| 2005/0021992 A1 | 1/2005 | Aida |
| 2005/0028000 A1 | 2/2005 | Bulusu |
| 2005/0028151 A1 | 2/2005 | Roth et al. |
| 2005/0033747 A1 | 2/2005 | Wittkotter |
| 2005/0039013 A1 | 2/2005 | Bajikar |
| 2005/0044197 A1 | 2/2005 | Lai |
| 2005/0044397 A1 | 2/2005 | Bjorkengren |
| 2005/0050329 A1 | 3/2005 | Wilding et al. |
| 2005/0050344 A1 | 3/2005 | Hill et al. |
| 2005/0050355 A1 | 3/2005 | Graunke |
| 2005/0060388 A1 | 3/2005 | Tatsumi |
| 2005/0065880 A1 | 3/2005 | Amato |
| 2005/0069039 A1 | 3/2005 | Crinon |
| 2005/0080701 A1 | 4/2005 | Tunney |
| 2005/0081042 A1 | 4/2005 | Venkatesan et al. |
| 2005/0086174 A1 | 4/2005 | Eng |
| 2005/0091104 A1 | 4/2005 | Abraham |
| 2005/0091169 A1 | 4/2005 | Peinado et al. |
| 2005/0097204 A1 | 5/2005 | Horowitz |
| 2005/0102181 A1 | 5/2005 | Scroggie |
| 2005/0108547 A1 | 5/2005 | Sakai |
| 2005/0108564 A1 | 5/2005 | Freeman |
| 2005/0114896 A1 | 5/2005 | Hug et al. |
| 2005/0120125 A1 | 6/2005 | Morten et al. |
| 2005/0120251 A1 | 6/2005 | Fukumori |
| 2005/0125673 A1 | 6/2005 | Cheng |
| 2005/0129296 A1 | 6/2005 | Setala |
| 2005/0132150 A1 | 6/2005 | Jewell |
| 2005/0135613 A1 | 6/2005 | Brandenburg et al. |
| 2005/0138338 A1 | 6/2005 | Sodani et al. |
| 2005/0138357 A1 | 6/2005 | Swenson et al. |
| 2005/0138370 A1 | 6/2005 | Goud |
| 2005/0138388 A1 | 6/2005 | Paganetti |
| 2005/0138389 A1 | 6/2005 | Catherman |
| 2005/0138406 A1 | 6/2005 | Cox |
| 2005/0138423 A1 | 6/2005 | Ranganathan |
| 2005/0141717 A1 | 6/2005 | Cromer |
| 2005/0144099 A1 | 6/2005 | Deb |
| 2005/0149722 A1 | 7/2005 | Wiseman |
| 2005/0149729 A1 | 7/2005 | Zimmer |
| 2005/0163052 A1 | 7/2005 | Savage et al. |
| 2005/0166051 A1 | 7/2005 | Buer |
| 2005/0169444 A1 | 8/2005 | Inon |
| 2005/0169467 A1 | 8/2005 | Risan et al. |
| 2005/0172121 A1 | 8/2005 | Risan |
| 2005/0177875 A1 | 8/2005 | Kamperman et al. |
| 2005/0182921 A1 | 8/2005 | Duncan |
| 2005/0182931 A1 | 8/2005 | Robert et al. |
| 2005/0182940 A1 | 8/2005 | Sutton, II |
| 2005/0188843 A1 | 9/2005 | Edlund |
| 2005/0192099 A1 | 9/2005 | Nguyen et al. |
| 2005/0192907 A1 | 9/2005 | Blinn et al. |
| 2005/0198510 A1 | 9/2005 | Robert et al. |
| 2005/0203801 A1 | 9/2005 | Morgenstern |
| 2005/0204391 A1 | 9/2005 | Hunleth et al. |
| 2005/0210252 A1 | 9/2005 | Freeman |
| 2005/0213761 A1 | 9/2005 | Walmsley |
| 2005/0216413 A1 | 9/2005 | Murakami |
| 2005/0216577 A1 | 9/2005 | Durham et al. |
| 2005/0221766 A1 | 10/2005 | Brizek et al. |
| 2005/0223415 A1 | 10/2005 | Oho et al. |
| 2005/0226170 A1 | 10/2005 | Relan et al. |
| 2005/0235141 A1 | 10/2005 | Ibrahim |
| 2005/0240533 A1 | 10/2005 | Cutter et al. |
| 2005/0246521 A1 | 11/2005 | Bade |
| 2005/0246525 A1 | 11/2005 | Bade |
| 2005/0246552 A1 | 11/2005 | Bade |
| 2005/0254526 A1 | 11/2005 | Wang et al. |
| 2005/0257073 A1 | 11/2005 | Bade |
| 2005/0265548 A1 | 12/2005 | Tsuchimura |
| 2005/0265555 A1 | 12/2005 | Pippuri |
| 2005/0268115 A1 | 12/2005 | Barde |
| 2005/0268174 A1 | 12/2005 | Kumagai |
| 2005/0275866 A1 | 12/2005 | Corlett |
| 2005/0278519 A1 | 12/2005 | Luebke |
| 2005/0279371 A1 | 12/2005 | Billard |
| 2005/0279827 A1 | 12/2005 | Mascavage |
| 2005/0283601 A1 | 12/2005 | Tahan |
| 2005/0286476 A1 | 12/2005 | Crosswy |
| 2005/0289076 A1 | 12/2005 | Lambert |
| 2005/0289177 A1 | 12/2005 | Hohmann, II |
| 2005/0289343 A1 | 12/2005 | Tahan |
| 2006/0010076 A1 | 1/2006 | Cutter |
| 2006/0010326 A1 | 1/2006 | Bade |
| 2006/0014521 A1 | 1/2006 | Chen et al. |
| 2006/0015717 A1 | 1/2006 | Liu |
| 2006/0015718 A1 | 1/2006 | Liu |
| 2006/0015732 A1 | 1/2006 | Liu |
| 2006/0020554 A1 | 1/2006 | Septon |
| 2006/0020784 A1 | 1/2006 | Jonker |
| 2006/0020821 A1 | 1/2006 | Waltermann |
| 2006/0020860 A1 | 1/2006 | Tardif |
| 2006/0026418 A1 | 2/2006 | Bade |
| 2006/0026419 A1 | 2/2006 | Arndt |
| 2006/0026422 A1 | 2/2006 | Bade |

(56) References Cited

U.S. PATENT DOCUMENTS

| | | |
|---|---|---|
| 2006/0045267 A1 | 3/2006 | Moore |
| 2006/0047957 A1 | 3/2006 | Helms et al. |
| 2006/0053112 A1 | 3/2006 | Chitkara |
| 2006/0055506 A1 | 3/2006 | Nicolas |
| 2006/0072748 A1 | 4/2006 | Buer |
| 2006/0072762 A1 | 4/2006 | Buer |
| 2006/0074600 A1 | 4/2006 | Sastry |
| 2006/0075014 A1 | 4/2006 | Tharappel |
| 2006/0075223 A1 | 4/2006 | Bade |
| 2006/0085634 A1 | 4/2006 | Jain et al. |
| 2006/0085637 A1 | 4/2006 | Pinkas |
| 2006/0085844 A1 | 4/2006 | Buer |
| 2006/0089917 A1 | 4/2006 | Strom |
| 2006/0090084 A1 | 4/2006 | Buer |
| 2006/0100010 A1 | 5/2006 | Gatto |
| 2006/0104356 A1 | 5/2006 | Crinon |
| 2006/0106845 A1 | 5/2006 | Frank et al. |
| 2006/0106920 A1 | 5/2006 | Steeb |
| 2006/0107306 A1 | 5/2006 | Thirumalai |
| 2006/0107328 A1 | 5/2006 | Frank |
| 2006/0107335 A1 | 5/2006 | Frank |
| 2006/0112267 A1 | 5/2006 | Zimmer |
| 2006/0117177 A1 | 6/2006 | Buer |
| 2006/0129496 A1 | 6/2006 | Chow |
| 2006/0129824 A1 | 6/2006 | Hoff |
| 2006/0130130 A1 | 6/2006 | Kablotsky |
| 2006/0143431 A1 | 6/2006 | Rothman |
| 2006/0149966 A1 | 7/2006 | Buskey |
| 2006/0156416 A1 | 7/2006 | Huotari |
| 2006/0161635 A1 | 7/2006 | Lamkin et al. |
| 2006/0165005 A1 | 7/2006 | Frank |
| 2006/0167814 A1 | 7/2006 | Peinado et al. |
| 2006/0167815 A1 | 7/2006 | Peinado et al. |
| 2006/0167985 A1 | 7/2006 | Albanese et al. |
| 2006/0168451 A1 | 7/2006 | Ishibashi et al. |
| 2006/0168664 A1 | 7/2006 | Frank |
| 2006/0173787 A1 | 8/2006 | Weber |
| 2006/0174110 A1 | 8/2006 | Debique et al. |
| 2006/0184790 A1 | 8/2006 | Oliveira et al. |
| 2006/0193474 A1 | 8/2006 | Fransdonk |
| 2006/0206618 A1 | 9/2006 | Zimmer |
| 2006/0212363 A1 | 9/2006 | Peinado et al. |
| 2006/0212945 A1 | 9/2006 | Donlin |
| 2006/0213997 A1 | 9/2006 | Frank |
| 2006/0229990 A1 | 10/2006 | Shimoji et al. |
| 2006/0235798 A1 | 10/2006 | Alkove et al. |
| 2006/0235799 A1 | 10/2006 | Evans et al. |
| 2006/0235801 A1 | 10/2006 | Strom et al. |
| 2006/0242406 A1 | 10/2006 | Barde |
| 2006/0248594 A1 | 11/2006 | Grigorovitch et al. |
| 2006/0248596 A1 | 11/2006 | Jain |
| 2006/0265758 A1 | 11/2006 | Khandelwal et al. |
| 2006/0268099 A1 | 11/2006 | Potrebic et al. |
| 2006/0272026 A1 | 11/2006 | Niwano et al. |
| 2006/0282319 A1 | 12/2006 | Maggio |
| 2006/0282899 A1 | 12/2006 | Raciborski |
| 2007/0003064 A1 | 1/2007 | Wiseman et al. |
| 2007/0016594 A1 | 1/2007 | Visharam et al. |
| 2007/0016784 A1 | 1/2007 | Vauclair |
| 2007/0033102 A1 | 2/2007 | Frank |
| 2007/0033419 A1 | 2/2007 | Kocher et al. |
| 2007/0058807 A1 | 3/2007 | Marsh |
| 2007/0078777 A1 | 4/2007 | Demartini et al. |
| 2007/0112681 A1 | 5/2007 | Niwano et al. |
| 2007/0157322 A1 | 7/2007 | Onno |
| 2007/0171903 A1 | 7/2007 | Zeng et al. |
| 2007/0269044 A1 | 11/2007 | Bruestle |
| 2007/0274393 A1 | 11/2007 | Toma et al. |
| 2007/0280422 A1 | 12/2007 | Setala |
| 2007/0288391 A1 | 12/2007 | Nakamura et al. |
| 2008/0075168 A1 | 3/2008 | Toma et al. |
| 2008/0141339 A1 | 6/2008 | Gomez et al. |
| 2008/0187284 A1 | 8/2008 | Ikeda et al. |
| 2008/0298581 A1 | 12/2008 | Murase et al. |
| 2008/0301440 A1 | 12/2008 | Plouffe et al. |
| 2008/0301468 A1 | 12/2008 | Murase et al. |
| 2009/0070454 A1 | 3/2009 | McKinnon, III et al. |
| 2009/0132815 A1 | 5/2009 | Ginter |
| 2009/0158036 A1 | 6/2009 | Barde |
| 2010/0177891 A1 | 7/2010 | Keidar |
| 2010/0280954 A1 | 11/2010 | Khandelwal |
| 2011/0128290 A1 | 6/2011 | Howell |
| 2012/0036562 A1 | 2/2012 | Cutter et al. |
| 2012/0137127 A1 | 5/2012 | Jain |

FOREIGN PATENT DOCUMENTS

| | | |
|---|---|---|
| CN | 1531673 | 9/2004 |
| EP | 0085480 | 8/1983 |
| EP | 0409397 | 1/1991 |
| EP | 0613073 | 8/1994 |
| EP | 0635790 | 1/1995 |
| EP | 0665486 | 8/1995 |
| EP | 0387599 | 9/1995 |
| EP | 0679978 | 11/1995 |
| EP | 0709760 | 5/1996 |
| EP | 0715245 | 6/1996 |
| EP | 0715246 | 6/1996 |
| EP | 0715247 | 6/1996 |
| EP | 0752663 | 1/1997 |
| EP | 0768774 | 4/1997 |
| EP | 778512 | 6/1997 |
| EP | 0798892 | 10/1997 |
| EP | 0843249 | 5/1998 |
| EP | 0843449 | 6/1998 |
| EP | 0849658 | 6/1998 |
| EP | 0874300 | 10/1998 |
| EP | 0887723 | 12/1998 |
| EP | 0907120 | 4/1999 |
| EP | 1061465 | 12/2000 |
| EP | 1085396 | 3/2001 |
| EP | 1120967 | 8/2001 |
| EP | 01041823 | 10/2002 |
| EP | 01287636 | 3/2003 |
| EP | 0679980 | 6/2003 |
| EP | 0735719 | 6/2003 |
| EP | 1 346 755 | 9/2003 |
| EP | 07255122 | 9/2003 |
| EP | 1363424 | 11/2003 |
| EP | 0137881 | 1/2004 |
| EP | 01376307 | 1/2004 |
| EP | 1387237 | 2/2004 |
| EP | 1429224 | 6/2004 |
| EP | 1223722 | 8/2004 |
| EP | 1460514 | 9/2004 |
| EP | 1376307 | 11/2004 |
| EP | 01477879 | 11/2004 |
| EP | 01494425 | 1/2005 |
| EP | 1233337 | 8/2005 |
| EP | 01292065 | 12/2008 |
| EP | 01378812 | 3/2010 |
| EP | 1594034 | 4/2010 |
| EP | 1259863 | 5/2013 |
| EP | 1166562 | 6/2013 |
| GB | 2359969 | 9/2001 |
| GB | 2378780 | 2/2003 |
| GB | 2381898 | 5/2003 |
| JP | 2060859 | 3/1990 |
| JP | 02291043 | 11/1990 |
| JP | 2291043 | 11/1990 |
| JP | 3241950 | 10/1991 |
| JP | 05-35461 | 2/1993 |
| JP | 5073580 | 3/1993 |
| JP | 06-035718 | 2/1994 |
| JP | 07-036559 | 2/1995 |
| JP | 07-141153 | 6/1995 |
| JP | 09-069044 | 8/1995 |
| JP | 08-006729 | 1/1996 |
| JP | 09-006800 | 1/1997 |
| JP | 01-526550 | 5/1997 |
| JP | 09-185504 | 7/1997 |
| JP | 09-251494 | 9/1997 |

(56) References Cited

FOREIGN PATENT DOCUMENTS

| | | |
|---|---|---|
| JP | 11-110294 | 4/1999 |
| JP | 11-187013 | 7/1999 |
| JP | 11-219329 | 8/1999 |
| JP | 2000-113066 | 4/2000 |
| JP | 2000-215165 | 8/2000 |
| JP | 00-293369 | 10/2000 |
| JP | 2000-293439 | 10/2000 |
| JP | 2000-347566 | 12/2000 |
| JP | 2000-516743 | 12/2000 |
| JP | 01-051742 | 2/2001 |
| JP | 03-510684 | 3/2001 |
| JP | 2001-067408 | 3/2001 |
| JP | 01-101033 | 4/2001 |
| JP | 03-510713 | 4/2001 |
| JP | 11-175605 | 6/2001 |
| JP | 2001-175605 | 6/2001 |
| JP | 01-184472 | 7/2001 |
| JP | 01-290780 | 10/2001 |
| JP | 01-312325 | 11/2001 |
| JP | 01-325387 | 11/2001 |
| JP | 01-331229 | 11/2001 |
| JP | 01-338233 | 12/2001 |
| JP | 2001-344437 | 12/2001 |
| JP | 2002-072876 | 3/2002 |
| JP | 2002-077149 | 3/2002 |
| JP | 02-108478 | 4/2002 |
| JP | 02-108870 | 4/2002 |
| JP | 02-164880 | 6/2002 |
| JP | 2002-169719 | 6/2002 |
| JP | 2002-169726 | 6/2002 |
| JP | 2002-183352 | 6/2002 |
| JP | 2002-207426 | 7/2002 |
| JP | 2002-215465 | 8/2002 |
| JP | 2002-297816 | 10/2002 |
| JP | 2002-324170 | 11/2002 |
| JP | 02-374327 | 12/2002 |
| JP | 2002-359616 | 12/2002 |
| JP | 2003-030150 | 1/2003 |
| JP | 03-507785 | 2/2003 |
| JP | 2003-101526 | 4/2003 |
| JP | 03-140761 | 5/2003 |
| JP | 03-140762 | 5/2003 |
| JP | 03-157335 | 5/2003 |
| JP | 3 421 950 | 6/2003 |
| JP | 2003-173381 | 6/2003 |
| JP | 03-208314 | 7/2003 |
| JP | 03-248522 | 9/2003 |
| JP | 03-296487 | 10/2003 |
| JP | 2003-309545 | 10/2003 |
| JP | 2003-323224 | 11/2003 |
| JP | 02-182562 | 1/2004 |
| JP | 04-038974 | 2/2004 |
| JP | 04-062561 | 2/2004 |
| JP | 2004-054937 | 2/2004 |
| JP | 2004-056794 | 2/2004 |
| JP | 2004/062890 | 2/2004 |
| JP | 04-118327 | 4/2004 |
| JP | 2004-102789 | 4/2004 |
| JP | 2004-507124 | 4/2004 |
| JP | 04-164491 | 6/2004 |
| JP | 04-295846 | 10/2004 |
| JP | 04-304755 | 10/2004 |
| JP | 2004-534291 | 11/2004 |
| JP | 07-525774 | 9/2007 |
| JP | 08-054952 | 2/2011 |
| KR | 239865 | 1/2000 |
| KR | 2001/0000805 | 1/2001 |
| KR | 239 865 | 10/2001 |
| KR | 2002/0037453 | 5/2002 |
| KR | 2005/0008439 | 1/2005 |
| KR | 2005/0021782 | 3/2005 |
| NZ | 286 668 | 10/1996 |
| RU | 2147790 | 4/2000 |
| WO | 93/01550 | 1/1993 |
| WO | WO 93/01550 | 1/1993 |
| WO | 93/13013 | 5/1996 |
| WO | WO 96/23013 | 5/1996 |
| WO | 96/24092 | 8/1996 |
| WO | 96/27155 | 9/1996 |
| WO | WO 97/21162 | 6/1997 |
| WO | 97/43761 | 11/1997 |
| WO | WO 98/02793 | 1/1998 |
| WO | 98/09209 | 3/1998 |
| WO | 98/10381 | 3/1998 |
| WO | WO 98/10381 | 3/1998 |
| WO | WO 98/11478 | 3/1998 |
| WO | 98/21679 | 5/1998 |
| WO | WO 98/21683 | 5/1998 |
| WO | 98/24037 | 6/1998 |
| WO | WO 98/33106 | 7/1998 |
| WO | 98/37481 | 8/1998 |
| WO | 98/58306 | 8/1998 |
| WO | 98/42098 | 9/1998 |
| WO | WO 98/42098 | 9/1998 |
| WO | WO 98/47259 | 10/1998 |
| WO | 9858306 | 12/1998 |
| WO | WO 99/04328 | 1/1999 |
| WO | 99/15970 | 4/1999 |
| WO | WO 99/15970 | 4/1999 |
| WO | 99/53689 | 10/1999 |
| WO | WO 99/53689 | 10/1999 |
| WO | 00/08909 | 2/2000 |
| WO | 00/15221 | 3/2000 |
| WO | 00/21239 | 4/2000 |
| WO | 00/42492 | 7/2000 |
| WO | WO 00/54126 | 9/2000 |
| WO | WO 00/57637 | 9/2000 |
| WO | 00/58811 | 10/2000 |
| WO | 00/59150 | 10/2000 |
| WO | WO 00/57684 | 10/2000 |
| WO | WO 00/58810 | 10/2000 |
| WO | WO 00/58859 | 10/2000 |
| WO | WO 00/59152 | 10/2000 |
| WO | 00/68763 | 11/2000 |
| WO | 01/22268 | 3/2001 |
| WO | 01/22651 | 3/2001 |
| WO | 01/33867 | 5/2001 |
| WO | WO 01/35293 | 5/2001 |
| WO | 01/44908 | 6/2001 |
| WO | 01/46783 | 6/2001 |
| WO | WO 01/43342 | 6/2001 |
| WO | WO 01/45012 | 6/2001 |
| WO | 01/52021 | 7/2001 |
| WO | WO 01/52018 | 7/2001 |
| WO | WO 01/52020 | 7/2001 |
| WO | WO 01/63512 | 8/2001 |
| WO | WO 01/77795 | 10/2001 |
| WO | WO 01/78303 | 10/2001 |
| WO | WO 01/93461 | 12/2001 |
| WO | 02/01335 | 1/2002 |
| WO | WO 02/08969 | 1/2002 |
| WO | 02/23314 | 3/2002 |
| WO | 02/23315 | 3/2002 |
| WO | WO 02/19598 | 3/2002 |
| WO | 02/37371 | 5/2002 |
| WO | WO 02/056155 | 7/2002 |
| WO | 02/073378 | 9/2002 |
| WO | 02/086684 | 10/2002 |
| WO | WO 02/080442 | 10/2002 |
| WO | 02/097693 | 12/2002 |
| WO | WO 02/103495 | 12/2002 |
| WO | WO 03/009115 | 1/2003 |
| WO | WO 03/030434 | 4/2003 |
| WO | WO 03/073688 | 9/2003 |
| WO | WO 03/079269 | 9/2003 |
| WO | 03/090101 | 10/2003 |
| WO | 2008/090101 | 10/2003 |
| WO | WO 03/107585 | 12/2003 |
| WO | WO 03/107588 | 12/2003 |
| WO | 2004/023717 | 3/2004 |
| WO | 2004/030364 | 4/2004 |
| WO | WO 2004/092886 | 10/2004 |
| WO | WO 2005/109202 | 11/2005 |

(56) References Cited

FOREIGN PATENT DOCUMENTS

| WO | 2005/122047 | 12/2005 |
|---|---|---|
| WO | 2006/065012 | 6/2006 |
| WO | WO 2007/032974 | 3/2007 |

OTHER PUBLICATIONS

United States Advisory Action mailed Feb. 15, 2005, in U.S. Appl. No. 09/482,840 (3 pages).
United States Advisory Action mailed Mar. 21, 2006, in U.S. Appl. No. 11/117,590 (3 pages).
United States Advisory Action mailed Apr. 27, 2005, in U.S. Appl. No. 09/482,932 (2 pages).
United States Advisory Action mailed May 16, 2007, in U.S. Appl. No. 11/117,590 (3 pages).
United States Advisory Action mailed Aug. 1, 2008, in U.S. Appl. No. 10/831,280 (2 pages).
United States Advisory Action mailed Sep. 23, 2011, in U.S. Appl. No. 10/971,346 (4 pages).
United States Advisory Action mailed Nov. 25, 2003, in U.S. Appl. No. 09/482,932 (3 pages).
United States Amendment filed Jan. 10, 2005, in U.S. Appl. No. 09/482,725 (11 pages).
United States Amendment filed Jan. 11, 2008, in U.S. Appl. No. 11/353,321 (13 pages).
United States Amendment filed Jan. 11, 2011, in U.S. Appl. No. 10/831,280 (18 pages).
United States Amendment filed Jan. 16, 2008, in U.S. Appl. No. 10/831,280 (16 pages).
United States Amendment filed Jan. 18, 2011, in U.S. Appl. No. 11/116,884 (12 pages).
United States Amendment filed Jan. 20, 2004, in U.S. Appl. No. 09/482,928 (20 pages).
United States Amendment filed Jan. 21, 2005, in U.S. Appl. No. 09/482,840 (13 pages).
United States Amendment filed Jan. 21, 2009, in U.S. Appl. No. 11/018,095 (9 pages).
United States Amendment filed Jan. 22, 2008, in U.S. Appl. No. 10/831,281 (15 pages).
United States Amendment filed Jan. 22, 2009, in U.S. Appl. No. 11/116,884 (10 pages).
United States Amendment filed Feb. 1, 2007, in U.S. Appl. No. 10/830,632 (9 pages).
United States Amendment filed Feb. 6, 2009, in U.S. Appl. No. 11/117,590 (10 pages).
United States Amendment filed Feb. 16, 2006, in U.S. Appl. No. 11/117,590 (20 pages).
United States Amendment filed Feb. 17, 2011, in U.S. Appl. No. 10/971,346 (31 pages).
United States Amendment filed Feb. 22, 2005, in U.S. Appl. No. 09/482,843 (14 pages).
United States Amendment filed Feb. 23, 2004, in U.S. Appl. No. 09/290,363 (34 pages).
United States Amendment filed Feb. 23, 2009, in U.S. Appl. No. 11/388,403 (14 pages).
United States Amendment filed Feb. 25, 2010, in U.S. Appl. No. 11/116,884 (13 pages).
United States Amendment filed Mar. 2, 2009, in U.S. Appl. No. 10/831,281 (26 pages).
United States Amendment filed Mar. 11, 2008, in U.S. Appl. No. 10/976,463 (13 pages).
United States Amendment filed Mar. 14, 2005, in U.S. Appl. No. 10/208,139 (9 pages).
United States Amendment filed Mar. 22, 2006, in U.S. Appl. No. 09/290,363 (31 pages).
United States Amendment filed Mar. 24, 2009, in U.S. Appl. No. 11/353,321 (20 pages).
United States Amendment filed Mar. 26, 2012, in U.S. Appl. No. 10/971,346 (18 pages).
United States Amendment filed Mar. 28, 2011, in U.S. Appl. No. 11/018,095 (10 pages).
United States Amendment filed Apr. 9, 2008, in U.S. Appl. No. 11/048,194 (7 pages).
United States Amendment filed Apr. 11, 2005, in U.S. Appl. No. 09/482,932 (19 pages).
United States Amendment filed Apr. 15, 2011, in U.S. Appl. No. 11/116,884 (13 pages).
United States Amendment filed Apr. 21, 2003, in U.S. Appl. No. 09/482,840 (15 pages).
United States Amendment filed Apr. 22, 2003, in U.S. Appl. No. 09/290,363 (46 pages).
United States Amendment filed Apr. 27, 2005, in U.S. Appl. No. 09/482,840 (20 pages).
United States Amendment filed Apr. 27, 2007, in U.S. Appl. No. 11/117,590 (13 pages).
United States Amendment filed Apr. 28, 2008, in U.S. Appl. No. 11/353,321 (14 pages).
United States Amendment filed May 4, 2009, in U.S. Appl. No. 10/831,280 (16 pages).
United States Amendment filed May 5, 2009, in U.S. Appl. No. 11/018,095 (10 pages).
United States Amendment filed May 12, 2005, in U.S. Appl. No. 09/482,932 (19 pages).
United States Amendment filed May 12, 2010, in U.S. Appl. No. 10/971,346 (12 pages).
United States Amendment filed May 15, 2003, in U.S. Appl. No. 09/482,932 (4 pages).
United States Amendment filed May 17, 2010, in U.S. Appl. No. 11/018,095 (10 pages).
United States Amendment filed May 21, 2003, in U.S. Appl. No. 09/482,843 (13 pages).
United States Amendment filed May 27, 2004, in U.S. Appl. No. 09/482,725 (40 pages).
United States Amendment filed Jun. 13, 2007, in U.S. Appl. No. 10/976,463 (17 pages).
United States Amendment filed Jun. 13, 2008, in U.S. Appl. No. 10/968,462 (11 pages).
United States Amendment filed Jun. 15, 2007, in U.S. Appl. No. 11/117,590 (12 pages).
United States Amendment filed Jun. 25, 2008, in U.S. Appl. No. 11/018,095 (10 pages).
United States Amendment filed Jun. 29, 2010, in U.S. Appl. No. 10/831,280 (18 pages).
United States Amendment filed Jul. 8, 2005, in U.S. Appl. No. 09/482,725 (48 pages).
United States Amendment filed Jul. 9, 2008, in U.S. Appl. No. 11/388,365 (18 pages).
United States Amendment filed Jul. 13, 2009, in U.S. Appl. No. 11/116,884 (13 pages).
United States Amendment filed Jul. 16, 2008, in U.S. Appl. No. 10/831,280 (16 pages).
United States Amendment filed Jul. 17, 2006, in U.S. Appl. No. 09/482,843 (17 pages).
United States Amendment filed Jul. 26, 2004, in U.S. Appl. No. 09/482,840 (9 pages).
United States Amendment filed Jul. 28, 2005, in U.S. Appl. No. 09/482,840 (22 pages).
United States Amendment filed Aug. 6, 2008, in U.S. Appl. No. 10/831,281 (20 pages).
United States Amendment filed Aug. 11, 2004, in U.S. Appl. No. 09/482,843 (10 pages).
United States Amendment filed Aug. 11, 2010, in U.S. Appl. No. 11/116,884 (13 pages).
United States Amendment filed Aug. 20, 2009, in U.S. Appl. No. 11/117,590 (2 pages).
United States Amendment filed Aug. 31, 2005, in U.S. Appl. No. 09/482,932 (21 pages).
United States Amendment filed Sep. 6, 2011, in U.S. Appl. No. 10/971,346 (48 pages).
United States Amendment filed Sep. 9, 2008, in U.S. Appl. No. 10/976,463 (14 pages).

(56) References Cited

OTHER PUBLICATIONS

United States Amendment filed Sep. 9, 2011, in U.S. Appl. No. 11/018,095 (11 pages).
United States Amendment filed Sep. 15, 2009, in U.S. Appl. No. 10/971,346 (12 pages).
United States Amendment filed Sep. 20, 2010, in U.S. Appl. No. 10/971,346 (39 pages).
United States Amendment filed Sep. 22, 2003, in U.S. Appl. No. 09/482,928 (20 pages).
United States Amendment filed Sep. 24, 2004, in U.S. Appl. No. 09/482,932 (12 pages).
United States Amendment filed Sep. 25, 2006, in U.S. Appl. No. 11/117,590 (14 pages).
United States Amendment filed Sep. 26, 2005, in U.S. Appl. No. 11/117,590 (17 pages).
United States Amendment filed Sep. 26, 2011, in U.S. Appl. No. 10/971,346 (10 pages).
United States Amendment filed Oct. 3, 2001, in U.S. Appl. No. 09/290,363 (26 pages).
United States Amendment filed Oct. 8, 2010, in U.S. Appl. No. 11/018,095 (7 pages).
United States Amendment filed Oct. 9, 2009, in U.S. Appl. No. 11/353,321 (22 pages).
United States Amendment filed Oct. 14, 2008, in U.S. Appl. No. 10/831,280 (16 pages).
United States Amendment filed Oct. 24, 2007, in U.S. Appl. No. 10/976,463 (13 pages).
United States Amendment filed Oct. 30, 2003, in U.S. Appl. No. 09/482,932 (25 pages).
United States Amendment filed Nov. 6, 2003, in U.S. Appl. No. 09/482,843 (16 pages).
United States Amendment filed Nov. 18, 2005, in U.S. Appl. No. 09/290,363 (31 pages).
United States Amendment filed Nov. 20, 2007, in U.S. Appl. No. 09/482,843 (9 pages).
United States Amendment filed Nov. 23, 2009, in U.S. Appl. No. 10/831,280 (18 pages).
United States Amendment filed Dec. 3, 2008, in U.S. Appl. No. 10/971,346 (12 pages).
United States Amendment filed Dec. 5, 2011, in U.S. Appl. No. 11/018,095 (9 pages).
United States Amendment filed Dec. 6, 2011, in U.S. Appl. No. 11/116,884 (11 pages).
United States Amendment filed Dec. 7, 2007, in U.S. Appl. No. 11/117,590 (16 pages).
United States Amendment filed Dec. 26, 2006, in U.S. Appl. No. 09/482,843 (13 pages).
United States Amendment filed Apr. 26, 2010, in U.S. Appl. No. 11/353,321 (22 pages).
United States Final Office Action mailed Jan. 11, 2005, in U.S. Appl. No. 09/482,932 (21 pages).
United States Final Office Action mailed Jan. 26, 2009, in U.S. Appl. No. 11/353,321 (11 pages).
United States Final Office Action mailed Jan. 26, 2010, in U.S. Appl. No. 11/353,321 (13 pages).
United States Final Office Action mailed Feb. 3, 2009, in U.S. Appl. No. 11/388,365 (13 pages).
United States Final Office Action mailed Feb. 28, 2007, in U.S. Appl. No. 11/117,590 (12 pages).
United States Final Office Action mailed Mar. 15, 2010, in U.S. Appl. No. 11/018,095 (8 pages).
United States Final Office Action mailed Mar. 18, 2009, in U.S. Appl. No. 10/971,346 (14 pages).
United States Final Office Action mailed Apr. 16, 2008, in U.S. Appl. No. 10/831,280 (21 pages).
United States Final Office Action mailed Apr. 22, 2011, in U.S. Appl. No. 10/971,346 (22 pages).
United States Final Office Action mailed May 24, 2005, in U.S. Appl. No. 10/208,139 (7 pages).
United States Final Office Action mailed Jun. 9, 2011, in U.S. Appl. No. 11/018,095 (10 pages).
United States Final Office Action mailed Jun. 10, 2009, in U.S. Appl. No. 11/388,403 (9 pages).
United States Final Office Action mailed Jun. 30, 2008, in U.S. Appl. No. 10/976,463 (20 pages).
United States Final Office Action mailed Jul. 8, 2008, in U.S. Appl. No. 11/048,194 (7 pages).
United States Final Office Action mailed Jul. 8, 2011, in U.S. Appl. No. 11/116,884 (15 pages).
United States Final Office Action mailed Jul. 22, 2010, in U.S. Appl. No. 10/971,346 (16 pages).
United States Final Office Action mailed Jul. 30, 2003, in U.S. Appl. No. 09/482,932 (22 pages).
United States Final Office Action mailed Aug. 7, 2008, in U.S. Appl. No. 11/117,590 (10 pages).
United States Final Office Action mailed Aug. 12, 2003, in U.S. Appl. No. 09/482,843 (26 pages).
United States Final Office Action mailed Aug. 20, 2009, in U.S. Appl. No. 10/831280 (26 pages).
United States Final Office Action mailed Aug. 24, 2007, in U.S. Appl. No. 10/976,463 (26 pages).
United States Final Office Action mailed Sep. 15, 2010, in U.S. Appl. No. 10/831,280 (19 pages).
United States Final Office Action mailed Oct. 21, 2008, in U.S. Appl. No. 11/018,095 (12 pages).
United States Final Office Action mailed Oct. 24, 2006, in U.S. Appl. No. 09/482,843 (15 pages).
United States Final Office Action mailed Oct. 28, 2004, in U.S. Appl. No. 09/482,840 (19 pages).
United States Final Office Action mailed Oct. 28, 2010, in U.S. Appl. No. 11/116,884 (14 pages).
United States Final Office Action mailed Nov. 7, 2005, in U.S. Appl. No. 09/290,363 (6 pages).
United States Final Office Action mailed Nov. 16, 2004, in U.S. Appl. No. 09/482,843 (4 pages).
United States Final Office Action mailed Nov. 25, 2011, in U.S. Appl. No. 10/971,346 (19 pages).
United States Final Office Action mailed Nov. 27, 2009, in U.S. Appl. No. 11/116,884 (17 pages).
United States Final Office Action mailed Dec. 2, 2008, in U.S. Appl. No. 10/831,281 (11 pages).
United States Final Office Action mailed Dec. 20, 2005, in U.S. Appl. No. 11/117,590 (13 pages).
United States Non-Final Office Action mailed Jun. 13, 2008, in U.S. Appl. No. 10/971,346 (9 pages).
United States Non-Final Office Action mailed Jan. 9, 2008, in U.S. Appl. No. 11/048,194 (7 pages).
United States Non-Final Office Action mailed Jan. 16, 2003, in U.S. Appl. No. 09/482,840 (17 pages).
United States Non-Final Office Action mailed Feb. 3, 2009, in U.S. Appl. No. 10/831,280 (25 pages).
United States Non-Final Office Action mailed Feb. 4, 2011, in U.S. Appl. No. 11/116,884 (13 pages).
United States Non-Final Office Action mailed Feb. 5, 2009, in U.S. Appl. No. 11/018,095 (13 pages).
United States Non-Final Office Action mailed Feb. 13, 2003, in U.S. Appl. No. 09/482,932 (22 pages).
United States Non-Final Office Action mailed Feb. 14, 2008, in U.S. Appl. No. 11/388,365 (14 pages).
United States Non-Final Office Action mailed Feb. 19, 2003, in U.S. Appl. No. 09/482,843 (16 pages).
United States Non-Final Office Action mailed Mar. 13, 2007, in U.S. Appl. No. 10/976,463 (11 pages).
United States Non-Final Office Action mailed Mar. 18, 2008, in U.S. Appl. No. 10/968,462 (10 pages).
United States Non-Final Office Action mailed Mar. 25, 2008, in U.S. Appl. No. 11/018,095 (14 pages).
United States Non-Final Office Action mailed Mar. 29, 2010, in U.S. Appl. No. 10/831,280 (16 pages).
United States Non-Final Office Action mailed Apr. 14, 2005, in U.S. Appl. No. 09/482,725 (9 pages).

(56) References Cited

OTHER PUBLICATIONS

United States Non-Final Office Action mailed Apr. 14, 2009, in U.S. Appl. No. 11/116,884 (12 pages).
United States Non-Final Office Action mailed Apr. 19, 2006, in U.S. Appl. No. 09/482,843 (23 pages).
United States Non-Final Office Action mailed May 6, 2008, in U.S. Appl. No. 10/831,281 (11 pages).
United States Non-Final Office Action mailed May 11, 2004, in U.S. Appl. No. 09/482,843 (19 pages).
United States Non-Final Office Action mailed May 12, 2010, in U.S. Appl. No. 11/116,884 (13 pages).
United States Non-Final Office Action mailed May 16, 2012, in U.S. Appl. No. 11/353,321 (15 pages).
United States Non-Final Office Action mailed May 18, 2004, in U.S. Appl. No. 09/482,840 (18 pages).
United States Non-Final Office Action mailed May 27, 2003, in U.S. Appl. No. 09/482,928 (11 pages).
United States Non-Final Office Action mailed May 29, 2012, in U.S. Appl. No. 13/274,217 (11 pages).
United States Non-Final Office Action mailed May 31, 2005, in U.S. Appl. No. 09/482,932 (20 pages).
United States Non-Final Office Action mailed Jun. 20, 2007, in U.S. Appl. No. 09/482,843 (6 pages).
United States Non-Final Office Action mailed Jun. 21, 2004, in U.S. Appl. No. 09/482,932 (23 pages).
United States Non-Final Office Action mailed Jun. 30, 2006, in U.S. Appl. No. 11/117,590 (13 pages).
United States Non-Final Office Action mailed Jul. 5, 2005, in U.S. Appl. No. 11/117,590 (12 pages).
United States Non-Final Office Action mailed Jul. 8, 2010, in U.S. Appl. No. 11/018,095 (9 pages).
United States Non-Final Office Action mailed Jul. 9, 2009, in U.S. Appl. No. 11/353,321 (12 pages).
United States Non-Final Office Action mailed Aug. 19, 2009, in U.S. Appl. No. 11/018,095 (10 pages).
United States Non-Final Office Action mailed Sep. 7, 2007, in U.S. Appl. No. 11/117,590 (13 pages).
United States Non-Final Office Action mailed Sep. 27, 2011, in U.S. Appl. No. 11/018,095 (5 pages).
United States Non-Final Office Action mailed Oct. 5, 2007, in U.S. Appl. No. 11/353,321 (9 pages).
United States Non-Final Office Action mailed Oct. 13, 2004, in U.S. Appl. No. 09/482,725 (9 pages).
United States Non-Final Office Action mailed Oct. 16, 2007, in U.S. Appl. No. 10/831,280 (19 pages).
United States Non-Final Office Action mailed Oct. 18, 2007, in U.S. Appl. No. 10/831,281 (12 pages).
United States Non-Final Office Action mailed Oct. 12, 2008, in U.S. Appl. No. 11/388,403 (8 pages).
United States Non-Final Office Action mailed Oct. 22, 2008, in U.S. Appl. No. 11/116,884 (10 pages).
United States Non-Final Office Action mailed Nov. 1, 2006, in U.S. Appl. No. 10/830,632 (21 pages).
United States Non-Final Office Action mailed Nov. 12, 2009, in U.S. Appl. No. 10/971,346 (14 pages).
United States Non-Final Office Action mailed Nov. 26, 2010, in U.S. Appl. No. 10/971,346 (14 pages).
United States Non-Final Office Action mailed Dec. 11, 2007, in U.S. Appl. No. 10/976,463 (22 pages).
United States Non-Final Office Action mailed Dec. 14, 2004, in U.S. Appl. No. 10/208,139 (6 pages).
United States Non-Final Office Action mailed Dec. 27, 2010, in U.S. Appl. No. 11/018,095 (8 pages).
United States Non-Final Office Action mailed Jan. 17, 2003, in U.S. Appl. No. 09/290,363 (23 pages).
United States Non-Final Office Action mailed Apr. 24, 2001, in U.S. Appl. No. 09/290,363 (28 pages).
United States Notice of Allowance mailed Feb. 14, 2002, in U.S. Appl. No. 09/290,363 (8 pages).
United States Notice of Allowance mailed Feb. 17, 2010, in U.S. Appl. No. 11/117,590 (15 pages).
United States Notice of Allowance mailed Mar. 7, 2012, in U.S. Appl. No. 11/116,884 (8 pages).
United States Notice of Allowance mailed Mar. 22, 2006, in U.S. Appl. No. 09/290,363 (8 pages).
United States Notice of Allowance mailed Mar. 23, 2009, in U.S. Appl. No. 10/831,281 (8 pages).
United States Notice of Allowance mailed Mar. 31, 2005, in U.S. Appl. No. 09/482,928 (9 pages).
United States Notice of Allowance mailed Apr. 2, 2008, in U.S. Appl. No. 09/482,843 (6 pages).
United States Notice of Allowance mailed Apr. 6, 2006, in U.S. Appl. No. 09/482,725 (7 pages).
United States Notice of Allowance mailed May 3, 2007, in U.S. Appl. No. 10/830,632 (13 pages).
United States Notice of Allowance mailed Jun. 11, 2009, in U.S. Appl. No. 11/117,590 (15 pages).
United States Notice of Allowance mailed Jun. 27, 2011, in U.S. Appl. No. 10/831,280 (7 pages).
United States Notice of Allowance mailed Jun. 27, 2012, in U.S. Appl. No. 11/018,095 (7 pages).
United States Notice of Allowance mailed Jun. 24, 2008, in U.S. Appl. No. 10/968,462 (10 pages).
United States Notice of Allowance mailed Sep. 26, 2008, in U.S. Appl. No. 10/976,463 (8 pages).
United States Notice of Allowance mailed Dec. 2, 2005, in U.S. Appl. No. 09/482,725 (6 pages).
United States Notice of Allowance mailed Dec. 6, 2005, in U.S. Appl. No. 09/482,932 (8 pages).
United States Notice of Allowance mailed Dec. 9, 2005, in U.S. Appl. No. 09/482,840 (11 pages).
United States Notice of Allowance mailed Dec. 14, 2011, in U.S. Appl. No. 11/116,884 (7 pages).
United States Notice of Allowance mailed Dec. 30, 2011, in U.S. Appl. No. 11/018,095 (10 pages).
United States Supplemental Amendment filed Jan. 21, 2005, in U.S. Appl. No. 09/482,725 (5 pages).
United States Supplemental Amendment filed Jan. 31, 2008, in U.S. Appl. No. 11/117,590 (18 pages).
United States Supplemental Amendment filed Jun. 16, 2003, in U.S. Appl. No. 09/482,725 (3 pages).
United States Supplemental Amendment filed Sep. 12, 2005, in U.S. Appl. No. 09/482,843 (5 pages).
United States Supplemental Amendment filed Nov. 16, 2006, in U.S. Appl. No. 11/117,590 (14 pages).
United States Supplemental Amendment filed Dec. 10, 2003, in U.S. Appl. No. 09/482,725 (51 pages).
Australian Examination Response filed Aug. 21, 2009, in Australian Application No. 200400461 (26 pgs).
Australian First Report on Patent Action mailed May 22, 2009, in Australian Application No. 200400461 (2 pgs).
Australian Notice of Acceptance mailed Nov. 12, 2009, in Australian Application No. 2004200471 (3 pgs).
Australian Notice of Acceptance mailed Sep. 4, 2009, in Australian Application No. 2004200461 (3 pgs).
Australian Office Action mailed Aug. 27, 2009, in Australian Application No. 2004200471 (2 pgs).
Chinese Noitce on First Office Action mailed Feb. 6, 2009, in Chinese Application No. 200410007610 (11 pgs).
Chinese Notice on First Office Action mailed Feb. 6, 2009, in Chinese Patent Application No. 200410005380.4 (9 pgs).
Chinese Notice on Grant of Patent Right for Invention mailed Jul. 24, 2009, in Chinese Patent Application No. 200410005380.4 (4 pgs).
Chinese Notice on the First Action mailed Nov. 23, 2011, in Chinese Application No. 200910139429.8 (7 pgs).
Chinese Response to First Office Action mailed Feb. 6, 2009, in Chinese Patent Application No. 200410005380.4, filed Jun. 5, 2009 (12 pgs).
*Digital Media Solutions: Secure Streaming.* OrnniWeb, http://www.omniweb.com/dms.html#stream (3 pgs).
European Communication mailed Feb. 15, 2005, in European Patent Application No. 03013569.3 (4 pgs).

(56) References Cited

OTHER PUBLICATIONS

European Communication mailed Feb. 15, 2006, in European Patent Application No. 03013569.3 (7 pgs).
European Communication mailed Jan. 17, 2011, in European Application No. 03013556 (4 pgs).
European Communication mailed Jun. 6, 2006, in European Application No. 04003033.0 (3 pgs).
European Communication mailed Jun. 6, 2007, in European Application No. 03013556 (4 pgs).
European Communication mailed Mar. 18, 2005, in European Application No. 04001954.9 (3 pgs).
European Decision to Refuse a European Patent Application mailed Mar. 4, 2006, in European Application No. 04001954.9 (31 pgs).
European Decision to Refuse European Patent Application mailed Apr. 25, 2007, in European Patent Application No. 03013569.3 (21 pgs).
European Letter in Response to the Summons dated Nov. 22, 2006 to Attend Oral Proceedings, mailed Feb. 22, 2007, in European Patent Application No. 03013569.3 (22 pgs)*.
European Partial Search Report filed Feb. 20, 2006, in European Application No. 03013556 (5 pgs).
European Reply to Communication filed May 24, 2011, in European Application No. 03013556 (16 pgs).
European Reply to Communication filed Oct. 16, 2007, in European Application No. 03013556 (25 pgs).
European Response to Communication dated Mar. 18, 2005, in European Application No. 04001954.9, filed May 24, 2005 (17 pgs).
European Response to Official Communication dated Feb. 15, 2006, filed Aug. 25, 2006 in European Patent Application No. 03013569.3 (18 pgs).
European Response to Official Communication dated Feb. 17, 2005, filed Jun. 27, 2005 in European Patent Application No. 03013569.3 (27 pgs).
European Response to Summons dated Sep. 23, 2010, in European Application No. 04001954.9. filed Dec. 14, 2010 (14 pgs).
European Response to Summons to Attend Oral Proceedings mailed Oct. 4, 2005, in European Application No. 04001954.9, filed Nov. 17, 2005 (5 pgs).
European Search Report dated Jul. 27, 2004 in European Application No. 04001954.9 (2 pgs).
European Search Report filed Aug. 2, 2004, in European Application No. 03013569.3 (4 pgs).
European Search Report filed Oct. 25, 2006, in European Application No. 03013556 (7 pgs).
European Search Report mailed Sep. 26, 2005, in European Application No. 04003033.0 (4 pgs).
European Summons to Attend Oral Proceedings mailed Oct. 4, 2005, in European Application No. 04001954.9 (30 pgs).
Evans, P. "DRM: Is the Road to Adoption Fraught with Potholes?" Seybold Reporting Analyzing Publishing Technologies, 2001, 1(14), 32.
*Features of Windows Media DRM*. www.microsoft.com/windows/windowsmedia/drm/features.aspx.
Fowler, T.B. "Technology's Changing Role in Intellectual Property Rights", IT Professional(IEEE), 2002, 4(2), 39-44.
Gable, J. "The Digital Rights Conundrum", Transform Magazine, 2001, 10(11), 27.
Griswold, G.N. "A Method for Protecting Copyright on Networks", IMA Intellectual Property Project Proceedings, 1994, 1(1), 169-178.
Gunter, C.A., et al. "Models and Languages for Digital Rights", Proceedings of the 34.sup.th Annual Hawaii International Conference on System Sciences, 2001, 1-5.
Hanai, Hiroyuki; "Latest Information and Establishment of a Server-Setting Up Free BSD-", Unix User, vol. 11, No. 3, pp. 93-100, etc., Softbank Publishing Co., Ltd., Japan, Mar. 1, 2002. [Partial English Translation].
*How Windows Rights Management Works* (*Illustration*). posted Mar. 17, 2003, http://directionsmicrosft.com/sample/DOMIS/update/2003/04apr/0403rrmctte_illo.htm (5 pgs).
Hwang, C. et al., "Protection of Digital Contents on Distributed Multimedia Environment", Proceedings of the IASTED International Conference, Internet and Multimedia Systems and Applications, Nov. 19-23, 2000, Las Vegas, Nevada, USA, pp. 127-132.
India First Examination Report mailed Aug. 30, 2011, in India Application No. 167/MUM/2004 (3 pgs).
Japanese Amendment filed Mar. 5, 2009, in Japanese Patent Application No. 2003-183597 (9 pgs).
Japanese Final Rejection mailed on Sep. 21, 2010, in Japanese Patent Application No. 2004-035810 (4 pgs).
Japanese Notice of Allowance mailed May 13, 2011, in Japanese Patent Application No. 2003-183597 (6 pgs).
Japanese Notice of Allowance mailed Oct. 18, 2010, in Japanese Patent Application No. 2004-050478 (6 pgs).
Japanese Notice of Allowance mailed Oct. 30, 2009, in Japanese Patent Application No. 2003-183597 (6 pgs).
Japanese Notice of Rejection mailed Dec. 1, 2009, in Japanese Patent Application No. 2003-183596 (7 pgs).
Japanese Notice of Rejection mailed Dec. 10, 2010, in Japanese Patent Application No. 2003-183596 (8 pgs).
Japanese Notice of Rejection mailed on Jun. 1, 2010, in Japanese Patent Application No. 2004-035810 (5 pgs).
Japanese Notice of Rejection mailed on May 28, 2010, in Japanese Application No. 2004050478 (5 pgs).
Japanese Notice of Rejection mailed on Sep. 17, 2010, in Japanese Application No. 2004-050478 (3 pgs).
Japanese Official Notice of Rejection mailed on Dec. 5, 2008, in Japanese Patent Application No. 2003-183597 (143 pgs).
Japanese Response filed Apr. 22, 2011, in Japanese Patent Application No. 2003-183596 (30 pgs).
Japanese Response filed Mar. 1, 2010, in Japanese Patent Application No. 2003-183596 (18 pgs).
Kahn, R.E. "Deposit, Registration and Recordation in an Electronic Copyright Management System", IMA Intellectual Property Project Proceedings, 1994, 1(1), 111-120.
Kington, "Manage digital rights with the OMA", IBM, Jul. 27, 2004, http://www.-106.ibm.com/developer.works/wireless/library/wi-drm.html, 4 pgs.
Korean Amendment filed Jan. 31, 2011, in Korean Patent Application No. 10-2004-0009030 (20 pgs.).
*License Management is Fundamental, DRM Acts as an Impregnable Defense, the Last Stronghold is a Dedicated-Viewer*. Nikkei Internet Technology, Nikkei Business Publications, Inc., Dec. 2001 issue, pp. 34 to 39, Japan, Nov. 22, 2001.
*Managing digital rights in online publishing*. Information Management & Technology, 2001, 34(4), 168-169.
Oda, Hiroharu; "The Basics and Application of Security IC Cards - Passport to an e-business-", 1st Ed., pp. 143-144, etc., C.media Co., Ltd., Apr. 27, 2000. [Partial English Translation].
Peinado, M. "Digital rights management in a multimedia environment", SMPTE Journal, 2002, 111(3), 159-163.
*Protecting Content with Digital Rights Management*. www.intelligraphics.com/articles/WDMaudiodesign_article.html
*Realnetworks Announces Helix Drm—The First Major Digital Rights Management Platform for Both Standards-Based and Internet Formats*. http://www.realnetworks.como/company/press/releases/2003/helixdrm.html, 3 pgs.
*Rights Management Comes to the Enterprise: Rights Management Beyond Digital Media*, by Matt Rosoff, posted Mar. 17, 2003 http://directionsonmicrosoft.com/sample/DOMIS/update/2003/04apr/0403rmctte.htm.
Royan, B. Content creation and rights management; experiences of SCRAN(the Scottish Cultural Resources Access Network), Program, 2000, 34(2), 131-142.
Russian Official Action mailed Dec. 12, 2007, in Russian Patent Application No. 2004103872 (5 pgs).
Taiwan Notice of Allowance mailed Jul. 28, 2010, in Taiwanese Application No. 9310448 (4 pgs).
United States Advisory Action mailed Dec. 1, 2006, in U.S. Appl. No. 10/364,627.
United States Advisory Action mailed Dec. 3, 2008, in Appl. No. 10/185,511 (3 pgs).

(56) References Cited

OTHER PUBLICATIONS

United States Advisory Action mailed Dec. 5, 2006, in U.S. Appl. No. 10/185,527 (3 pgs).
United States Advisory Action mailed Feb. 12, 2009, in U.S. Appl. No. 11/108,038 (3 pgs).
United States Advisory Action mailed Jul. 9, 2007, in U.S. Appl. No. 10/373,621 (3 pgs).
United States Advisory Action mailed Jun. 26, 2009, in U.S. Appl. No. 11/107,709.
United States Advisory Action mailed Nov. 10, 2008, in U.S. Appl. No. 10/364,115 (3 pgs).
United States Advisory Action mailed Nov. 28, 2006, in U.S. Appl. No. 10/185,511 (3 pgs).
United States Advisory Action mailed Nov. 9, 2007, in U.S. Appl. No. 10/364,115 (3 pgs).
United States Advisory Office Action mailed Dec. 4, 2006, in U.S. Appl. No. 10/185,278.
United States Amendment After Notice of Allowance to Feb. 10, 2009 action, filed Mar. 16, 2009 in U.S. Appl. No. 10/185,278 (8 pgs).
United States Final Office Action mailed Apr. 16, 2008, in U.S. Appl. No. 11/179,206 (7 pgs).
United States Final Office Action mailed Apr. 18, 2007, in U.S. Appl. No. 10/373,621 (10 pgs).
United States Final Office Action mailed Aug. 20, 2007, in U.S. Appl. No. 10/364,115 (10 pgs).
United States Final Office Action mailed Aug. 21, 2007, in U.S. Appl. No. 10/185,511 (18 pgs).
United States Final Office Action mailed Aug. 22, 2008, in U.S. Appl. No. 10/185,511 (16 pgs).
United States Final Office Action mailed Aug. 24, 2007, in U.S. Appl. No. 10/185,278.
United States Final Office Action mailed Aug. 30, 2007, in U.S. Appl. No. 10/364,627.
United States Final Office Action mailed Feb. 12, 2009, in U.S. Appl. No. 11/107,014.
United States Final Office Action mailed Feb. 4, 2010, in U.S. Appl. No. 11/108,038.
United States Final Office Action mailed Jul. 12, 2011, in U.S. Appl. No. 12/053,090 (15 pgs).
United States Final Office Action mailed Mar. 16, 2010, in U.S. Appl. No. 11/107,709.
United States Final Office Action mailed Mar. 5, 2009, in U.S. Appl. No. 11/107,709.
United States Final Office Action mailed May 13, 2010, in U.S. Appl. No. 11/107,014.
United States Final Office Action mailed May 17, 2011, in U.S. Appl. No. 12/835,569 (25 pgs).
United States Final Office Action mailed Nov. 12, 2009, in U.S. Appl. No. 10/185,511 (26 pgs).
United States Final Office Action mailed Nov. 19, 2008, in U.S. Appl. No. 11/108,038.
United States Final Office Action mailed Nov. 19, 2009 in U.S. Appl. No. 11/134,719, 13 pgs.
United States Final Office Action mailed Nov. 19, 2009, in U.S. Appl. No. 11/134,719 (12 pgs).
United States Final Office Action mailed Nov. 24, 2009, in U.S. Appl. No. 10/364,115 (17 pgs).
United States Final Office Action mailed Sep. 1, 2006, in U.S. Appl. No. 10/364,627.
United States Final Office Action mailed Sep. 15, 2011, in U.S. Appl. No. 11/107,014.
United States Final Office Action mailed Sep. 19, 2006, in U.S. Appl. No. 10/185,278.
United States Final Office Action mailed Sep. 26, 2006, in U.S. Appl. No. 10/185,527 (16 pgs).
United States Final Office Action mailed Sep. 27, 2006, in U.S. Appl. No. 10/185,511 (15 pgs).
United States Final Office Action mailed Sep. 3, 2008, in U.S. Appl. No. 10/364,115 (13 pgs).
United States Non-Final Office Action mailed Apr. 14, 2008, in U.S. Appl. No. 10/793,997.
United States Non-Final Office Action mailed Aug. 18, 2006, in U.S. Appl. No. 10/373,458.
United States Non-Final Office Action mailed Aug. 18, 2008, in U.S. Appl. No. 11/107,709.
United States Non-Final Office Action mailed Aug. 7, 2008, in U.S. Appl. No. 11/108,038.
United States Non-Final Office Action mailed Aug. 9, 2007, in U.S. Appl. No. 11/179,206 (6 pgs).
United States Non-Final Office Action mailed Dec. 21, 2010, in U.S. Appl. No. 12/835,569 (19 pgs).
United States Non-Final Office Action mailed Feb. 10, 2009, in U.S. Appl. No. 10/364,115 (13 pgs).
United States Non-Final Office Action mailed Feb. 27, 2007, in U.S. Appl. No. 10/185,278.
United States Non-Final Office Action mailed Feb. 28, 2006, in U.S. Appl. No. 10/185,278.
United States Non-Final Office Action mailed Feb. 28, 2006, in U.S. Appl. No. 10/185,527 (18 pgs).
United States Non-Final Office Action mailed Jan. 10, 2008, in U.S. Appl. No. 10/185,278.
United States Non-Final Office Action mailed Jan. 14, 2009 in U.S. Appl. No. 11/134,719, 13 pgs.
United States Non-Final Office Action mailed Jan. 28, 2008, in U.S. Appl. No. 10/185,511 (15 pgs).
United States Non-Final Office Action mailed Jan. 31, 2007, in U.S. Appl. No. 10/373,458.
United States Non-Final Office Action mailed Jan. 8, 2008, in U.S. Appl. No. 10/364,627.
United States Non-Final Office Action mailed Jul. 17, 2008, in U.S. Appl. No. 10/185,278.
United States Non-Final Office Action mailed Jul. 27, 2009, in U.S. Appl. No. 11/108,038.
United States Non-Final Office Action mailed Jun. 6, 2006, in U.S. Appl. No. 10/373,621 (14 pgs).
United States Non-Final Office Action mailed Mar. 1, 2011, in U.S. Appl. No. 11/107,014.
United States Non-Final Office Action mailed Mar. 16, 2010, in U.S. Appl. No. 11/952,093 (5 pgs).
United States Non-Final Office Action mailed Mar. 30, 2009, in U.S. Appl. No. 10/185,511 (16 pgs).
United States Non-Final Office Action mailed Mar. 31, 2008, in U.S. Appl. No. 11/107,014.
United States Non-Final Office Action mailed Mar. 6, 2007, in U.S. Appl. No. 10/185,511 (17 pgs).
United States Non-Final Office Action mailed Mar. 7, 2008, in U.S. Appl. No. 10/364,115 (9 pgs).
United States Non-Final Office Action mailed Mar. 8, 2007, in U.S. Appl. No. 10/364,115 (9 pgs).
United States Non-Final Office Action mailed Mar. 9, 2006, in U.S. Appl. No. 10/185,511 (16 pgs).
United States Non-Final Office Action mailed May 11, 2010, in U.S. Appl. No. 10/185,511 (16 pgs).
United States Non-Final Office Action mailed May 15, 2007, in U.S. Appl. No. 10/364,627.
United States Non-Final Office Action mailed May 18, 2007, in U.S. Appl. No. 10/185,527 (15 pgs).
United States Non-Final Office Action mailed May 30, 2006, in U.S. Appl. No. 10/364,627.
United States Non-Final Office Action mailed Nov. 15, 2006, in U.S. Appl. No. 10/644,359.
United States Non-Final Office Action mailed Nov. 2, 2006, in U.S. Appl. No. 10/373,621 (9 pgs).
United States Non-Final Office Action mailed Oct. 1, 2007, in U.S. Appl. No. 10/793,997.
United States Non-Final Office Action mailed Oct. 31, 2008, in U.S. Appl. No. 11/179,206 (8 pgs).
United States Non-Final Office Action mailed Sep. 1, 2010, in U.S. Appl. No. 12/053,090 (14 pgs).
United States Non-Final Office Action mailed Sep. 18, 2008, in U.S. Appl. No. 10/364,627.

(56) References Cited

OTHER PUBLICATIONS

United States Non-Final Office Action mailed Sep. 23, 2009, in U.S. Appl. No. 11/107,709.
United States Non-Final Office Action mailed Sep. 24, 2006, in U.S. Appl. No. 10/364,115 (10 pgs).
United States Non-Final Office Action mailed Sep. 3, 2009, in U.S. Appl. No. 11/107,010.
United States Notice of Allowance mailed Dec. 26, 2007, in U.S. Appl. No. 10/373,621 (6 pgs).
United States Notice of Allowance mailed Feb. 10, 2009, in U.S. Appl. No. 10/185,278.
United States Notice of Allowance mailed Jul. 31, 2007, in U.S. Appl. No. 10/373,458.
United States Notice of Allowance mailed Jun. 1, 2007, in U.S. Appl. No. 10/644,359.
United States Notice of Allowance mailed May 11, 2009, in U.S. Appl. No. 10/364,627.
United States Notice of Allowance mailed May 14, 2009, in U.S. Appl. No. 11/179,206(6 pgs).
United States Notice of Allowance mailed Oct. 29, 2007, in U.S. Appl. No. 10/185,527 (13 pgs).
United States Notice of Allowance mailed Oct. 29, 2008, in U.S. Appl. No. 10/793,997.
United States Notice of Allowance mailed Sep. 24, 2010, in U.S. Appl. No. 10/185,511 (7 pgs).
United States Notice of Allowance mailed Septmeber 1, 2010, in U.S. Appl. No. 11/107,709.
United States Response to Apr. 1, 2011 action, filed Jun. 28, 2011 in U.S. Appl. No. 11/107,014 (11 pgs).
United States Response to Apr. 14, 2008 action, filed Jul. 15, 2008 in U.S. Appl. No. 10/793,997 (11 pgs).
United States Response to Apr. 16, 2008 office action, in U.S. Appl. No. 11/179,206, filed Oct. 15, 2008 (15 pgs).
United States Response to Apr. 18, 2007 office action, in U.S. Appl. No. 10/373,621, filed Jun. 18, 2007 (10 pgs).
United States Response to Apr. 18, 2007 office action, in U.S. Appl. No. 10/373,621, filed Sep. 17, 2007 (10 pgs).
United States Response to Aug. 18, 2006 action, filed Nov. 9, 2006 in U.S. Appl. No. 10/373,458 (19 pgs).
United States Response to Aug. 18, 2008 action, filed Nov. 18, 2008 in U.S. Appl. No. 11/107,709 (13 pgs).
United States Response to Aug. 20, 2007 office action, in U.S. Appl. No. No. 10/364,115, filed Oct. 22, 2007 (8 pgs).
United States Response to Aug. 21, 2007 action, filed Oct. 26, 2007 in U.S. Appl. No. 10/185,511 (15 pgs).
United States Response to Aug. 22, 2006 action, filed Nov. 19, 2008 in U.S. Appl. No. 10/185,511 (18 pgs).
United States Response to Aug. 24, 2007 action, filed Oct. 24, 2007 in U.S. Appl. No. 10/185,278 (8 pgs).
United States Response to Aug. 30, 2007 action, filed Oct. 16, 2007 in U.S. Appl. No. 10/364,627 (14 pgs).
United States Response to Aug. 7, 2008 office action, in U.S. Appl. No. 11/108,038, filed Nov. 6, 2008 (11 pgs).
United States Response to Aug. 9, 2007 office action, in U.S. Appl. No. 11/179,206, filed Janurary 9, 2008 (16 pgs).
United States Response to Dec. 21, 2010 office action, in U.S. Appl. No. 12/835,569, filed Mar. 21, 2011 (19 pgs).
United States Response to Feb. 10, 2009 office action, in U.S. Appl. No. 10/364,115, filed Jul. 7, 2009 (9 pgs).
United States Response to Feb. 12, 2009 action, filed Aug. 11, 2009 in U.S. Appl. No. 11/107,014 (11 pgs).
United States Response to Feb. 27, 2007 action, filed May 25, 2007 in U.S. Appl. No. 10/185,278 (9 pgs).
United States Response to Feb. 28, 2006 action, filed May 3, 2006 in U.S. Appl. No. 10/185,278 (20 pgs).
United States Response to Feb. 4, 2010 office action, in U.S. Appl. No. 11/108,038, filed May, 11 2010 (7 pgs).
United States Response to Jan. 10, 2008 action, filed Apr. 9, 2008 in U.S. Appl. No. 10/185,278 (11 pgs).
United States Response to Jan. 28, 2008 action, filed May 28, 2008 in U.S. Appl. No. 10/185,511 (16 pgs).
United States Response to Jan. 31, 2007 action, filed Apr. 30, 2007 in U.S. Appl. No. 10/373,458 (19 pgs).
United States Response to Jan. 8, 2008 action, filed May 8, 2008 in U.S. Appl. No. 10/364,627 (21 pgs).
United States Response to Jul. 12, 2011 office action, in U.S. Appl. No. 12/053,090, filed Nov. 14, 2011 (25 pgs).
United States Response to Jul. 17, 2008 action, filed Nov. 14, 2008 in U.S. Appl. No. 10/185,278 (14 pgs).
United States Response to Jul. 27, 2009 office action, in U.S. Appl. No. 11/108,038, filed Nov. 13, 2009 (8 pgs).
United States Response to Jun. 6, 2006 office action, in U.S. Appl. No. 10/373,621, filed Aug. 11, 2006 (16 pgs).
United States Response to Mar. 16, 2009 action, filed Jun. 7, 2010 in U.S. Appl. No. 11/107,709 (13 pgs).
United States Response to Mar. 30, 2009 action, filed Jun. 30, 2009 in U.S. Appl. No. 10/185,511 (18 pgs).
United States Response to Mar. 31, 2008 action, filed Sep. 29, 2008 in U.S. Appl. No. 11/107,014 (11 pgs).
United States Response to Mar. 5, 2009 action, filed Jun. 5, 2009 in U.S. Appl. No. 11/107,709 (13 pgs).
United States Response to Mar. 6, 2007 action, filed Jun. 5, 2007 in U.S. Appl. No. 10/185,511 (14 pgs).
United States Response to Mar. 7, 2008 office action, in U.S. Appl. No. 10/364,115, filed Jun. 9, 2008 (8 pgs).
United States Response to Mar. 8, 2007 office action, in U.S. Appl. No. 10/364,115, filed Jun. 8, 2007 (8 pgs).
United States Response to Mar. 9, 2006 action, filed Jun. 7, 2006 in U.S. Appl. No. 10/185,511 (20 pgs).
United States Response to May 11, 2010 action, filed Jul. 2, 2010 in U.S. Appl. No. 10/185,511 (22 pgs).
United States Response to May 13, 2010 action, filed Sep. 13, 2010 in U.S. Appl. No. 11/107,014 (11 pgs).
United States Response to May 15, 2007 action, filed Aug. 15, 2007 in U.S. Appl. No. 10/364,627 (14 pgs).
United States Response to May 17, 2011 office action, in U.S. Appl. No. 12/835,569, filed Sep. 19, 2011 (18 pgs).
United States Response to May 30, 2006 action, filed Aug. 11, 2006 in U.S. Appl. No. 10/364,627 (22 pgs).
United States Response to Nov. 12, 2009 action, filed Mar. 12, 2010 in U.S. Appl. No. 10/185,511 (19 pgs).
United States Response to Nov. 15, 2006 action, filed Feb. 15, 2007 in U.S. Appl. No. 10/644,359 (10 pgs).
United States Response to Nov. 19, 2008 office action, in U.S. Appl. No. 11/108,038, filed Jan. 23, 2009 (10 pgs).
United States Response to Nov. 19, 2008 office action, in U.S. Appl. No. 11/108,038, filed May, 12 2009 (6 pgs).
United States Response to Nov. 2, 2006 office action, in U.S. Appl. No. 10/373,621, filed Feb. 2, 2007 (9 pgs).
United States Response to Oct. 1, 2007 action, filed Dec. 28, 2007 in U.S. Appl. No. 10/793,997 (8 pgs).
United States Response to Oct. 31, 2008 office action, in U.S. Appl. No. 11/179,206, filed Mar. 31, 2009 (16 pgs).
United States Response to Office Action dated Feb. 28, 2006, filed May 10, 2006 in U.S. Appl. No. 10/185,527 (20 pgs).
United States Response to Office Action dated Jul. 14, 2009, filed Jul. 14, 2009 in U.S. Appl. No. 11/134,719, 11 pgs.
United States Response to Office Action dated May 18, 2007, filed Aug. 20, 2007 in U.S. Appl. No. 10/185,527 (13 pgs).
United States Response to Office Action dated Nov. 19, 2009, filed Jan. 19, 2010 in U.S. Appl. No. 11/134,719, 13 pgs.
United States Response to Office Action dated Sep. 26, 2006, filed Feb. 22, 2007 in U.S. Appl. No. 10/185,527 (24 pgs).
United States Response to Office Action dated Sep. 26, 2006, filed Nov. 14, 2006 in U.S. Appl. No. 10/185,527 (11 pgs).
United States Response to Sep. 1, 2006 action, filed Feb. 28, 2007 in U.S. Appl. No. 10/364,627 (17 pgs).
United States Response to Sep. 1, 2006 action, filed Oct. 27, 2006 in U.S. Appl. No. 10/364,627 (10 pgs).
United States Response to Sep. 1, 2010 office action, in U.S. Appl. No. 12/053,090, filed Dec. 1, 2010 (20 pgs).

(56) References Cited

OTHER PUBLICATIONS

United States Response to Sep. 18, 2008 action, filed Mar. 18, 2009 in U.S. Appl. No. 10/364,627 (21 pgs).
United States Response to Sep. 19, 2006 action, filed Jan. 19, 2007 in U.S. Appl. No. 10/185,278 (8 pgs).
United States Response to Sep. 19, 2006 action, filed Nov. 10, 2006 in U.S. Appl. No. 10/185,278 (16 pgs).
United States Response to Sep. 23, 2009 action, filed Dec. 21, 2009 in U.S. Appl. No. 11/107,709 (12 pgs).
United States Response to Sep. 27, 2006 action, filed Jan. 19, 2007 in U.S. Appl. No. 10/185,511 (16 pgs).
United States Response to Sep. 27, 2006 action, filed Nov. 8, 2006 in U.S. Appl. No. 10/185,511 (15 pgs).
United States Response to Sep. 27, 2006 office action, in U.S. Appl. No. 10/364,115, filed Dec. 27, 2006 (4 pgs).
United States Response to Sep. 3, 2008 office action, in U.S. Appl. No. 10/364,115, filed Nov. 3, 2008 (9 pgs).
United States Response to Sep. 3, 2009 action, filed Mar. 3, 2010 in U.S. Appl. No. 11/107,014 (10 pgs).
United States Supplemental Notice of Allowance mailed Oct. 16, 2007, in U.S. Appl. No. 10/373,458.
Valimaki, M. et al., "Digital rights management on open and semi-open networks", WIAPP, 2001, 154-155.
Yu, H. "Digital multimedia at home and content rights management", IEEE Proceedings 2002 IEEE 4.sup.th International Workshop on Networked Appliances, 2002, 49-56.
Australian Examiner's First Report mailed Jan. 22, 2010, in Australian Patent Application No. 2004288593. (2 pgs.).
Australian Examiner's First Report mailed May 26, 2009, in Application No. 2004200454 (4 pgs.).
Australian Examiner's First Report mailed Sep. 2, 2009, in Application No. 2004200468 (2 pgs.).
Australian Examiner's Second Report mailed Jun. 7, 2010, in Australian Patent Application No. 2005201572 (2 pgs.).
Australian Notice of Acceptance mailed Dec. 16, 2009, in Application No. 2004200468 (3 pgs.).
Australian Notice of Acceptance mailed May 7, 2010, in Australian Patent Application No. 2005201602 (3 pgs.).
Australian Notice of Acceptance mailed Oct. 14, 2010, in Australian Patent Application No. 2005201572 (3 pgs.).
Australian Response to Examiner's First Report mailed Jan. 14, 2010, in Australian Patent Application No. 2005201602, filed Apr. 14, 2010 (5 pgs.).
Australian Response to Examiner's First Report mailed Jan. 15, 2010, in Australian Patent Application No. 2005201572, filed May 11, 2010 (24 pgs.).
Australian Response to Examiner's First Report mailed May 26, 2009, in Application No. 2004200454, filed Sep. 8, 2009 (36 pgs.).
Australian Response to Examiner's First Report mailed Sep. 2, 2009, in Application No. 2004200468, filed Dec. 2, 2009 (40 pgs.).
Australian Response to Examiner's Second Report mailed Jun. 7, 2010, in Australian Patent Application No. 2005201572, filed Sep. 22, 2010 (19 pgs.).
Benjamin, R. et al., "Electronic markets and virtual value chains on the information superhighway," Sloan Management Rev., Winter, 1995, 62-72. (10 pgs.).
*Black box crypton defies the hackers*, Electronic Weekly, 1985, 1257, p. 26 (from DialogClassic Web.TM. file 275, Accession No. 01116377). (1 pg.).
*BreakerTech joins copyright management market*. From http://www.findarticles.com, Computer International, 1999. (5 pgs.).
Cassidy, "A Web developers guide to content encapsulation technology," Apr. 1997, 5 pages. (5 pgs.).
Chinese First Office Action mailed Jun. 27, 2008, in Chinese Application No. 200510004173.1 (17 pgs.).
Chinese First Office Action mailed Mar. 8, 2010, in Chinese Application No. 200680025291.3 (13 pgs.).
Chinese Notice on First Office Action mailed Apr. 17, 2009, in Chinese Patent Application No. 200410005381.9 (11 pgs.).
Chinese Notice on First Office Action mailed Apr. 6, 2007, in Chinese Patent Application No. 200410033028.1 (6 pgs.).
Chinese Notice on First Office Action mailed Jan. 16, 2009, in Chinese Patent Application No. 200480011309.5 (10 pgs.).
Chinese Notice on First Office Action mailed Nov. 30, 2007, in Chinese Patent Application No. 200510066707.3 (8 pgs.).
Adams, C. et al. "Internet X.509 Public Key Infrastructure Certificate Management Protocols". Internet Engineering Task Force, Network Working Group, Mar. 1999, 1-72, XP-002284791. (62 pgs.).
*Aladdin acquires the assets of Micro Macro Technologies*. Business Wire, 1999 http://www.findarticles.com. (4 pgs.).
*Aladdin Knowledge Systems Partners with Rights Exchange, Inc. To Develop a Comprehensive Solution for Electronic Software Distribution*. Aug. 3, 1988, (5 pgs.).
Armati, D., "Tools and standards for protection, control and presentation of data," Apr. 3, 1996. (17 pgs.).
Arsenault, A. et al. "InternetX.509 Public Key Infrastructure: Roadmap". PKIX Working Group Internet Draft, Jul. 2002, 1-55, XP-002284790. (56 pgs.).
Australian Examiner's First Report mailed Jan. 14, 2010, in Australian Patent Application No. 2005201602. (1 pg.).
Australian Examiner's First Report mailed Jan. 15, 2010, in Australian Patent Application No. 2005201572. (2 pgs.).
Chinese Notice on Grant of Patent Right for Invention mailed Jan. 15, 2010, in Chinese Patent Application No. 200410033028.1 (4 pgs.).
Chinese Notice on Grant of Patent Right for Invention mailed Mar. 12, 2010, in Chinese Patent Application No. 200410005381.9 (4 pgs.).
Chinese Notice on Grant of Patent Right for Invention mailed Mar. 17, 2011, in Chinese Patent Application No. 200680025291.3 (4 pgs.).
Chinese Notice on Grant of Patent Right for Invention mailed Sep. 27, 2011, in Chinese Patent Application No. 200510004173.1 (4 pgs.).
Chinese Notice on Grant of Patent Right to Invention mailed Aug. 8, 2008, in Chinese Patent Application No. 200510066707.3 (4 pgs.).
Chinese Notice on Second Office Action mailed Aug. 28, 2009, in Chinese Patent Application No. 200410033028.1 (7 pgs.).
Chinese Notice on Second Office Action mailed Sep. 18, 2009, in Chinese Patent Application No. 200410005381.9 (9 pgs.).
Chinese Notice on Grant of Patent Right for Invention mailed Sep. 23, 2011, in Chinese Patent Application No. 200480011309.5 (4 pgs.).
Chinese Response to Second Office Action mailed Nov. 5, 2010, in Chinese Application No. 200680025291.3, filed Jan. 13, 2011 (7 pgs.).
Chinese Response to Telephone Conversation mailed Jan. 30, 2011, in Chinese Application No. 200680025291.3 (6 pgs.).
Chinese Response to First Office Action mailed Jun. 27, 2008, in Chinese Application No. 200510004173.1, filed Jan. 12, 2009 (19 pgs.).
Chinese Response to First Office Action mailed Mar. 8, 2010, in Chinese Application No. 200680025291.3, filed Jun. 3, 2010 (8 pgs.).
Chinese Response to Notice on First Office Action mailed Apr. 17, 2009, in Chinese Patent Application No. 200410005381.9, filed Jul. 30, 2009 (27 pgs.).
Chinese Response to Notice on First Office Action mailed Jan. 16, 2009, in Chinese Patent Application No. 200480011309.5, filed Jun. 24, 2010 (12 pgs.) [no. Translation].
Chinese Response to Notice on First Office Action mailed Nov. 30, 2007, in Chinese Patent Application No. 200510066707.3, filed Apr. 15, 2008 (52 pgs.).
Chinese Response to Second Office Action mailed Feb. 12, 2010, in Chinese Application No. 200510004173.1, filed Apr. 15, 2010 (17 pgs.).
Chinese Second Office Action mailed Feb. 12, 2010, in Chinese Application No. 200510004173.1 (16 pgs.).
Chinese Second Office Action mailed Nov. 5, 2010, in Chinese Application No. 200680025291.3 (9 pgs.).
Cox, B., "Superdistribution," Idees Fortes, Sep. 1994. (2 pgs.).
Cox, B., "What if There Is a Silver Bullet," J. Object Oriented Program., Jun. 1992. pp. 8-9 and 76.

(56) References Cited

OTHER PUBLICATIONS

Curet, et al., "RTP Payload Format for MPEG-4 FlexMultiplexed Streams", Internet Engineering Task Force, Internet Draft, XP-001075015, Nov. 8, 2001, (12 pgs.).
European Communication mailed Apr. 14, 2010, in Application No. 04779484 (4 pgs.).
European Communication dated Dec. 17, 2004, in European Application No. 04003418.3 (7 pgs.).
European Communication dated Dec. 4, 2006, in European Application No. 03013557.8 (5 pgs.).
European Communication dated Feb. 15, 2006, in European Application No. 03013557.8 (6 pgs.).
European Communication dated Feb. 17, 2005, in European Application No. 03013557.8 (4 pgs.).
European Communication dated Mar. 6, 2006, in European Application No. 04003418.3 (5 pgs.).
European Communication dated Sep. 19, 2005, in European Application No. 04003418.3 (12 pgs.).
European Communication mailed Aug. 25, 2006, in Application No. 04001953 (4 pgs.).
European Communication mailed Mar. 2, 2007, in Application No. 05102768 (7 pgs.).
European Communication mailed Nov. 19, 2007, in Application No. 05102765 (7 pgs.).
European Communication mailed Oct. 14, 2008, in Application No. 00913629 (5 pgs.).
European Communication mailed Oct. 15, 2008, in Application No. 00915912 (7 pgs.).
European Decision dated Nov. 16, 2009, in European Application No. 03013557.8 (20 pgs.).
European Decision to Grant dated Feb. 19, 2009, in Application No. 04001953 (2 pgs.).
European Decision to Grant dated Sep. 13, 2007, in European Application No. 04003418.3 (2 pgs.).
European Decision to Grant mailed Mar. 11, 2010, in Application No. 05102768 (2 pgs.).
European Reply filed Feb. 25, 2009, in Application No. 00915912 (27 pgs.).
European Reply to Communication mailed Aug. 25, 2006, in Application No. 04001953, filed Mar. 5, 2007 (33 pgs.).
European Reply to Communication mailed Nov. 19, 2007, in Application No. 05102765, filed May 26, 2008 (20 pgs.).
European Reply to Communication mailed Oct. 14, 2008, in Application No. 00913629, filed Feb. 24, 2009 (38 pgs.).
European Response to Additional Telephone Interview, in Application No. 05102768, filed Nov. 18, 2008 (7 pgs.).
European Response to Communication mailed Apr. 14, 2010, in Application No. 04779484, filed Aug. 2, 2010 (15 pgs.).
European Response to Communication dated Dec. 17, 2004, in European Application No. 04003418.3, filed May 20, 2005 (12 pgs.).
European Response to Communication dated Dec. 4, 2006, in European Application No. 03013557.8, filed Jun. 14, 2007 (15 pgs.).
European Response to Communication dated Feb. 15, 2006, in European Application No. 03013557.8, filed Aug. 25, 2006 (16 pgs.).
European Response to Communication dated Feb. 17, 2005, in European Application No. 03013557.8, filed Jun. 27, 2005 (23 pgs.).
European Response to Communication dated Mar. 6, 2006, in European Application No. 04003418.3, filed Sep. 7, 2006 (12 pgs.).
European Response to Communication dated Sep. 19, 2005, in European Application No. 04003418.3, filed Jan. 30, 2006 (13 pgs.).
European Response to Communication mailed Mar. 2, 2007, in Application No. 05102768, filed Nov. 12, 2007 (26 pgs.).
European Response to Result of Consultation of Nov. 10, 2008, in Application No. 05102768 (22 pgs.).
European Response to Summons dated May 13, 2009, in European Application No. 03013557.8, filed Sep. 25, 2009 (18 pgs.).
European Response to Telephone Interview, in Application No. 05102768, filed Nov. 14, 2008 (21 pgs.).
European Response to the Invitation dated Nov. 28, 2008, in Application No. 05102768, filed Jan. 29, 2009 (7 pgs.).
European Response to the Summons to Attend Oral Proceedings mailed Jul. 17, 2008, in Application No. 05102768, filed Oct. 15, 2008 (17 pgs.).
European Search Report and Written Opinion in PCT/US2006/031185, date of mailing Jan. 16, 2007. (Pg. 12).
European Search Report dated Aug. 2, 2004, in European Application No. 03013557.8 (4 pgs.).
European Search Report dated Jul. 20, 2004, in European Application No. 04003418.3 (5 pgs.).
European Search Report filed Aug. 2, 2005, in Application No. 04001953 (4 pgs.).
European Search Report mailed Aug. 25, 2006, in Application No. 05102768 (3 pgs.).
European Search Report mailed Mar. 23, 2010, in Application No. 05101183 (4 pgs.).
European Search Report mailed Nov. 2, 2006, in Application No, 04779484 (3 pgs.).
European Search Report mailed Nov. 8, 2007, in Application No. 06774628 (3 pgs.).
European Search Report mailed Oct. 13, 2006, in Application No. 05102765 (3 pgs.).
European Search Report mailed Sep. 26, 2002, in Application No. 00915912 (3 pgs.).
European Summons to Attend Oral Proceedings dated May 13, 2009, in European Application No. 03013557.8 (7 pgs.).
European Summons to Attend Oral Proceedings mailed Jul. 17, 2008, in Application No. 05102768 (8 pgs.).
European Supplemental Search report filed Feb. 8, 2010, in Application No, 04779484 (3 pgs.).
*Free On-Line Dictionary of Computing Concatenate*. Dec. 22, 1995.
Gold, S. "Finland—Data fellows secures ICSA certification", Newsbytes, 1998, (from DialogClassic Web(TM), File 9, Accession No. 01451058. (2 pgs.).
Handley, et al., "SDP: Session Description Protocol," The Internet Society, 1998. (pp. 1-42).
Hauser, R.C., "Does licensing require new access control techniques?" Aug. 1993. (9 pgs.).
Hong, S. et al., "On the construction of a powerful distributed authentication server without additional key management", Computer Communications, 2000, 23. (pp. 638-1644).
Housley, R. et al. "RFC 3280: Internet X.509 Public Key infrastructure Certificate and CRL Profile (w/o Annezes)" RFC 3280, Apr. 2002, XP002279343.
Hudgins-Bonafield, C. "Selling Knowledge on the Net," Network Computing, Jun. 1, 1995. (pp. 102-109).
*IBM spearheading intellectual property protection technology for information on the Internet*. May 1996. (3 pgs.).
India First Examination Report mailed Jul. 27, 2011, in India Application No. 136/MUM/2004 (4 pgs.).
Indonesia Notice of the Results of Substantive Examination mailed Dec. 19, 2007, in Indonesia Patent Application No. P-00 2004 00074 (4 pgs.).
International Preliminary Examination Report on Patentability as issued in International Application No. PCT/US2000/04946 completed Oct. 23, 2002 (2 pgs.).
International Preliminary Examination Report on Patentability as issued in International Application No. PCT/US2000/04947 completed Aug. 27, 2002 (2 pgs.).
International Preliminary Examination Report on Patentability as issued in International Application No. PCT/US2000/04948 completed Oct. 23, 2002 (2 pgs.).
International Preliminary Examination Report on Patentability as issued in International Application No. PCT/US2000/04949 Oct. 23, 2002 (2 pgs.).
International Preliminary Examination Report on Patentability as issued in International Application No. PCT/US2000/04972 Sep. 4, 2002 (2 pgs.).
International Preliminary Examination Report on Patentability as issued in International Application No. PCT/US2000/04983 Oct. 31, 2002 (2 pgs.).
International Preliminary Examination Report on Patentability as issued in International Application No. PCT/US2000/05091 Apr. 12, 2002 (2 pgs.).

(56) References Cited

OTHER PUBLICATIONS

International Preliminary Examination Report on Patentability as issued in International Application No. PCT/US2004/024439 Nov. 1, 2006 (7 pgs.).
International Preliminary Examination Report on Patentability as issued in International Application No. PCT/US2006/026913 Jan. 16, 2008 (4 pgs.).
International Search Report as mailed Jul. 22, 2002 in International Application No. PCT/US2000/04949 (5 pgs.).
International Search Report as mailed Jul. 24, 2002 in International Application No. PCT/US2000/04946 (5 pgs.).
International Search Report as mailed Jul. 24, 2002 in International Application No. PCT/US2000/04948 (5 pgs.).
International Search Report as mailed Jul. 26, 2002 in International Application No. PCT/US2000/05091 (5 pgs.).
International Search Report as mailed Jul. 30, 2002 in International Application No. PCT/US2000/04983 (5 pgs.).
International Search Report as mailed Sep. 18, 2007 in International Application No. PCT/US2006/026913 (3 pgs.).
International Search Report as mailed Sep. 6, 2006 in International Application No. PCT/US2004/024439 (3 pgs.).
Jakobsson, M. et al., "Proprietary Certificates", Topics in Cryptology, 2002. (pp. 164-181).
Kaplan, M.A., "IBM Cryptolopes.sub.—, Super-Distribution and Digital Rights Management," Dec. 1996. (7 pgs.).
Kent, S.T., "Protecting externally supplied software in small computers," Sep. 1980. (pp. 142 and 250-252).
Klemets, "RTP Payload Format for Video Codec 1 (VC-1)," Microsoft, Feb. 2006. (pp. 136).
Kohl, U. et al., "Safeguarding Digital Library Contents and Users; Protecting Documents Rather Than Channels," D-Lib Magazine, Sep. 1997. (9 pgs.).
Kumik, P. "Digital Rights Management", Computers and Law, 2000, 11(4). pp. 14-15).
*LicensIt: kinder, gentler copyright? Copyright management system links content, authorship information.* Seybold Report on Desktop Publishing, 1996, 10(11). (2 pgs.).
Linn, R.J., "Copyright and Information Services in the Context of the National Research and Education Network," IMA Intell. Property Project Proceedings, Jan. 1994, 1(1). (pp. 1 and 10-20).
Managing Digital Rights in Online Publishing, "How two publishing houses maintin control of copyright" Information Management & Technology, 2001, 34(4). (pp. 168-169).
Maurer, Ueli, "Modeling a Public-Key Infrastructure," XP002212747, Sep. 1999. (4 pgs.).
McNab, L., "Super-distribution works better in practical applications," Mar. 2, 1998. (2 pgs.).
Menezes et al. Handbook of Applied Cryptography 1997 CRC Press. (pp. 31-32).
Moeller, M., "IBM takes charge of E-commerce; Plans client, server apps based on Set," Apr. 1996. (4 pgs.).
Moeller, M., "NetTrust lets Cyberspace Merchants Take Account," PC Week, Nov. 20, 1995, 12(48). (1 pg.).
Myers, et al. "Certificate Management Messages over CMS. Internet Engineering Task Force", Network Working Group, Apr. 2000, (pp. 1-47), XP-002284794.
Myers, M. et al., "Internet X.509 Certificate Request Message Format", Internet X.509, Mar. 1999, http://www.rfc.net/rfc2511.html,( 24 pgs.).
Nafaa, A. et al, "RTP4mux: A Novel MPEG-4 RTP Payload for Multicast Video Communications over Wireless IP", Retrieved from the Internet Mar. 22, 2005: URL: http//www.polytech.uiv-nantes. PDF.
Olson, M., et al., "Concurrent access licensing," UNIX Review, 1988, 6(9), (pp. 67-72 (from Dialog Accession No. 01254918).
*Optimising license checkouts from a floating license server*, ARM the Architecture for the Digital World, http://www.arm.com/support/faqdev/1391.html.
PCT/US2005/019935.

Pemberton, J., "An ONLINE Interview with Jeff Crigler at IBM InfoMarket," Jul. 1996. (6 pgs.).
Proposed SMPTE Standard for Television: VC-1 Compressed Video Bitstream "Format and Decoding Process," The Society of Motion Picture and Television Engineers, Aug. 23, 2005 (pp. 1-480).
Ramanujapuram, A. et al., "Digital Content & Intellectual Property Rights: A specification language and tools for rights management," Dec. 1998, 20-23 and 26.
*Rights Management in the Digital Age: Trading in Bits, Not Atoms.* Spring, 1997, 4. (3 pgs.).
Rosoff, "Rights Management Comes to the Enterprise: Rights Management Beyond Digital Media", posted Mar. 17, 2003, http://directionsonmicrosft.com/sample/DOMIS/update/2003/04apr/0403rmdte.htm, (5 pgs.)
Rouvroy, G. et al. "Reconfigurable hardware solutions for the digital rights management of digital cinema", Oct. 2004, DRM '04: Proceedings of the 4th ACM workshop on Digital rights management, ACM. (pp. 40-53).
*RTP Payload Format for MPEG-4 Streams.* Internet Engineering Task Force, Internet Draft, XP-001033580, Jul. 2001. (41 pgs.).
Schneier, B., "Applied Cryptography Passage", Applied Crytography, Protocols, Algorithms and Source Code in C, 1996, 2.sup.nd edition. (pp. 585-587), XP 000863833.
Schneier, B., "Applied Cryptography", Applied Crytography, Protocols, Algorithms and Source Code in C, 1996, pp. 183-187 & 574-577), XP-002954321.
Schulzrinne, et al., "RTP: A Transport Protocol for Real-Time Applications," The Internet Society, 2003. (pp. 1-104).
Schulzrinne, H. "RTP Profile for Audio and Video Conferences with Minimal Control". RFC 1890, available at [[http://faqs.org/rfcs/rfc1890.html]], accessed Jan. 7, 2004, (14 pgs.).
Sibert, O. et al., "Securing the Content, Not the Wire, for Information Commerce," Jul. 1995, (pp. 1-11).
Sibert, O. et al., "The DigiBox: A Self-protecting Container for Information Commerce," First USENIX Workshop on Electronic Commerce, Jul. 11-12, 1995. (pp. 171-183).
*Solution for piracy*, Which Computer, 1983, p. 29 (from DialogClassic Web.TM. file 275, Accession No. 01014280).
*Sony develops copyright protection solutions for digital music content.* PR Newswire, 1999, http://www.findarticles.com.
Stefik, M., "Shifting the Possible: How Trusted Systems and Digital Property Rights Challenge Us to Rethink Digital Publishing," Technical Perspective, 1997. (pp. 137-159).
Stefik, M., "Trusted Systems," Mar. 1997. (8 pgs.).
*Technological Solutions Rise to Complement Law's Small Stick Guarding Electronic Works.* Information Law Alert, Jun. 16, 1995. (pp. 3-4 and 7).
*The Directory Public-Key Attribute Certificate Frameworks.* International Telecommunication Union, ITU-T Telecommunication Standardization Sector of ITU. Mar. 2000, XP-002284793.
Thompson, C.W., et al., "Digital licensing," IEEE Internet Computing, 2005, 9(4).
Torrubia, A. et al., "Cryptography regulations for E-commerce and digital rights management", Computers & Security, 2001, 20(8). (pp. 724-738).
Weber, R., "Digital Right Management Technologies," Oct. 1995. (35 pgs.).
White, S.R. et al., "Abyss: A trusted architecture for software protection," IEEE Symposium on Security and Privacy, Apr. 27-29, 1987. (pp. 38-51).
White, S.R. et al., "Abyss: An Architecture for Software Protection," IEEE Trans. on Software Engineering, Jun. 1990, 16(6). (pp. 619-629).
Windows Media, "A Technical Overview of Windows Media DRM 10 for Devices," Microsoft Corp. Sep. 2004.
Won-Ho Kim, "Design and Implementation of MPEG-2/DVB Scrambler Unit and VLSI Chip" 1997 International Conference on Consumer Electronics vol. 43 No. 3. (pp. 320-321) Jun. 1997.
Written Opinion of the International Searching Authority as completed Apr. 29, 2006 in International Application No. PCT/US2004/024439 (6 pgs.).

(56) References Cited

OTHER PUBLICATIONS

Written Opinion of the International Searching Authority as completed Jul. 26, 2007 in International Application No. PCT/US2006/026913 (3 pgs.).
Zwollo, K. "Digital document delivery and digital rights management", Information Services & Use, 2001, 9-11.
Ahuja, Gautama. "The Key to Keys," DataQuest (India), Aug. 31, 1997 (from DialogClassic WebTM, file 619, Acc. No. 05010091) (6 pages).
Amdur, D. "Metering Online Copyright," Jan. 16, 1996 (2 pages).
Amdur, D. (ed), "Intertrust Challenges IBM Digital Content Metering," Report of Electronic Commerce, Jul. 23, 1996, 3(15), pp. 1-2 and 16-18 (5 pages).
Backman, D. "Smartcards: The Intelligent Way to Security," Network Computing, 1998, 9(9) (4 pages).
*Bankard Set to Into Virtual Shopping in Philippines*, Newsbytes News Network, Apr. 16, 1997, (from DialogClassic WebTM file 9, acc. No. 01235815) (2 pages).
*Boxing Up Bytes*, 1993 (2 pages).
Chin, T.L., "Reaching Out to Physicians," Health Data Management, Sep. 1998, 6(9) (5 pages).
Clark, T. "Software Secures Digital Content on Web," Interactive Week, 1995 (1 page).
Craig, W. et al. "Digital Licensing," IEEE Internet Computing, Jul./Aug. 2005, 9(4) (4 pages).
Discussion from microsoft.public.access.security, "? How to Prevent copying DB Application to Other Machines," response from Dec. 22, 1998 (2 pages).
Hidgins-Bonafield, C. "Selling Knowledge on the Net," Network Computing, 1995, pp. 102-109 (6 pages).
Kaliski, "Privacy Enhancement for Internet email-Part IV: Key Certification and Related Services," RFC 1424, 1993 (9 pages).
Kopeikin, R. "Secure Trading on the NET," Telecommunications International Edition, 1996, 30(10), pp. 89-90, 92 and 94 (4 pages).
Misra, R.B. et al., "Tamper Detection Using Neuro-Fuzzy Logic," Ninth International Conference on Metering and Tariffs for Energy Supply, Conference Publication 462, May 25-28, 1999, pp. 101-108 (10 pages).
*MS to Upgrade Browser Security*, Cnet News.com, Mar. 20, 1997 (2 pages).
*Network-based Authentication: The Key to Security*, Network Computing, 1991 (3 pages).
*Next Step is Encryption: Data Security may be Bundled with Next's Operating System*, Electronic Engineering Times, 1992, Dialog Classic WebTM, file 16, acc No. 02103190 (2 pages).
*Postal Service Announce Plan to Postmarks on Electronic Mail*, San Jose Mercury News, Apr. 19, 1995, DialogClassic Web file 9, acc No. 00618375 (2 pages).
*S-A Unveil Security System*, Multichannel News, 1996, 18(3), 45 + file 9, acc No. 00864754 (3 pages).
Smith, M.G. et al. "A New Set of Rules for Information Commerce," Electronic Commerce, 1995, pp. 34-35 (2 pages).
Stallings, W. Network and Internetwork Security Principles and Practice, 1995 (3 pages).
Stevens, M.G. "How Secure is Your Computer System?," Practical Accountant, 1998, 31(1), pp. 24-32 (9 pages).
Suppliers Cashing in on the Internet, Communications Week International, Nov. 14, 1994, 134, 36 Dialog Classic Web file 9, acc No. 00564878 (3 pages).
Tarter, J. "The Superdistribution Model," Soft Trends, 1996, 3(6), pp. 1-6 (6 pages).
*The New Network: Planning and Protecting Intranet Electronic Commerce*, Information Week, 1996, 608, Dialog Classic WebTM file 13, acc No. 00528101 (7 pages).
United States Amendment filed Jul. 30, 2012, in U.S. Appl. No. 13/274,217 (15 pages).
United States Amendment filed Aug. 16, 2012, in U.S. Appl. No. 11/353,321 (24 pages).
United States Notice of Allowance mailed Nov. 6, 2012, in U.S. Appl. No. 11/018,095 (8 pages).
USPTO Office Action, mailed Mar. 26, 2002, cited in U.S. Appl. No. 09/449,106 (14 pages).
USPTO Office Action, mailed Oct. 22, 2002, U.S. Appl. No. 09/449,106 (10 pages).
Japanese Notice of Rejection mailed Feb. 9, 2010, in Application No. 2004-050480 (12 pages).
Japanese Notice of Allowance mailed May 25, 2010, in Application No. 2004-050480 (6 pages).
Malaysia Substantive Examination mailed Apr. 23, 2008, in Application No. PI20040481 (2 pages).
Malaysia Notice of Allowance mailed Sep. 30, 2011, in Application No. PI20040481 (2 pages).
Malaysia Substantive Examination mailed Oct. 2, 2009, in Application No. PI20051703 (2 pages).
Malaysia Notice of Allowance mailed May 14, 2010, in Application No. PI20051703 (2 pages).
Polish Notice mailed Jan. 23, 2009, in Application No. P365549 (4 pages).
Polish Notice mailed Sep. 9, 2009, in Application No. P365549 (3 pages).
Philippines Office Action mailed Oct. 26, 2007, in Application No. 1-2004-000078 (1 page).
Russian Office Action mailed Jan. 25, 2008, in Application No. 2004105509 (8 pages).
Russian Decision on Grant mailed Jul. 25, 2008, in Application No. 2004105509 (13 pages).
Russian Office Action mailed Mar. 5, 2008, in Application No. 2004103871 (9 pages).
Russian Decision on Grant mailed Jun. 27, 2008, in Application No. 2004103871 (20 pages).
Russian Office Action mailed Apr. 22, 2009, in Application No. 2005112059 (3 pages).
Russian Decision to Grant mailed Jul. 16, 2009, in Application No. 2005112059 (20 pages).
Russian Decision to Grant mailed Mar. 16, 2009, in Application No. 2005112105 (18 pages).
Russian Decision to Grant mailed Aug. 13, 2008, in Application No. 2005120670 (6 pages).
Russian Decision to Grant mailed Oct. 6, 2010, in Application No. 2008101456 (22 pages).
Japanese Notice of Rejection mailed on Feb. 12, 2010, in Application No. 2004-035808 (7 pages).
Japanese Notice of Rejection mailed Jul. 23, 2010, in Application No. 2004-035808 (4 pages).
Japanese Notice of Allowance mailed Nov. 2, 2010, in Application No. 2004-035808 (6 pages).
Japanese Notice of Rejection mailed Dec. 3, 2010, in Application No. 2005-006781 (9 pages).
Japanese Final Rejection mailed Apr. 22, 2011, in Application No. 2005-006781 (7 pages).
Japanese Written Appeal filed Aug. 22, 2011, in Application No. 2005-006781 (23 pages).
Japanese Notice of Allowance mailed Oct. 7, 2011, in Application No. 2005-006781 (6 pages).
Japanese Notice of Rejection mailed Dec. 10, 2010, in Application No. 2005-124814 (11 pages).
Japanese Notice of Allowance mailed Apr. 26, 2011, in Application No. 2005-124814 (6 pages).
Japanese Notice of Rejection mailed May 20, 2011, in Application No. 2008-521533 (4 pages).
Japanese Notice of Allowance mailed Oct. 14, 2011, in Application No. 2008-521533 (6 pages).
Canadian Application 2456400, Office Action mailed Jan. 17, 2013 (2 pages).
Canadian Application 2456400, Office Action mailed Sep. 5, 2012 (2 pages).
Canadian Application 2456592, Office Action mailed Aug. 29, 2012 (5 pages).
Canadian Application 2457291, Office Action mailed Oct. 30, 2012 (6 pages).
Canadian Application 2457938, Office Action mailed Apr. 24, 2012 (3 pages).

(56) References Cited

OTHER PUBLICATIONS

Canadian Application 2504677, Office Action mailed Aug. 31, 2012 (2 pages).
Canadian Application 2505295, Office Action mailed May 29, 2012 (4 pages).
Chinese Notice on the Second Action mailed Aug. 3, 2012, in Chinese Application No. 200910139429.8 (11 pgs).
Chinese Notice on the Third Action mailed Feb. 21, 2013, in Chinese Application No. 200910139429.8 (8 pgs).
European Application 02014340.0, Search Report mailed Aug. 11, 2005 (3 pages).
India Application 135/MUM/2004, First Examination Report mailed Apr. 25, 2012 (2 pages).
Japanese Application 2002-186967, Decision to Grant a Patent mailed on Oct. 31, 2008 (6 pages).
Japanese Application 2002-186967, Official Notice of Rejection mailed Feb. 29, 2008 (12 pages).
Japanese Application 2002-186968, Notice of Allowance mailed Oct. 9, 2009 (6 pages).
Japanese Application 2002-186968, Notice of Rejection mailed Jun. 12, 2009 (7 pages).
Japanese Application 2002-186968, Official Notice of Rejection mailed Dec. 9, 2008 (33 pages).
Japanese Application 2004-035810, Decision to Decline the Amendment mailed Apr. 17, 2012 (14 pages).
Japanese Application 2004-035810, Interrogation mailed Sep. 2, 2011 (6 pages).
Japanese Application 2004-035810, Notice of Rejection mailed Apr. 17, 2012 (33 pages).
Japanese Application 2004-035810, Written Appeal mailed Jan. 21, 2011 (9 pages).
PCT Application PCT/US00/22972, Publication and International Search Report mailed Nov. 27, 2000 (128 pages).
PCT Application PCT/US00/23105, Publication and International Search Report mailed Dec. 21, 2000 (134 pages).
PCT Application PCT/US00/23106, Publication and International Search Report mailed Feb. 19, 2001 (130 pages).
PCT Application PCT/US00/23107, Publication and International Search Report mailed Nov. 22, 2000 (133 pages).
PCT Application PCT/US00/23108, Publication and International Search Report mailed Dec. 14, 2000 (131 pages).
SDMI Portable Device Specification Part 1 Version 1.0, Secure Digital Music Initiate, 1999 (35 pages).
U.S. Appl. No. 11/107,014, Amendment and Response filed Feb. 21, 2013 (15 pages).
U.S. Appl. No. 11/107,014, Amendment and Response filed Aug. 14, 2012 (13 pages).
U.S. Appl. No. 11/107,014, Amendment and Response filed Dec. 15, 2011 (11 pages).
U.S. Appl. No. 11/107,014, Final Rejection mailed Nov. 21, 2012 (10 pages).
U.S. Appl. No. 11/107,014, Non-Final Rejection mailed Mar. 14, 2012 (10 pages).
U.S. Appl. No. 09/525,509, Advisory Action mailed Aug. 10, 2005 (2 pages).
U.S. Appl. No. 09/525,509, Amendment After Notice of Allowance filed Jun. 12, 2007 (3 pages).
U.S. Appl. No. 09/525,509, Amendment and Response filed Jan. 7, 2005 (10 pages).
U.S. Appl. No. 09/525,509, Amendment and Response filed Feb. 27, 2006 (18 pages).
U.S. Appl. No. 09/525,509, Amendment and Response filed Jul. 22, 2005 (22 pages).
U.S. Appl. No. 09/525,509, Final Rejection mailed May 20, 2005 (24 pages).
U.S. Appl. No. 09/525,509, Non-Final Rejection mailed Oct. 6, 2004 (24 pages).
U.S. Appl. No. 09/525,509, Non-Final Rejection mailed Nov. 18, 2005 (22 pages).
U.S. Appl. No. 09/525,509, Notice of Allowance mailed Apr. 4, 2007 (7 pages).
U.S. Appl. No. 09/525,510, Advisory Action mailed Feb. 20, 2004 (2 pages).
U.S. Appl. No. 09/525,510, Advisory Action mailed Dec. 8, 2006 (2 pages).
U.S. Appl. No. 09/525,510, Amendment After Final filed May 2, 2003 (11 pages).
U.S. Appl. No. 09/525,510, Amendment After Notice of Allowance filed Jun. 12, 2007 (3 pages).
U.S. Appl. No. 09/525,510, Amendment and Response Sep. 22, 2003 (7 pages).
U.S. Appl. No. 09/525,510, Amendment and Response filed Jan. 10, 2005 (9 pages).
U.S. Appl. No. 09/525,510, Amendment and Response filed Jan. 26, 2004 (7 pages).
U.S. Appl. No. 09/525,510, Amendment and Response filed Apr. 25, 2006 (8 pages).
U.S. Appl. No. 09/525,510, Amendment and Response filed Jul. 8, 2005 (16 pages).
U.S. Appl. No. 09/525,510, Amendment and Response filed Nov. 4, 2002 (7 pages).
U.S. Appl. No. 09/525,510, Amendment and Response filed Nov. 13, 2006 (13 pages).
U.S. Appl. No. 09/525,510, Amendment and Response filed Dec. 16, 2005 (17 pages).
U.S. Appl. No. 09/525,510, Appeal Brief filed Jul. 12, 2004 (38 pages).
U.S. Appl. No. 09/525,510, Final Rejection filed Jan. 29, 2003 (12 pages).
U.S. Appl. No. 09/525,510, Final Rejection mailed Jul. 7, 2006 (13 pages).
U.S. Appl. No. 09/525,510, Final Rejection mailed Nov. 13, 2003 (12 pages).
U.S. Appl. No. 09/525,510, Non-Final Rejection mailed Jan. 23, 2006 (12 pages).
U.S. Appl. No. 09/525,510, Non-Final Rejection mailed 04/26/05 (11 pp.).
U.S. Appl. No. 09/525,510, Non-Final Rejection mailed Jun. 5, 2003 (11 pages).
U.S. Appl. No. 09/525,510, Non-Final Rejection mailed Sep. 3, 2002 (12 pages).
U.S. Appl. No. 09/525,510, Non-Final Rejection mailed Sep. 16, 2005 (12 pages).
U.S. Appl. No. 09/525,510, Non-Final Rejection mailed Oct. 12, 2004 (11 pages).
U.S. Appl. No. 09/525,510, Notice of Allowance mailed Apr. 3, 2007 (8 pages).
U.S. Appl. No. 09/525,510, Advisory Action mailed Nov. 2, 2005 (6 pages).
U.S. Appl. No. 09/892,298, Amendment After Final filed Oct. 11, 2005 (14 pages).
U.S. Appl. No. 09/892,298, Amendment and Response filed May 27, 2005 (17 pages).
U.S. Appl. No. 09/892,298, Final Rejection mailed Aug. 11, 2005 (16 pages).
U.S. Appl. No. 09/892,298, Non-Final Rejection mailed Mar. 16, 2005 (17 pages).
U.S. Appl. No. 09/892,298, Pre-Brief Appeal Conference Decision mailed Mar. 10, 2006 (2 pages).
U.S. Appl. No. 09/892,298, Pre-Brief Conference Request mailed Nov. 16, 2005 (6 pages).
U.S. Appl. No. 09/892,329, Advisory Action mailed Oct. 12, 2005 (3 pages).
U.S. Appl. No. 09/892,329, Amendment and Response filed Feb. 2, 2005 (13 pages).
U.S. Appl. No. 09/892,329, Amendment and Response filed Apr. 17, 2006 (23 pages).
U.S. Appl. No. 09/892,329, Amendment and Response filed Jul. 13, 2005 (20 pages).
U.S. Appl. No. 09/892,329, Amendment and Response filed Oct. 3, 2005 (24 pages).

(56) References Cited

OTHER PUBLICATIONS

U.S. Appl. No. 09/892,329, Amendment and Response filed Nov. 7, 2006 (19 pages).
U.S. Appl. No. 09/892,329, Final Rejection mailed Jul. 7, 2006 (14 pages).
U.S. Appl. No. 09/892,329, Final Rejection mailed Aug. 10, 2005 (13 pages).
U.S. Appl. No. 09/892,329, Non-Final Rejection mailed Jan. 18, 2006 (12 pages).
U.S. Appl. No. 09/892,329, Non-Final Rejection mailed Apr. 20, 2005 (12 pages).
U.S. Appl. No. 09/892,329, Non-Final Rejection mailed Nov. 2, 2004 (28 pages).
U.S. Appl. No. 09/892,329, Notice of Allowance mailed Jan. 16, 2007 (7 pages).
U.S. Appl. No. 09/892,371, Advisory Action mailed Nov. 3, 2005 (3 pages).
U.S. Appl. No. 09/892,371, Amendment and Response filed May 20, 2005 (20 pages).
U.S. Appl. No. 09/892,371, Amendment and Response filed Oct. 11, 2005 (25 pages).
U.S. Appl. No. 09/892,371, Final Rejection mailed Aug. 23, 2005 (15 pages).
U.S. Appl. No. 09/892,371, Non-Final Rejection mailed Mar. 8, 2005 (14 pages).
U.S. Appl. No. 09/892,371, Notice of Allowance mailed Feb. 10, 2006 (11 pages).
U.S. Appl. No. 10/980,743, Amendment and Response filed Jul. 8, 2008 (15 pages).
U.S. Appl. No. 10/980,743, Non-Final Rejection mailed Apr. 11, 2008 (14 pages).
U.S. Appl. No. 10/980,743, Notice of Allowance mailed Mar. 10, 2009 (7 pages).
U.S. Appl. No. 10/980,743, Notice of Allowance mailed Oct. 24, 2008 (7 pages).
U.S. Appl. No. 10/981,846, Amendment and Response filed Apr. 28, 2008 (10 pages).
U.S. Appl. No. 10/981,846, Non-Final Rejection mailed Jan. 28, 2008 (7 pages).
U.S. Appl. No. 10/981,846, Notice of Allowance mailed Jun. 2, 2008 (6 pages).
U.S. Appl. No. 10/982,105, Notice of Allowance mailed Dec. 2, 2005 (7 pages).
U.S. Appl. No. 10/982,578, Amendment and Response filed Feb. 24, 2010 (15 pages).
U.S. Appl. No. 10/982,578, Amendment and Response filed Feb. 25, 2009 (13 pages).
U.S. Appl. No. 10/982,578, Amendment and Response filed Jul. 14, 2010 (11 pages).
U.S. Appl. No. 10/982,578, Amendment and Response filed Jul. 23, 2009 (14 pages).
U.S. Appl. No. 10/982,578, Amendment and Response filed Sep. 11, 2008 (14 pages).
U.S. Appl. No. 10/982,578, Amendment and Response filed Dec. 17, 2010 (3 pages).
U.S. Appl. No. 10/982,578, Final Rejection mailed Nov. 24, 2009 (24 pages).
U.S. Appl. No. 10/982,578, Final Rejection mailed Nov. 2508 (17 pages).
U.S. Appl. No. 10/982,578, Non-Final Rejection mailed Apr. 14, 2010 (13 pages).
U.S. Appl. No. 10/982,578, Non-Final Rejection mailed Apr. 23, 2009 (13 pages).
U.S. Appl. No. 10/982,578, Non-Final Rejection mailed May 13, 2008 (16 pages).
U.S. Appl. No. 10/982,578, Notice of Allowance mailed Apr. 18, 2011 (9 pages).
U.S. Appl. No. 10/982,578, Notice of Allowance mailed Oct. 14, 2010 (7 pages).
U.S. Appl. No. 10/983,040, Advisory Action mailed Mar. 11, 2009 (3 pages).
U.S. Appl. No. 10/983,040, Amendment After Final filed Feb. 24, 2009 (12 pages).
U.S. Appl. No. 10/983,040, Amendment and Response filed Jan. 30, 2008 (10 pages).
U.S. Appl. No. 10/983,040, Amendment and Response filed Aug. 18, 2008 (10 pages).
U.S. Appl. No. 10/983,040, Amendment and Response filed Nov. 23, 2009 (10 pages).
U.S. Appl. No. 10/983,040, Final Rejection mailed Nov. 25, 2008 (11 pages).
U.S. Appl. No. 10/983,040, Non-Final Rejection mailed Apr. 17, 2008 (14 pages).
U.S. Appl. No. 10/983,040, Non-Final Rejection mailed May 28, 2009 (13 pages).
U.S. Appl. No. 10/983,040, Non-Final Rejection mailed Oct. 30, 2007 (10 pages).
U.S. Appl. No. 10/983,040, Notice of Allowance mailed Mar. 11, 2010 (6 pages).
U.S. Appl. No. 10/983,040, Notice of Allowance mailed Mar. 30, 2010 (6 pages).
U.S. Appl. No. 11/094,097, Advisory Action mailed Mar. 31, 2008 (3 pages).
U.S. Appl. No. 11/094,097, Amendment and Response filed Mar. 7, 2008 (13 pages).
U.S. Appl. No. 11/094,097, Amendment and Response filed Apr. 21, 2009 (9 pages).
U.S. Appl. No. 11/094,097, Amendment and Response filed Sep. 28, 2007 (13 pages).
U.S. Appl. No. 11/094,097, Amendment and Response filed Oct. 28, 2008 (11 pages).
U.S. Appl. No. 11/094,097, Final Rejection mailed Dec. 13, 2007 (17 pages).
U.S. Appl. No. 11/094,097, Non-Final Rejection mailed Jun. 28, 2007 (17 pages).
U.S. Appl. No. 11/094,097, Non-Final Rejection mailed Jul. 28, 2008 (20 pages).
U.S. Appl. No. 11/094,097, Notice of Allowance mailed Jul. 13, 2009 (12 pages).
U.S. Appl. No. 11/094,097, Supplemental Response filed Dec. 11, 2008 (14 pages).
U.S. Appl. No. 11/107,513, Amendment After Final filed Jun. 23, 2009 (7 pages).
U.S. Appl. No. 11/107,513, Amendment After Notice of Allowance filed Aug. 13, 2009 (6 pages).
U.S. Appl. No. 11/107,513, Amendment and Response filed Dec. 17, 2008 (12 pages).
U.S. Appl. No. 11/107,513, Final Rejection mailed Mar. 23, 2009 (8 pages).
U.S. Appl. No. 11/107,513, Non-Final Rejection mailed Sep. 19, 2008 (8 pages).
U.S. Appl. No. 11/107,513, Notice of Allowance mailed Jul. 9, 2009 (7 pages).
U.S. Appl. No. 11/108,038, Amendment and Response filed Apr. 9, 2012 (11 pages).
U.S. Appl. No. 11/108,038, Amendment and Response filed Sep. 4, 2012 (14 pages).
U.S. Appl. No. 11/108,038, Final Rejection mailed Jun. 4, 2012 (11 pages).
U.S. Appl. No. 11/108,038, Non-Final Rejection mailed Dec. 7, 2011 (9 pages).
U.S. Appl. No. 11/116,884, Notice of Allowance mailed Mar. 6, 2013 (8 pages).
U.S. Appl. No. 11/116,884, Notice of Allowance mailed Dec. 20, 2012 (8 pages).
U.S. Appl. No. 11/132,677, Advisory Action mailed Jan. 9, 2009 (3 pages).
U.S. Appl. No. 11/132,677, Amendment After Final filed Dec. 29, 2008 (17 pages).
U.S. Appl. No. 11/132,677, Amendment and Response filed Mar. 2, 2009 (14 pages).

(56) References Cited

OTHER PUBLICATIONS

U.S. Appl. No. 11/132,677, Amendment and Response filed Aug. 8, 2008 (17 pages).
U.S. Appl. No. 11/132,677, Final Rejection mailed Oct. 1, 2008 (10 pages).
U.S. Appl. No. 11/132,677, Non-Final Rejection mailed Apr. 8, 2008 (9 pages).
U.S. Appl. No. 11/132,677, Notice of Allowance mailed May 7, 2009 (6 pages).
U.S. Appl. No. 11/132,677, Notice of Allowance mailed Sep. 23, 2009 (6 pages).
U.S. Appl. No. 11/134,719, Amendment and Response filed Apr. 18, 2012 (8 pages).
U.S. Appl. No. 11/134,719, Final Rejection mailed May 3, 2012 (12 pages).
U.S. Appl. No. 11/134,719, Non-Final Rejection mailed Jan. 19, 2012 (10 pages).
U.S. Appl. No. 11/353,321, Amendment and Response filed Apr. 30, 2013 (22 pages).
U.S. Appl. No. 11/353,321, Final Rejection mailed Jan. 31, 2013 (13 pages).
U.S. Appl. No. 11/432,276, Amendment and Response filed Jan. 30, 2008 (7 pages).
U.S. Appl. No. 11/432,276, Amendment and Response filed Sep. 14, 2007 (11 pages).
U.S. Appl. No. 11/432,276, Non-Final Rejection mailed Jun. 14, 2007 (14 pages).
U.S. Appl. No. 11/432,276, Non-Final Rejection mailed Oct. 30, 2007 (8 pages).
U.S. Appl. No. 11/432,276, Notice of Allowance mailed Mar. 28, 2008 (4 pages).
U.S. Appl. No. 11/754,856, Amendment After Final filed Jun. 23, 2011 (8 pages).
U.S. Appl. No. 11/754,856, Amendment and Response filed Jan. 10, 2011 (10 pages).
U.S. Appl. No. 11/754,856, Amendment and Response filed Jun. 18, 2010 (10 pages).
U.S. Appl. No. 11/754,856, Amendment and Response filed Dec. 29, 2009 (9 pages).
U.S. Appl. No. 11/754,856, Final Rejection mailed Mar. 10, 2010 (14 pages).
U.S. Appl. No. 11/754,856, Final Rejection mailed Apr. 8, 2011 (5 pages).
U.S. Appl. No. 11/754,856, Non-Final Rejection mailed Sep. 29, 2009 (13 pages).
U.S. Appl. No. 11/754,856, Non-Final Rejection mailed Oct. 14, 2010 (14 pages).
U.S. Appl. No. 11/754,856, Notice of Allowance mailed Jul. 14, 2011 (7 pages).
U.S. Appl. No. 11/866,041, Advisory Action mailed Dec. 2, 2011 (3 pages).
U.S. Appl. No. 11/866,041, Amendment and Response filed Feb. 8, 2011 (9 pages).
U.S. Appl. No. 11/866,041, Amendment and Response filed Oct. 27, 2011 (9 pages).
U.S. Appl. No. 11/866,041, Final Rejection mailed Aug. 24, 2011 (12 pages).
U.S. Appl. No. 11/866,041, Non-Final Rejection mailed Oct. 12, 2010 (17 pages).
U.S. Appl. No. 12/014,081, Amendment and Response filed Jun. 23, 2010 (15 pages).
U.S. Appl. No. 12/014,081, Amendment and Response filed Nov. 18, 2010 (17 pages).
U.S. Appl. No. 12/014,081, Final Rejection mailed Aug. 20, 2010 (23 pages).
U.S. Appl. No. 12/014,081, Non-Final Rejection mailed Mar. 23, 2010 (20 pages).
U.S. Appl. No. 12/014,081, Non-Final Rejection mailed Oct. 11, 2012 (5 pages).
U.S. Appl. No. 12/053,090, Amendment and Response mailed Nov. 14, 2011 (25 pages).
U.S. Appl. No. 12/135,944, Amendment and Response filed Dec. 1, 2009 (2 pages).
U.S. Appl. No. 12/135,944, Non-Final Rejection mailed Sep. 1, 2009 (4 pages).
U.S. Appl. No. 12/135,944, Notice of Allowance mailed Dec. 24, 2009 (6 pages).
U.S. Appl. No. 13/274,217, Notice of Allowance mailed Jan. 8, 2013 (10 pages).
U.S. Appl. No. 13/367,198, Non-Final Rejection mailed Feb. 25, 2013 (13 pages).
U.S. Appl. No. 60/260543, filed Jan. 2001, Thomas et al.
*A Unveil security system*, Multichannel News, 1995, 18(3) p. 45 (from DialogClassic Web™, file 9, acc. No. 00864754).
*Achieving Peak Performance: Insights from a Global Survey on Credit Risk and Collections Practices*, GCI Group Pamphlet, (2002, 2004), 12 pages.
Anderson, R et al., "Tamper Resistance—A Cautionary Note," Proc. Of the 2nd USENIX Workshop on Electronic Commerce, Oakland, California, Nov. 1996, 1-11.
Arbaugh, "A Secure and Reliable Bootstrap Architecture", IEEE Symposium on Security and Privacy, May 1997, pp. 65-71.
AU Examiners First Report, Application No. 2006220489, Jan. 25, 2010 (2 pages).
AU Examiners First Report, Application No. 2006220489, Sep. 15, 2009 (2 pages).
Bajikar, S., "Trusted Platform Module (TPM) based Security on Notebook PCs—White Paper", Mobile Platforms Group Intel Corporation; XP002259678; http://www.intel.com/design/mobile/platform/downloads/Trusted Platform Module White Paper.pdf, (Jun. 20, 2002).
*Bankard set to into virtual shopping in Philippines*, Newsbytes News Network, 1997 (from DialogClassic Web™, file 9, acc. No. 01235815.
Bird, R., et al., "The KryptoKnight family of light-weight protocols for authentification and key distribution, "IEEE, 1995, 31-41.
*Black box crypton defies the hackers*, Electronics Weekly, 1985, n1257 p. 26 (from DialogClassic Weekly, 1985, n1257 (from DialogClassic Web™, File 275, Acc. No. 011163377).
Blissmer, "Next Step is Encryption: Data Security May be Bundled with Next's Operating System", Electronic Engineering Times, Feb. 3, 1992.
Boyl, J.P., et al. The Esprit Project Café High Security digital payment systems, ESORICs, LNCS 875, 1994, 217-230.
*Breaker Tech Joins Copyright Management Market*, Computergram International, Aug. 5, 1999, 2 pages.
Canadian Application 2457291, Office Action mailed Aug. 27, 2013, 2 pages.
Canadian Application 2457938, Notice of Allowance mailed Jul. 23, 2013, 2 pages.
Cante, T.M., et al., "Challenges to combining general-purpose and multimedia processors," IEEE, Dec. 1997,33-37.
Chabaud, D., "Programmation des cartes VGA, " Micro-Systems, 1990, 173-178 (no English abstract available).
Chinese Application 200910139429.8, Decision on Rejection mailed Jul. 31, 2013, 6 pages.
Choudhury et al. "Copyright Protection for Electronic Publishing over Computer Networks", IEEE Network Magazine, Jun. 1994, 1-18.
Clark, P. et al., "Bits: A Smartcard Protected Operating System," Comm Of the ACM, Nov. 1994, 37(11)m 66-70 and 94.
Clarke, Roger et al. "Technological Protections for Digital Copyright objects," [Online] Jul. 2000, Retrieved from the Internet: http://www.anu.edu.au/people/Roger.Clarke/II/TPDCO.html [retrieved on Jul. 28, 2005].
Comino, N et al., "A Novel Data Distribution Technique for Host-Client Type Parallel Applications", IEEE Transactions on Parallel and Distributed Systems, 2002, 13(2), 97-110.
*Content Protection System Architecture A Comprehensive Framework for Content Protection*, Content Protection Architecture: XP02259679; http://4centity.com/data/tech/cpsa/cpsa081.pdf, (Feb. 17, 2000).

(56) References Cited

OTHER PUBLICATIONS

*Cylink: Public-Key Security Technology Granted to the Public*; Cylink Announces the Reowned Diffie-Hellman Public-Key Technology Has Entered the Public Domain:, Business Wire, Sep. 16, 1997.
*CyoLicence*, Version 1.3.0, Released Mar. 5, 2005, cyotec.com, Printed Sep. 7, 2005.
Davida, George I., et al., "UNIX GUARDIANS: Active User Intervention in Data Protection", Aerospace Computer Security Applications Conference, Fourth Dec. 12-16, (1988), 6 pages.
*DMOD WorkSpace OEM Unique Features*, www.dmod.com/oem/features, Retrieved from the Internet on Jan. 12, 2005, 3 pages.
EP Communication for Application No. 05823253.9-2212/1815322 PCT/US2005040942, Reference FBI18697, Aug. 13, 2010.
EP Communication for application No. 05851550.3-1243/ 1825391 PCT/US2005040967, Reference FBI18698, Jul. 5, 2012.
EP Communication for Application No. 05854752.2-1245/ 1829274 PCT/US2005046091, Reference FBI18701, Dec. 21, 2011.
*Equifax Business Solutions—Manage Your Customers*, Retrieved from the Internet from http://www.equifax.com/sitePages/biz/small Biz/?sitePage=manageCustomers on Oct. 14, 2005, 3 pages.
Eren, H. et al., Fringe-Effect Capacitive Proximity Sensors for Tamper Proof Enclosures, Proceedings of 2005 Sensors for Industry Conference (Feb. 2005), pp. 22-25.
European Application 12002880.8, Communication mailed Feb. 18, 2013 (4 pages).
European Application 12002880.8, Search Report mailed Jul. 10, 2012 (5 pages).
Europe Application 03013556.0, Summons to Attend Oral Proceedings mailed Sep. 3, 2013, 8 pages.
European Application 02011478.1, Communication mailed Jan. 18, 2011 (4 pages).
European Application 02011478.1, Search Report mailed Apr. 16, 2010 (7 pages).
European Application 02014340.0, Communication mailed Jul. 9, 2009 (4 pages).
European Application 02014340.0, Communication mailed Dec. 19, 2006 (6 pages).
European Application 02014340.0, Communication mailed Dec. 21, 2007 (5 pages).
European Application 02014340.0, Means of Redress mailed Nov. 9, 2011 (15 pages).
European Application 02014340.0, Results of Consultation mailed Nov. 7, 2011 (8 pages).
European Application 02014340.0, Summons to Attend Oral Proceedings mailed Jun. 21, 2011 (9 pages).
European Application 12002881.6, Communication mailed Feb. 18, 2013 (4 pages).
European Application 12002881.6, Search Report mailed Jul. 10, 2012 (5 pages).
European Extended Search Report mailed Oct. 8, 2013, in Application No. 06774628 (7 pgs).
Examiner's First Report on Application mailed Jun. 4, 2010, AU Application No. 2005222507, 2 pages.
*Finland—Data fellows secures ICSA Certification*, Newbytes, 1988 (from DialogClass Web™), File 9, Acc. No. 01451058, 2 pages.
Finnie et al., "*Suppliers cashing in on the internet*", Communications Week International, 1994, N134, p. 36 (from DialogClassic Web, file 9, acc. No. 00564878), Nov. 14, 1994, 2 pages.
*First Special Feature, Security Oriented Web Application Development, Part 3, Method for Realizing Secure Session Management*, N+1 Network Guide (vol. 4, No. 1, Serial No. 32) Softbank Publishing Inc., (Jan. 2004), pp. 47-59.
*Flonix: USB Desktop OS Solutions Provider*, http://www.flonix.com, Retrieved from the Internet Jun. 1, 2005, (Copyright 2004), 2 pages.
*Forward Solutions Unveils Industry's Most Advanced Portable Personal Computing system on USB Flash Memory Device:*, Proquest, PR Newswire, http://proquest.umi.com/pqdweb?index=20 &did=408811931&SrchMode=1&sid=6&Fmt=3. Retrieved from the Internet Feb. 15, 2008, (Sep. 22, 2003), 3 pages.
Gao, Jerry et al., "Online Advertising—Taxonomy and Engineering Perspectives", http://www.engr.sjsu.edu/gaojerry/report/OnlineAdvertising%20.pdf, (2002), 33 pages.
Gilmont, T. et al., "An Architecture of Security Management Unit for Safe Hosting of Multiple Agents, " IS&T/SPIE Conf. on Security and Watermarking of Multimedia Contents, San Jose, California, Jan. 1999, SPIE vol. 3657, 472-483.
Goering, Richard "Web Venture Offers Metered Access to EDA Packages—Startup Winds Clocks by the Hour Tools (E*CAD Will Launch Web Site That Provides Pay-Per-Use and Pay-Per-Hour Access to Range of Chip Design Software)", Electronic Engineering Times (Nov. 6, 2000), 3 pages.
Hartung F. et al. "Digital Rights Management and Watermarking of Multimedia Content for M-Commerce Applications," IEEE Communications Magazine, IEEE Service Center. Piscatawy, N.J., vol. 38, No. 11, Nov. 2000, pp. 78-84.
Housley, R. et al., "Metering: a Pre-Pay Technique", Proceedings of the SPIE—The International Society for Optical Engineering, 1997, 3022, 527-531.
India Application 228/DEL/2004, First Examination Report mailed May 29, 2013, 2 pages.
India Application 892/DEL/2005, First Examination Report mailed Sep. 13, 2013, 2 pages.
*Internet Dynamics: Internet Dynamics First to Ship Integrated Security Solution for Enterprise Intranets and Extranets; Conclave Accelerates Enterprise Deployment of Secure, High-Value Intranets and Extranets*, Business Wire, Sep. 15, 1997.
*Is Your Computer Secure?*, Which Computer?—The Business Computer Magazine, Nov. 1983, 3 pages.
Ishii, S., et al., "2,048-bit public-key encryption processor, " NTT Human Interface Labs., 998, 259-267 (Abstract on p. 261).
JP Final Rejection for Application No. 2000-608539, Dec. 24, 2009.
JP Notice of Rejection for Application No. 2005-301957, Jun. 8, 2012.
Kim, S. et al., "A Secure and Efficient Metering Scheme for Internet Advertising", Journal of KISS: Computer Systems and Theory, 2002, 29(3-4) 153-160.
KR Preliminary Rejection for Application No. 10-2007-7012294, Reference 310476.07, Jul. 4, 2012.
Kwok, Sai H., "Digital Rights Management for the Online Music Business", ACM SIGecom Exchanges, vol. 3, No. 3, (Aug. 2002), pp. 17-24.
Lampson, Butler et al., "Authentication in Distributed Systems: Theory and Practice", ACM Transactions on Computer Systems, v10, 265 (1992), 18 pages.
Linn, "Privacy Enhancement for Internet Email—Part I: Message Encryption and Authentication Procedures", RFC 1421, pp. 1-37, (Feb. 1993).
Looi, "A Note on Supplying a Trusted Clock via a Secure Device", Computers & Security, Sep. 7, 1994.
Lotspiech, "Broadcast Encryption's Bright Future", IEEE Computer, Aug. 2002.
*Magic Desktop Automation Suite for the Small and Mid-Sized Business*, printed from www.remedy.com/soultions/magic_it_suite.htm on Sep. 7, 2005 (Copyright 2005), 4 pages.
Malamud, "Network-Based Authentification: The Key to Security, " Network Computing, Jun. 1991, 98-100.
Memon, "Protecting Digital Media Content", Communications of the ACM Jul. 1998.
*Migo by Power House Technologies Group*, http://www.4migo.com, Retrieved from the Internet Jun. 1, 2005, (Copyright 2003), 3 pages.
Monitor Spearheads Call Logging Entry, Electronics Weekly, Mar. 6, 1985, 1 page.
Morales, Tatiana "Understanding Your Credit Score", http://www.cbsnews.com/stories/2003/04/29/earlyshow/contributors/raymartin/main55152.shtml retrieved from the Internet on Apr. 23, 2009, (Apr. 30, 2003), 3 pages.
Mufti, Dr. Muid et al., "Design and Implementation of a Secure Mobile IP Protocol", Networking and Communication, INCC 204, International Conference on Jun. 11-13, 2004, (2004), 5 pages.
MX Office Action for Application No. MX/a2007005660, Jul. 7, 2009.

(56) References Cited

OTHER PUBLICATIONS

Nakajima, S. "Do You Really Know It? Basics of Windows2000/XP Network, 4th Installment, What is Logon Like?", Nikkei Business Publications, Inc., (Jan. 2004), pp. 116-121.
*Next step is Encryption: data security many be bundled with next's operating system*, Electronic Times, 1992, p. 18 (from DialogClassic Web™, file 16, acc. No. 02103190).
Notice of Acceptance mailed Oct. 14, 2010, AU Application No. 2005222507, 3 pages.
Ogata, "Provably Secure Metering Scheme", ASIACRYPT 2000, Dec. 3, 2000.
Olson, M. et al., Concurrent access licensing, pp. 67-72, UNIX Review, vol. 6 No. 9 Sep. 1988 (from Dialog acc. No. 01254918.
*Optimizing license checkouts from a floating license server*, Arm the Architecture for the Digital World, from http://www.arm.com/support/faqdev/1391.html.
PCT International Search Report and Written Opinion for Application No. PCT/US05/40965, reference 311052 02, Apr. 25, 2007.
*Postal service announce plan to put postmarks on electronic mail*, San Jose Mercury Mews. 1995, (from DialogClassic Web, file 9, acc. No. 00618375.
Schneck, P.B., "Persistent Access Control to Prevent Piracy of Digital Information, ", Proc. Of the IEEE, Jul. 1999, 87(7), 1239-1250.
Schubert, "Radios Controlled Standard Clock Uses Digital Correlation", Elektronik, 1997. (English language abstract provided).
Shen, "A New Digital Watermarking Technique for Video", ACM, Visual '02, Nov. 13, 2002.
Shi, Changgui et al., "A Fast MPEG Video Encryption Algorithm", 1998, Bristol, UK; pp. 81-88.
Slusallek, "Vision-An Architecture for Global Illumination Calculation", IEEE Transactions on Visualization and Computer Graphics, vol. 1, No. 1, Mar. 1995, pp. 77-96.
*Sony Develops Copyright Protection Solutions for Digital Music Content*, PR Newswire, Feb. 25, 1999, 4 pages.
Steinebach, "Digital Watermaking Basics—Applications—Limits", NFD Information—Wissenschaft and Praxis, Jul. 2002.
Takura, "A Secure and Trusted Time Stamping Authority", IWS 1999, IEEE, Feb. 18, 1999.
*TCG Specification Architecture Overview*, Revision 1.2, (Apr. 28, 2004), 55 pages.
*Technological Solutions Rise to Complement Law's Small Stick Guarding Electronic Works*, Information Law Alert, Jun. 16, 1995-, 3-4 and 7.
*The New Network: Planning and Protecting Intranet Electronic Commerce*, Information week, Dec. 2, 1996, 2 pages.
Thompson, C. et al., Digital Licensing, IEEE Internet Computing, Jul./Aug. 2005 (vol. 9 No. 4).
Tyler, L. Chin "Reaching out physicians, " Health Data Management, 1998, 6(9), pp. 36,38,40 (from DialogClassic Web™, file 13, acc. No. 00588764).
U.S. Appl. No. 09/449,106, Amendment and Response filed Jan. 29, 2003, 11 pages.
U.S. Appl. No. 09/449,106, Amendment and Response filed Jul. 23, 2002, 14 pages.
U.S. Appl. No. 09/449,106, Non-Final Office Action mailed Mar. 26, 2002, 14 pages.
U.S. Appl. No. 09/449,106, Non-Final Office Action mailed Oct. 22, 2002, 10 pages.
U.S. Appl. No. 09/449,106, Notice of Allowance mailed Jan. 3, 2004, 13 pages.
U.S. Appl. No. 09/526,290, Amendment and Response filed Jan. 29, 2003, 12 pages.
U.S. Appl. No. 09/526,290, Non-Final Office Action mailed Oct. 22, 2002, 10 pages.
U.S. Appl. No. 09/526,290, Notice of Allowance mailed Jan. 30, 2004, 11 pages.
U.S. Appl. No. 09/526,291, Amendment and Response filed Apr. 15, 2004, 24 pages.
U.S. Appl. No. 09/526,291, Non-Final Office Action mailed Nov. 25, 2003, 17 pages.
U.S. Appl. No. 09/526,291, Notice of Allowance mailed Jul. 13, 2004, 4 pages.
U.S. Appl. No. 09/526,292, Amendment and Response filed Jan. 26, 2004, 12 pages.
U.S. Appl. No. 09/526,292, Non-Final Office Action mailed Nov. 17, 2003, 10 pages.
U.S. Appl. No. 09/526,292, Notice of Allowance mailed Jun. 9, 2004, 5 pages.
U.S. Appl. No. 09/645,887, Final Office Action mailed Aug. 10, 2005, 11 pages.
U.S. Appl. No. 09/645,887, Non- Final Office Action filed Feb. 9, 2005, 10 pages.
U.S. Appl. No. 09/645,887, Non-Final Office Action mailed Mar. 25, 2004, 11 pages.
U.S. Appl. No. 09/645,887, Notice of Allowance mailed Nov. 30, 2005, 7 pages.
U.S. Appl. No. 10/971,346, Final Rejection mailed Jul. 16, 2013, 17 pages.
U.S. Appl. No. 11/107,014, Non-Final Rejection mailed Sep. 5, 2013, 12 pages.
U.S. Appl. No. 11/353,321, Amendment and Response filed Aug. 20, 2013, 21 pages.
U.S. Appl. No. 11/353,321, Non-Final Rejection mailed May 21, 2013, 15 pages.
U.S. Appl. No. 11/866,041, Non-Final Rejection mailed Jun. 14, 2013, 9 pages.
U.S. Appl. No. 12/053,090, Notice of Allowance mailed Sep. 23, 2013, 14 pages.
U.S. Appl. No. 12/832,831, Notice of Allowance mailed Oct. 3, 2013, 14 pages.
U.S. Appl. No. 13/367,198, Amendment and Response filed Jul. 9, 2013, 12 pages.
*Using Windows Media Rights Manager to Protect and Distribute Digital Rights Media*, Windows Media Technologies (Online): XP002307161; http://msdn.microsoft/msdnmag/issues/01/12/DRM/print.asp, (Dec. 1, 2001).
Utagawa, Mari et al., "Creation of Card Application by IC Card OS 'MULTOS' Which Can Rewrite Application", Interface, vol. 29, No. 3. ISSN: 0387-9569, CQ Publishing Co. Ltd., (Mar. 1, 2003), pp. 46-55.
Vernon, P., "Improved identification schemes based on error-correcting codes, " AAECC, 1997, 57-69.
*WDM Audio Design Considerations*, Copyright 2004, intelligraphics.com, Intelligraphics Device Drivers, Printed Apr. 15, 2005.
*WebServUSB Quick Start, ItWorks*, http://www.webservusb.com, Retrieved from the Internet Jun. 1, 2005 (Copyright 2004), 16 pages.
Yue, Wei T., et al., "The Reward Based Online Shopping Community", Routledge, vol. 10, No. 4, (Oct. 1, 2000), 2 pages.
Zemao, Chen et al., *"A Malicious Code Immune Model Based on Program Encryption"*, IEEE—Wireless Communication, Networking and Mobile Computing, WICOM '08, 4th International Conference on Oct. 12-14, 2008 (2008), 5 pages.
Zhao, Hua "A New Watermarking Scheme for CAD Engineering Drawings", 9th Intl. Conf. Computer-Aided Industrial Design and Conceptual Design: CAID/CD 2008; Nov. 22-25, 2008.
Canadian Application 2505295, Office Action mailed Nov. 19, 2013, 4 pages.
India Application 914/DEL/2005, First Examination Report mailed Nov. 26, 2013, 2 pages.
U.S. Appl. No. 10/971,346, Final Office Action mailed Nov. 7, 2013, 22 pages.
U.S. Appl. No. 11/107,014, Amendment and Response filed Dec. 5, 2013, 13 pages.
U.S. Appl. No. 11/353,321, Final Office Action mailed Dec. 5, 2013, 15 pages.
U.S. Appl. No. 11/107,014, Notice of Allowance mailed Dec. 23, 2013, 6 pages.
U.S. Appl. No. 12/053,090, Notice of Allowance mailed Nov. 18, 2013, 9 pages.
U.S. Appl. No. 13/367,198, Final Office Action mailed Oct. 25, 2013, 15 pages.

\* cited by examiner

| SRL 308 | CONTENT INFO | DRM SERVER INFO | -(PU-DRM(K2)) | -REFERRAL INFO | --URL | --FALL-BACK | RIGHTS LABEL INFO | (K2(RIGHTSDATA)) | (K2(CK)) | S (PR-DRM) |

FIG. 4A

ISSUING A PUBLISHER USE LICENSE OFF-LINE IN A DIGITAL RIGHTS MANAGEMENT (DRM) SYSTEM

CROSS-REFERENCE TO RELATED APPLICATIONS

This application is a continuation application and claims priority to U.S. patent application Ser. No. 12/053,090, filed Mar. 21, 2008, entitled "Issuing a Publisher Use License Off-Line in a Digital Rights Management (DRM) System," which application is a continuation application and claims priority to U.S. patent application Ser. No. 10/373,621 (now U.S. Pat. No. 7,370,212), filed Feb. 25, 2003, entitled "Issuing a Publisher Use License Off-Line in a Digital Rights Management (DRM) System," which applications are incorporated herein by reference in their entirety.

The following U.S. patent applications disclose subject matter that is related to the subject matter of the present application, and are hereby incorporated herein by reference in their entirety:

U.S. patent application Ser. No. 10/185,527 (now U.S. Pat. No. 7,353,402), filed Jun. 28, 2002 under and entitled "Obtaining a Signed Rights Label (SRL) for Digital Content and Obtaining a Digital License Corresponding to the Content Based on the SRL in a Digital Rights Management System";

U.S. patent application Ser. No. 10/185,278 (now U.S. Pat. No. 7,549,060), filed Jun. 28, 2002 under and entitled "Using a Rights Template to Obtain a Signed Rights Label (SRL) for Digital Content in a Digital Rights Management System";

U.S. patent application Ser. No. 10/185,511 (now U.S. Pat. No. 7,891,007), filed Jun. 28, 2002 under and entitled "Systems And Methods For Issuing Usage Licenses For Digital Content And Services";

U.S. patent application Ser. No. 10/364,627 (now U.S. Pat. No. 7,577,999), filed Feb. 11, 2003 under and entitled "Publishing Digital Content Within an Organization in Accordance with a Digital Rights Management (DRM) System;

U.S. patent application Ser. No. 10/364,115 (now Abandoned), filed Feb. 11, 2003 under and entitled "Publishing Digital Content Within an Organization in Accordance with a Digital Rights Management (DRM) System; and U.S. Pat. No. 7,308,573, issued Dec. 11, 2007 and entitled "Enrolling/Sub-Enrolling a Digital Rights Management (DRM) Server Into a DRM Architecture".

TECHNICAL FIELD

This invention relates to a digital rights management (DRM) system. More particularly, the invention relates to employing a DRM system to publish digital content in an organization such as an office or corporation or the like such that rendering and use of the content within the organization may be constrained according to corresponding use or license terms. Even more particularly, the present invention relates to publishing content without contacting a server for approval and issuing oneself a publisher use license to render the published content without contacting the server for approval.

BACKGROUND OF THE INVENTION

Digital rights management and enforcement is highly desirable in connection with digital content such as digital audio, digital video, digital text, digital data, digital multimedia, etc., where such digital content is to be distributed to one or more users. Digital content could be static, such as a text document, for example, or it could be streamed, such as the streamed audio/video of a live event. Typical modes of distribution include tangible devices such as a magnetic (floppy) disk, a magnetic tape, an optical (compact) disk (CD), etc., and intangible media such as an electronic bulletin board, an electronic network, the Internet, etc. Upon being received by the user, such user renders or 'plays' the digital content with the aid of an appropriate rendering device such as a media player on a personal computer or the like.

In one scenario, a content owner or rights-owner such as an author, a publisher, a broadcaster, etc., wishes to distribute such digital content to each of many users or recipients in exchange for a license fee or some other consideration. In such scenario, then, the content may be a song, an album of songs, a movie, etc., and the purpose of the distribution is to generate the license fees. Such content owner, given the choice, would likely wish to restrict what the user can do with such distributed digital content. For example, the content owner would like to restrict the user from copying and re-distributing such content to a second user, at least in a manner that denies the content owner a license fee from such second user.

In addition, the content owner may wish to provide the user with the flexibility to purchase different types of use licenses at different license fees, while at the same time holding the user to the terms of whatever type of license is in fact purchased. For example, the content owner may wish to allow distributed digital content to be played only a limited number of times, only for a certain total time, only on a certain type of machine, only on a certain type of media player, only by a certain type of user, etc.

In another scenario, a content developer, such as an employee in or member of an organization, wishes to distribute such digital content to one or more other employees or members in the organization or to other individuals outside the organization, but would like to keep others from rendering the content. Here, the distribution of the content is more akin to organization-based content sharing in a confidential or restricted manner, as opposed to broad-based distribution in exchange for a license fee or some other consideration.

In such scenario, then, the content may be a document presentation, spreadsheet, database, email, or the like, such as may be exchanged within an office setting, and the content developer may wish to ensure that the content stays within the organization or office setting and is not rendered by non-authorized individuals, such as for example competitors or adversaries. Again, such content developer wishes to restrict what a recipient can do with such distributed digital content. For example, the content owner would like to restrict the user from copying and re-distributing such content to a second user, at least in a manner that exposes the content outside the bounds of individuals who should be allowed to render the content.

In addition, the content developer may wish to provide various recipients with different levels of rendering rights. For example, the content developer may wish to allow protected digital content to be viewable and not printable with respect to one class of individual, and viewable and printable with respect to another class of individual.

However, and in either scenario, after distribution has occurred, such content owner/developer has very little if any control over the digital content. This is especially problematic in view of the fact that practically every personal computer includes the software and hardware necessary to make an exact digital copy of such digital content, and to download such exact digital copy to a writeable magnetic or optical disk, or to send such exact digital copy over a network such as the Internet to any destination.

Of course, as part of a transaction wherein the content is distributed, the content owner/developer may require the user/recipient of the digital content to promise not to re-distribute such digital content in an unwelcome manner. However, such a promise is easily made and easily broken. A content owner/developer may attempt to prevent such re-distribution through any of several known security devices, usually involving encryption and decryption. However, there is likely very little that prevents a mildly determined user from decrypting encrypted digital content, saving such digital content in an un-encrypted form, and then re-distributing same.

A need exists, then, for providing a digital rights management (DRM) and enforcement architecture and method that allows the controlled rendering or playing of arbitrary forms of digital content, where such control is flexible and definable by the content owner/developer of such digital content. More specifically, a need exists for such an architecture that allows and facilitates such controlled rendering, especially in an office or organization environment or the like where documents are to be shared amongst a defined group of individuals or classes of individuals. Even more specifically, a need exists for such an architecture that allows content to be published without first gaining approval from a server and that allows the publishing individual to issue itself a use license to render the published content without contacting the server for approval.

SUMMARY OF THE INVENTION

The aforementioned needs are satisfied at least in part by the present invention in which a publishing user publishes digital content and issues to itself a corresponding digital publisher license to allow itself to render the published digital content. The publishing user is supplied with a publishing certificate from a digital rights management (DRM) server, where the publishing certificate has a public key (PU-OLP) and a corresponding private key (PR-OLP) encrypted by a public key associated with the publishing user (PU-ENTITY) to form (PU-ENTITY(PR-OLP)).

The content is developed and encrypted according to a content key (CK), and a rights label is created for the encrypted content with (CK) encrypted by a public key of the DRM server (PU-DRM) to form (PU-DRM(CK)). (PU-ENTITY(PR-OLP)) is retrieved from the publishing certificate, a private key (PR-ENTITY) corresponding to (PU-ENTITY) is applied to (PU-ENTITY(PR-OLP)) to obtain (PR-OLP), and the created rights label is signed with (PR-OLP) to create a signed rights label (SRL). The created SRL and the publishing certificate are then concatenated to the encrypted content to form a content package distributable to another user which has to contact the DRM server to obtain a corresponding license with (CK) to render the encrypted content therein. Significantly, only such DRM server has a private key (PR-DRM) corresponding to (PU-DRM) and is able to apply (PR-DRM) to (PU-DRM(CK)) to obtain (CK).

License data corresponding to the content package is also created and has (CK) encrypted by a (PU-ENTITY) to form (PU-ENTITY(CK)), the created license data is signed with (PR-OLP) to create the publisher license, and the publishing certificate is attached to the publisher license. Only the publishing user having (PR-ENTITY) corresponding to (PR-ENTITY) can apply such (PR-ENTITY) to (PU-ENTITY (CK)) from the publisher license to obtain (CK) and thereby decrypt the encrypted content therewith for rendering.

In particular, the publishing user verifies the publishing certificate based on the chain of certificates, obtains (PU-OLP) from the publishing certificate, and employs the obtained (PU-OLP) to verify the signature of the publisher license. Thereafter, the publishing user retrieves (PU-ENTITY(CK)) from the verified publisher license, applies to (PU-ENTITY(CK)) a private key (PR-ENTITY) corresponding to (PU-ENTITY) to obtain (CK), and applies (CK) to (CK(content)) to result in the content. The content is then forwarded to a rendering application for actual rendering.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings:

FIG. 4A is a block diagram showing the structure of a signed rights label as produced by the method of FIG. 4;

DETAILED DESCRIPTION OF THE INVENTION

Computer Environment

Figure 1:
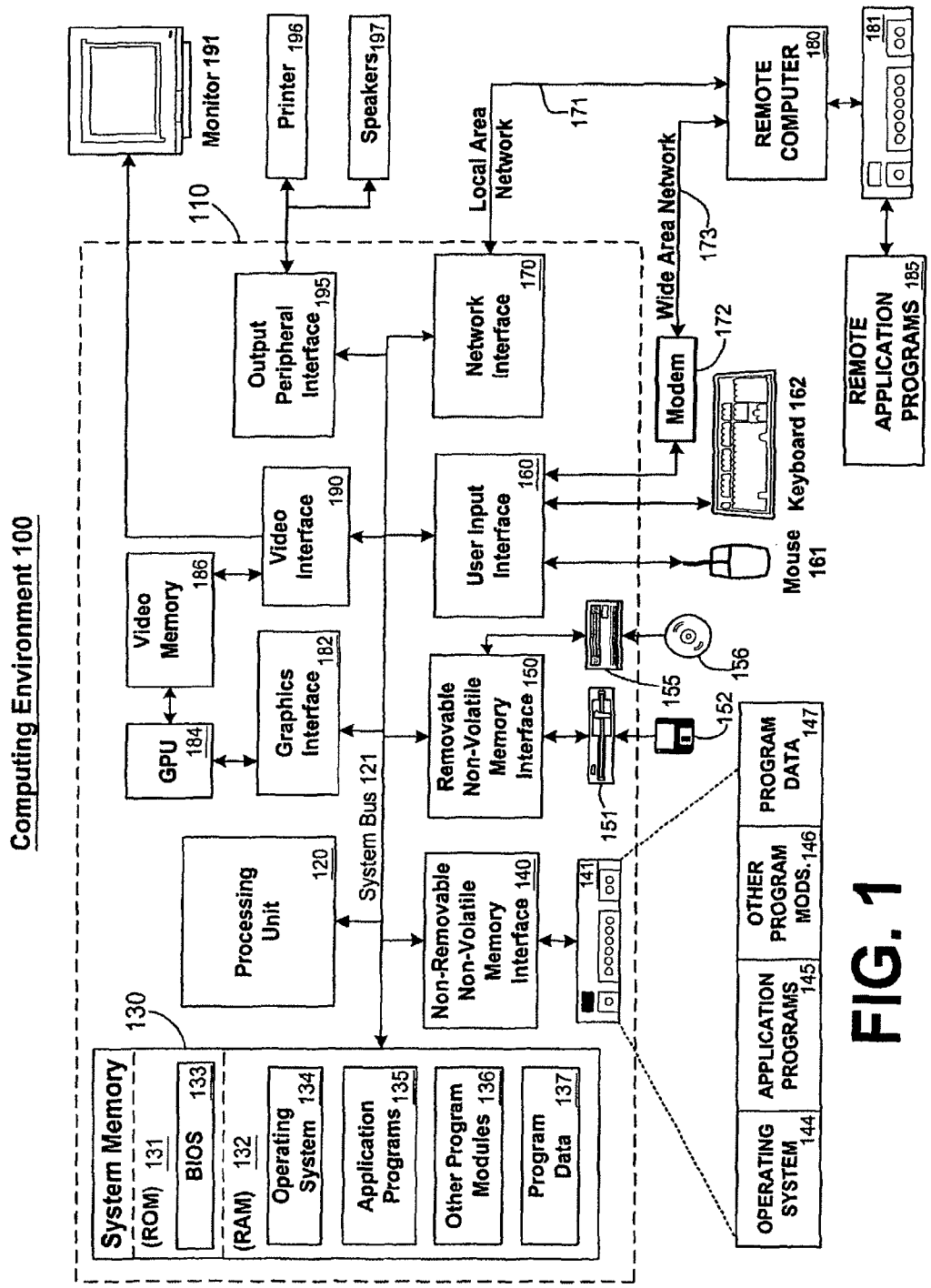
FIG. 1 is a block diagram representing an exemplary non-limiting computing environment in which the present invention may be implemented.

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of co-processing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Distributed computing facilitates sharing of computer resources and services by direct exchange between computing devices and systems. These resources and services include the exchange of information, cache storage, and disk storage for files. Distributed computing takes advantage of network connectivity, allowing clients to leverage their collective power to benefit the entire enterprise. In this regard, a variety of devices may have applications, objects or resources that may interact to implicate authentication techniques of the present invention for trusted graphics pipeline(s).

Figure 2:
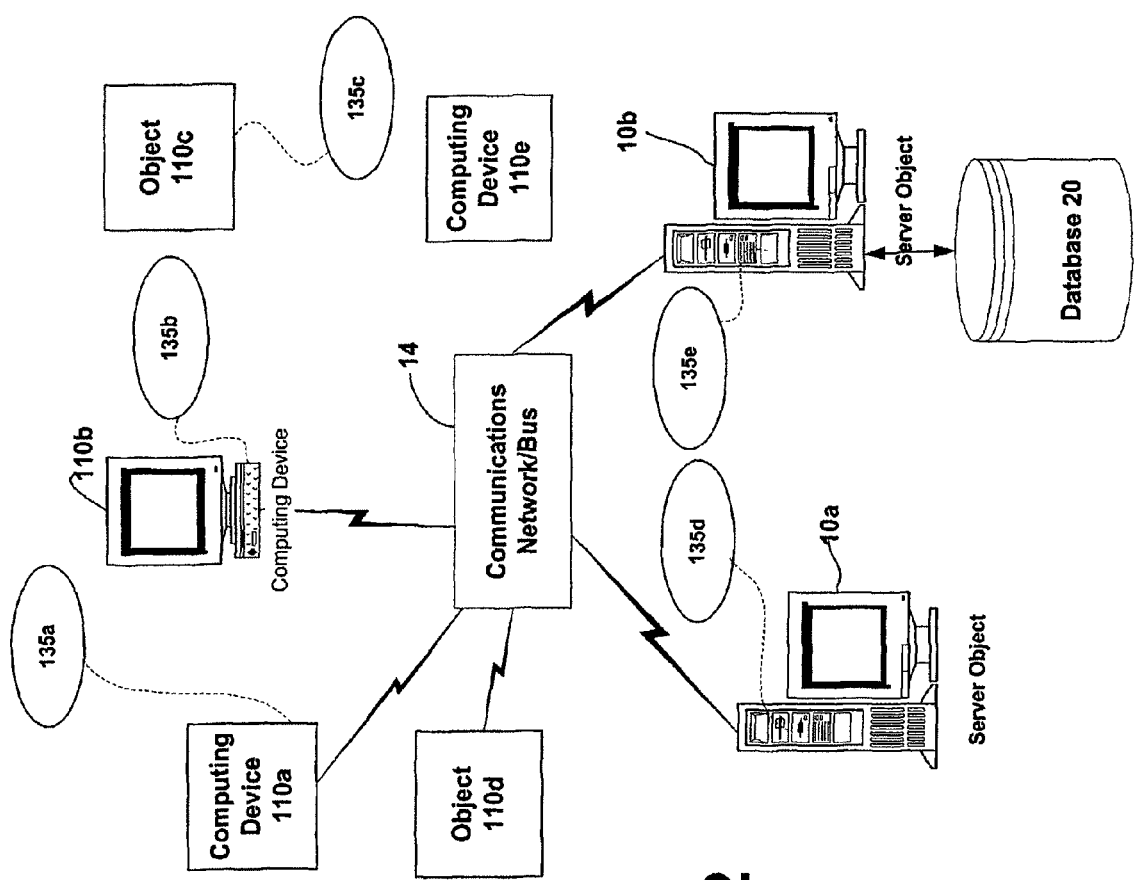
FIG. 2 is a block diagram representing an exemplary network environment having a variety of computing devices in which the present invention may be implemented.

FIG. 2 provides a schematic diagram of an exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, televisions, MP3 players, televisions, personal computers, etc. Each object can communicate with another object by way of the communications network 14. This network may itself comprise other computing objects and computing devices that provide services to the system of FIG. 2. In accordance with an aspect of the invention, each object 10 or 110 may contain an application that might request the authentication techniques of the present invention for trusted graphics pipeline(s).

It can also be appreciated that an object, such as 110c, may be hosted on another computing device 10 or 110. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wireline or wireless systems, by local networks or widely distributed networks. Currently, many of the networks are coupled to the Internet, which provides the infrastructure for widely distributed computing and encompasses many different networks.

In home networking environments, there are at least four disparate network transport media that may each support a unique protocol such as Power line, data (both wireless and wired), voice (e.g., telephone) and entertainment media. Most home control devices such as light switches and appliances may use power line for connectivity. Data Services may enter the home as broadband (e.g., either DSL or Cable modem) and are accessible within the home using either wireless (e.g., HomeRF or 802.11b) or wired (e.g., Home PNA, Cat 5, even power line) connectivity. Voice traffic may enter the home either as wired (e.g., Cat 3) or wireless (e.g., cell phones) and may be distributed within the home using Cat 3 wiring. Entertainment media may enter the home either through satellite or cable and is typically distributed in the home using coaxial cable. IEEE 1394 and DVI are also emerging as digital interconnects for clusters of media devices. All of these network environments and others that may emerge as protocol standards may be interconnected to form an intranet that may be connected to the outside world by way of the Internet. In short, a variety of disparate sources exist for the storage and transmission of data, and consequently, moving forward, computing devices will require ways of protecting content at all portions of the data processing pipeline.

The 'Internet' commonly refers to the collection of networks and gateways that utilize the TCP/IP suite of protocols, which are well-known in the art of computer networking. TCP/IP is an acronym for "Transport Control Protocol/Interface Program." The Internet can be described as a system of geographically distributed remote computer networks interconnected by computers executing networking protocols that allow users to interact and share information over the networks. Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer e.g., a server. In the example of FIG. 2, computers $110a$, $110b$, etc. can be thought of as clients and computer $10a$, $10b$, etc. can be thought of as the server where server $10a$, $10b$, etc. maintains the data that is then replicated in the client computers $110a$, $110b$, etc.

A server is typically a remote computer system accessible over a remote network such as the Internet. The client process may be active in a first computer system, and the server process may be active in a second computer system, communicating with one another over a communications medium, thus providing distributed functionality and allowing multiple clients to take advantage of the information-gathering capabilities of the server.

Client and server communicate with one another utilizing the functionality provided by a protocol layer. For example, Hypertext-Transfer Protocol (HTTP) is a common protocol that is used in conjunction with the World Wide Web (WWW). Typically, a computer network address such as a Universal Resource Locator (URL) or an Internet Protocol (IP) address is used to identify the server or client computers to each other. The network address can be referred to as a Universal Resource Locator address. For example, communication can be provided over a communications medium. In particular, the client and server may be coupled to one another via TCP/IP connections for high-capacity communication.

Thus, FIG. 2 illustrates an exemplary networked or distributed environment, with a server in communication with client computers via a network/bus, in which the present invention may be employed. In more detail, a number of servers $10a$, $10b$, etc., are interconnected via a communications network/bus 14, which may be a LAN, WAN, intranet, the Internet, etc., with a number of client or remote computing devices $110a$, $110b$, $110c$, $110d$, $110e$, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to process, store or render secure content from a trusted source.

In a network environment in which the communications network/bus 14 is the Internet, for example, the servers 10 can be Web servers with which the clients $110a$, $110b$, $110c$, $110d$, $110e$, etc. communicate via any of a number of known protocols such as HTTP. Servers 10 may also serve as clients 110, as may be characteristic of a distributed computing environment. Communications may be wired or wireless, where appropriate. Client devices 110 may or may not communicate via communications network/bus 14, and may have independent communications associated therewith. For example, in the case of a TV or VCR, there may or may not be a networked aspect to the control thereof. Each client computer 110 and server computer 10 may be equipped with various application program modules or objects 135 and with connections or access to various types of storage elements or objects, across which files may be stored or to which portion(s) of files may be downloaded or migrated. Thus, the present invention can be utilized in a computer network environment having client computers $110a$, $110b$, etc. that can access and interact with a computer network/bus 14 and server computers $10a$, $10b$, etc. that may interact with client computers $110a$, $110b$, etc. and other devices 111 and databases 20.

Digital Rights Management (DRM) Overview

Figure 11:
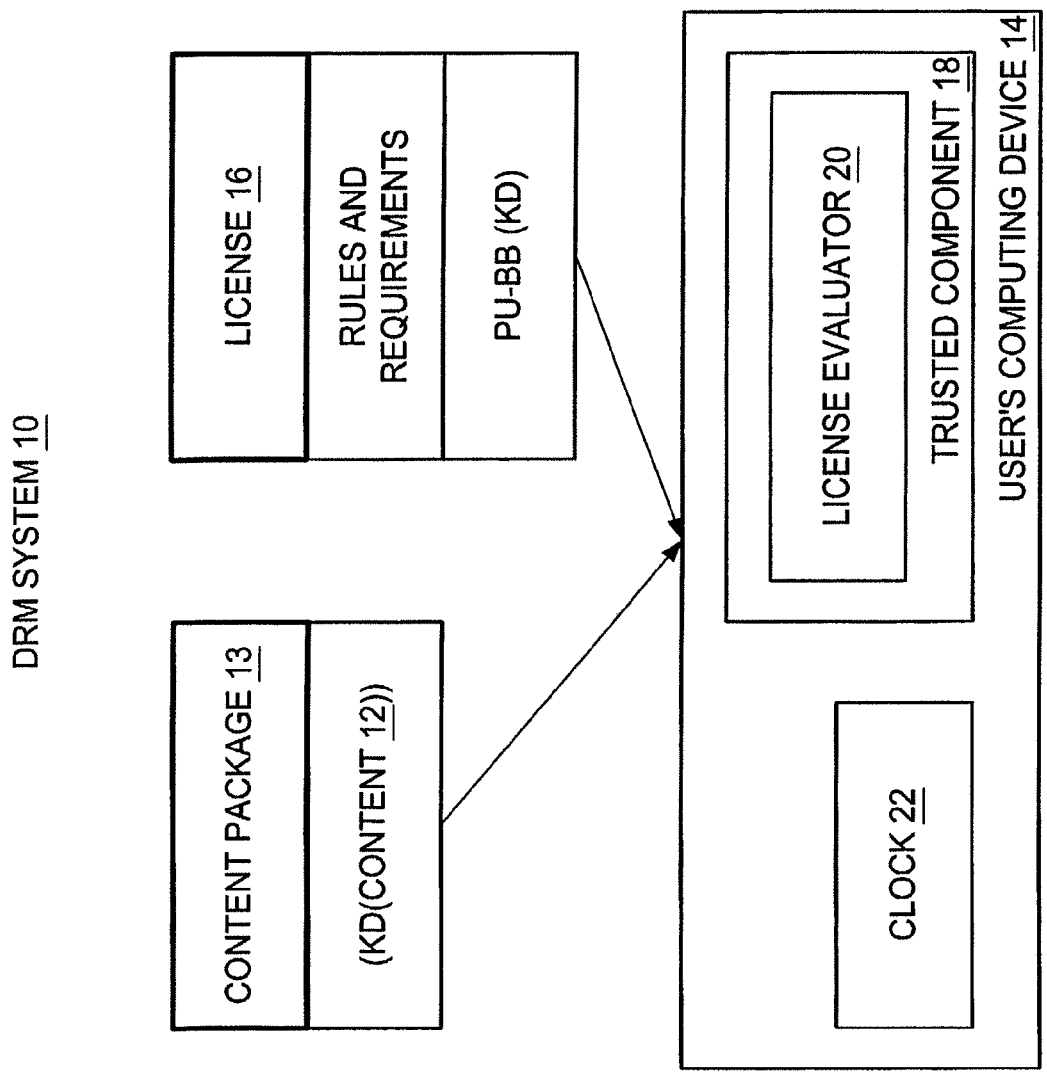
FIG. 11 is a block diagram showing an enforcement architecture of an example of a trust-based system.

As is known, and referring now to FIG. 11, digital rights management (DRM) and enforcement is highly desirable in connection with digital content 12 such as digital audio, digital video, digital text, digital data, digital multimedia, etc., where such digital content 12 is to be distributed to users. Upon being received by the user, such user renders or 'plays' the digital content with the aid of an appropriate rendering device such as a media player on a personal computer 14 or the like.

Typically, a content owner or developer (hereinafter 'owner') distributing such digital content 12 wishes to restrict what the user can do with such distributed digital content 12. For example, the content owner may wish to restrict the user from copying and re-distributing such content 12 to a second user, or may wish to allow distributed digital content 12 to be played only a limited number of times, only for a certain total time, only on a certain type of machine, only on a certain type of media player, only by a certain type of user, etc.

However, after distribution has occurred, such content owner has very little if any control over the digital content 12. A DRM system 10, then, allows the controlled rendering or playing of arbitrary forms of digital content 12, where such control is flexible and definable by the content owner of such digital content. Typically, content 12 is distributed to the user in the form of a package 13 by way of any appropriate distribution channel. The digital content package 13 as distributed may include the digital content 12 encrypted with a symmetric encryption/decryption key (KD), (i.e., (KD(CONTENT))), as well as other information identifying the content, how to acquire a license for such content, etc.

The trust-based DRM system 10 allows an owner of digital content 12 to specify license rules that must be satisfied before such digital content 12 is allowed to be rendered on a user's computing device 14. Such license rules can include the aforementioned temporal requirement, and may be embodied within a digital license or use document (hereinafter 'license') 16 that the user/user's computing device 14 (hereinafter, such terms are interchangeable unless circumstances require otherwise) must obtain from the content owner or an agent thereof. Such license 16 also includes the decryption key (KD) for decrypting the digital content, perhaps encrypted according to a key decryptable by the user's computing device.

The content owner for a piece of digital content 12 must trust that the user's computing device 14 will abide by the rules and requirements specified by such content owner in the license 16, i.e. that the digital content 12 will not be rendered unless the rules and requirements within the license 16 are satisfied. Preferably, then, the user's computing device 14 is provided with a trusted component or mechanism 18 that will not render the digital content 12 except according to the license rules embodied in the license 16 associated with the digital content 12 and obtained by the user.

The trusted component 18 typically has a license evaluator 20 that determines whether the license 16 is valid, reviews the license rules and requirements in such valid license 16, and determines based on the reviewed license rules and requirements whether the requesting user has the right to render the requested digital content 12 in the manner sought, among other things. As should be understood, the license evaluator 20 is trusted in the DRM system 10 to carry out the wishes of the owner of the digital content 12 according to the rules and requirements in the license 16, and the user should not be able to easily alter such trusted element for any purpose, nefarious or otherwise.

As should be understood, the rules and requirements in the license 16 can specify whether the user has rights to render the digital content 12 based on any of several factors, including who the user is, where the user is located, what type of computing device the user is using, what rendering application is calling the DRM system, the date, the time, etc. In addition, the rules and requirements of the license 16 may limit the license 16 to a pre-determined number of plays, or pre-determined play time, for example.

The rules and requirements may be specified in the license 16 according to any appropriate language and syntax. For example, the language may simply specify attributes and values that must be satisfied (DATE must be later than X, e.g.), or may require the performance of functions according to a specified script (IF DATE greater than X, THEN DO . . . , e.g.).

Upon the license evaluator 20 determining that the license 16 is valid and that the user satisfies the rules and requirements therein, the digital content 12 can then be rendered. In particular, to render the content 12, the decryption key (KD) is obtained from the license 12 and is applied to (KD(CONTENT)) from the content package 13 to result in the actual content 12, and the actual content 12 is then in fact rendered.

Publishing Digital Content

Figure 3:
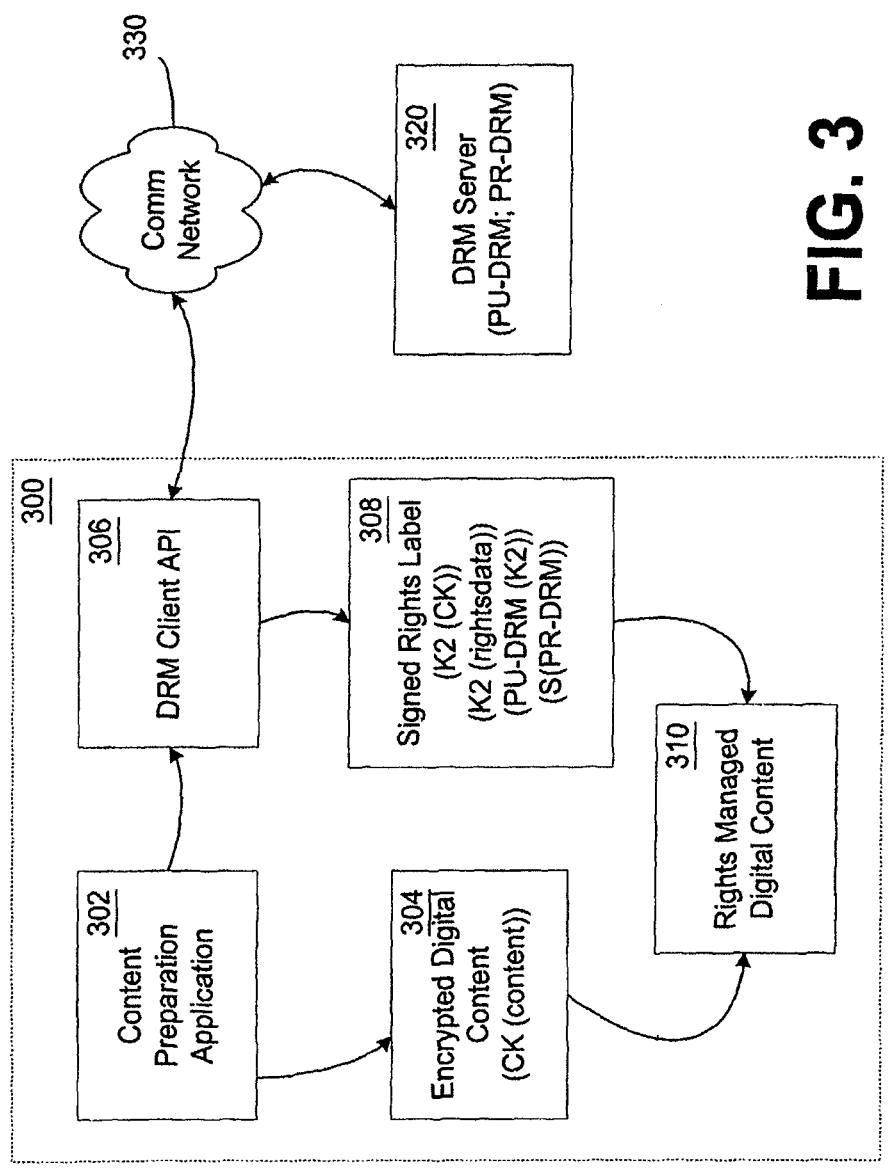
FIG. 3 is a functional block diagram of a preferred embodiment of a system and method according to the invention for publishing digital content.

FIG. 3 is a functional block diagram of a system and method for publishing digital content. "Publishing," as that term is used herein, refers to a process that an application or service follows to establish with a trusted entity a set of rights and conditions that the entity can issue for that content, as well as to whom those rights and conditions can be issued. According to the invention, the publishing process includes encrypting the digital content and associating a list of persistent enforceable rights that the author of the content intended for all possible users of the content. This process can be carried out in a secure way to prohibit access to any of the rights or to the content unless intended by the author of the content.

Three entities in particular are employed to publish secure digital content: a content preparation application 302 that executes on the client 300 and prepares the content for publishing, a digital rights management (DRM) applications program interface (API) 306 that also resides on the client device 300, and a DRM server 320 that is communicatively coupled to the client 300 via a communication network 330 such as the Internet, a local or wide area network, or a combination thereof.

The content preparation application 302 can be any application that produces digital content. For example, the application 302 can be a word processor or other publisher that produces digital text files, digital music, video, or other such content. The content could also include streamed content, such as streamed audio/video of a live or taped event, or example. The application 302 is provided with a cryptographic key to encrypt the digital content, thus forming an encrypted digital content file 304, and the user provides rights data to be tightly associated with the encrypted content in the digital content file 304. The rights data includes an identity for each entity that has rights in the digital content, and a set of rights and conditions for each identified entity.

Such an entity can be, for example, an individual, a class of individuals, or a device. Such rights can include the right to read, edit, copy, print, etc, the digital content. Conditions may include minimum system requirements, date and time limitations, play counts, and the like.

The client API 306 passes the encrypted digital content and the rights data to the DRM server 320. Using a process that is described in detail below, the DRM server 320 determines whether it can enforce the rights data and if so the DRM server 320 signs the rights data to form a signed rights label (SRL) 308. In general, however, any trusted entity can sign the rights data, preferably using a key trusted by the DRM server 320. For example, a client can sign the rights data using a key provided to it by the DRM server 320.

The rights label 308 can include data representing the rights description, the encrypted content key, and the digital signature over the rights description and the encrypted content key. If the DRM server 320 is signing the right label, it passes the signed rights label 308 back to the client through the client API 306, which stores the signed rights label 308 on the client device 300. The content preparation application 302 then associates the signed rights label 308 with the encrypted digital content file 304, such as for example by concatenation to form a rights managed content file 310. Note, though, that the SRL 308 could be stored in a known location separate from the content file 304 with a reference to the SRL 308 concatenated to the content file 304 to form the content file 310.

Figure 4:
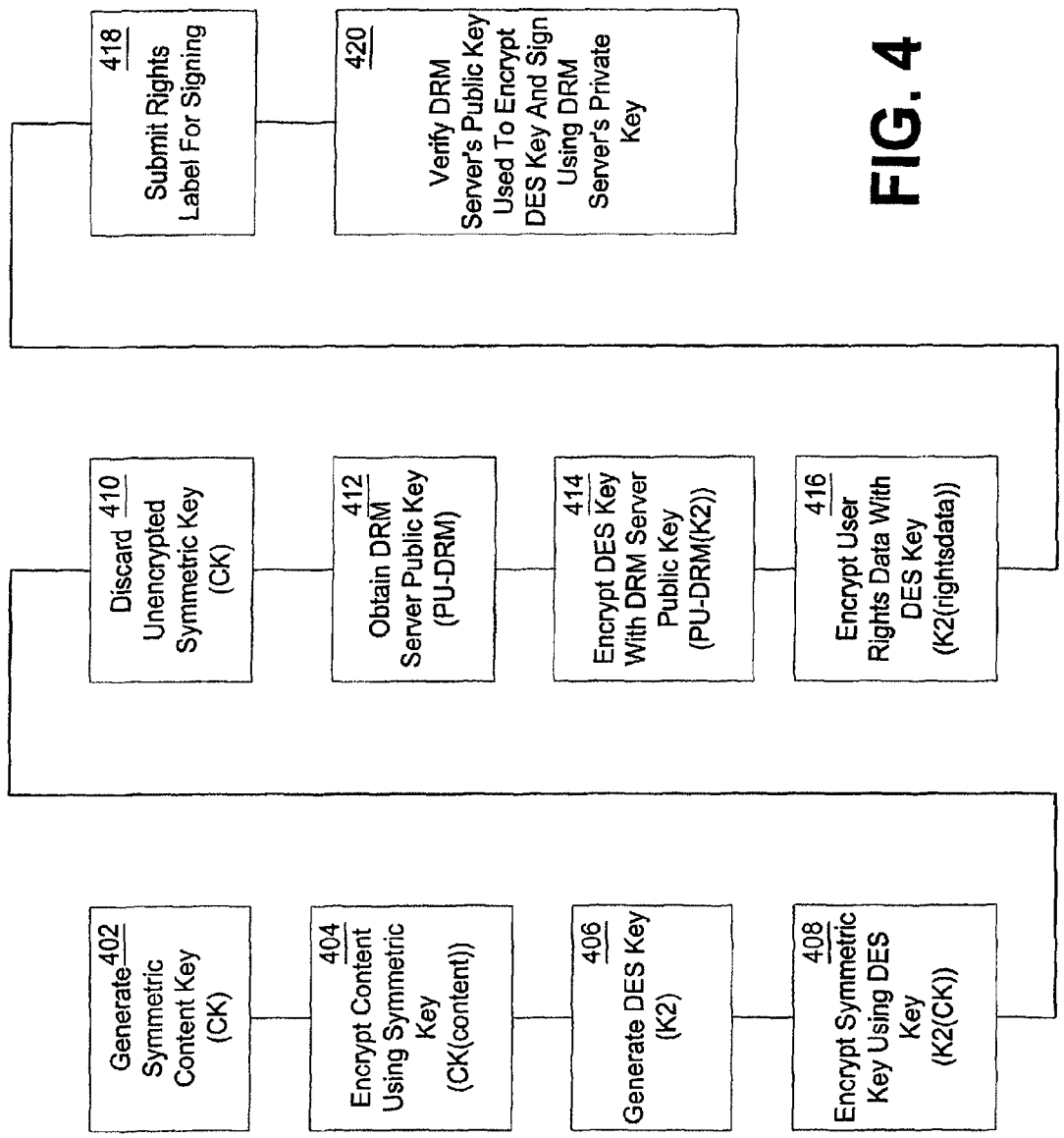
FIG. 4 is a flowchart of a preferred embodiment of a method according to the invention for publishing rights managed digital content.

Referring now to FIG. 4, one method for publishing rights managed digital content is shown. At step 402, the application 302 generates a content key (CK) that is used to encrypt the digital content. The content key (CK) is typically a symmetric key although any key can be used to encrypt the digital content. As is known, a symmetric key is employed by a symmetric key algorithm both to encrypt and decrypt. Accordingly, (CK) should be well-hidden when shared between a sender and a receiver.

At step 404, the application 302 encrypts the digital content with (CK) to form encrypted digital content 304 (i.e., (CK (content))). Additionally, rights data corresponding to (CK (content)) is generated, either by the publisher of the content or by another entity. Note that such rights data may be custom rights data or rights data as obtained from a pre-defined template. As was discussed above, the rights data can include a list of entities that will be entitled to consume the content, the specific rights that each of the entities possesses with respect to the content, and any conditions that may be imposed on those rights.

At step 406, the API 306 generates a second encryption key (K2), which is used to encrypt the content key (CK). Preferably, (K2) is also a symmetric key. At step 408, the API 306 encrypts (CK) with (K2) to result in (K2(CK)). At step 410, the API 306 discards (CK), with the result being that (CK) can now be obtained only by decrypting (K2(CK)). To ensure that (CK(content)) is protected to a central DRM server 320 and that all "license requests" for the content are done centrally in accordance with the rights data, the API 306, at step 412, contacts the provided DRM server 320 and retrieves the public key (PU-DRM) thereof. At step 414, the API 306 encrypts (K2) with (PU-DRM) to result in (PU-DRM (K2)). Thus, (CK) can be protected to (PU-DRM)) to ensure that the DRM server 320 is the only entity that will be able to get access to (CK), as is required to decrypt (CK(content)). At step 416, the API 306 encrypts the rights data (i.e., the list of authorized entities and the respective rights and conditions associated with each authorized entities in the list) with (K2) to result in (K2(rightsdata)).

In an alternative embodiment, (CK) can be used to directly encrypt the rights data to result in (CK(rightsdata)), and (PU-DRM) can be used to directly encrypt (CK) to result in (PU-DRM(CK)), thereby foregoing the use of (K2) completely. However, using (K2) to encrypt the rights data and (CK) allows such (K2) to conform to any particular algorithm that might be amenable to the DRM server, whereas (CK) might be specified by an entity independent from the DRM server and might not be as amenable thereto.

At step 418, the content protection application 302 submits (PU-DRM(K2)) and (K2(rightsdata)) to the DRM server 320 as a rights label for signing. Alternatively, the client itself can sign the rights data in the manner set forth below. If the rights data is being submitted to the server for signing, then, at step 420, the DRM server 320 accesses the rights data and verifies that it can enforce the rights and conditions in the submitted rights label. To verify that it can enforce the rights data, the DRM server 320 applies the private key (PR-DRM) corresponding to (PU-DRM) to (PU-DRM(K2)) to result in (K2), and then applies (K2) to (K2(rightsdata)) to result in the rights data in the clear. The server 320 can then do any policy checks to verify that the users, rights, and conditions specified in the rights data are within any policy enforced by the server 320. The server 320 signs the originally submitted rights label including (PU-DRM(K2)) and (K2(rightsdata)) to result in the signed rights label (SRL) 308, where the signature is based on the private key of the DRM server 320 (PR-DRM), and returns the SRL 308 back to the API 306, which then presents the returned SRL 308 to the client application 302.

The SRL 308 is a digitally signed document, which makes it tamper-resistant. Additionally, the SRL 308 is independent of the actual key type and algorithm used to encrypt the content but maintains the strong 1-1 relation to the content it is protecting. Referring now to FIG. 4A, in one embodiment of the present invention, the SRL 308 may include information on the content that is the basis of the SRL 308, including perhaps an ID of the content; information on the DRM server that signs the SRL 308, including (PU-DRM(K2)) and referral information such as a URL for locating the DRM server on a network and fall-back information if the URL fails; information describing the SRL 308 itself; (K2(rightsdata)): (K2 (CK)); and a digital signature (S(PR-DRM)), among other things.

By ensuring that a trusted entity signs the rights data to create a signed rights label 308, the DRM server 320 is asserting that it will issue licenses for the content in accordance with the terms set forth by the publisher as described in the rights data of the rights label 308. As should be appreciated, a user is required to obtain a license to render the content, especially inasmuch as the license contains the content key (CK). When a user wants to obtain a license for the encrypted content, the user can present a license request including the SRL 308 for the content and a certificate verifying the user's credentials to the DRM server 320 or other license issuing entity. The license issuing entity can then decrypt (PU-DRM(K2)) and (K2(rightsdata)) to produce the rights data, list all the rights granted by the author (if any) to the license requesting entity, and construct a license with only those specific rights.

As set forth above, upon the application 302 receiving the SRL 308, such application 302 concatenates the signed rights label 308 with the corresponding (CK(content)) 304 to form rights managed digital content. Alternatively, the rights data is stored in a known location, with a reference to that location provided with the encrypted digital content. Thus, a rendering application that is DRM-enabled can discover the signed rights label 308 via the piece of content the rendering application is attempting to render. This discovery triggers the rendering application to initiate a license request against the DRM licensing server 320. Publishing application 302 can store a URL to the DRM licensing server 320, for example, or the DRM licensing server 320 can embed its own URL as a piece of metadata into the rights label before digitally signing it, so that the DRM client API 306 called by the rendering application can identify the correct DRM licensing server 320.

Obtaining a License for the Published Content

Figure 5:
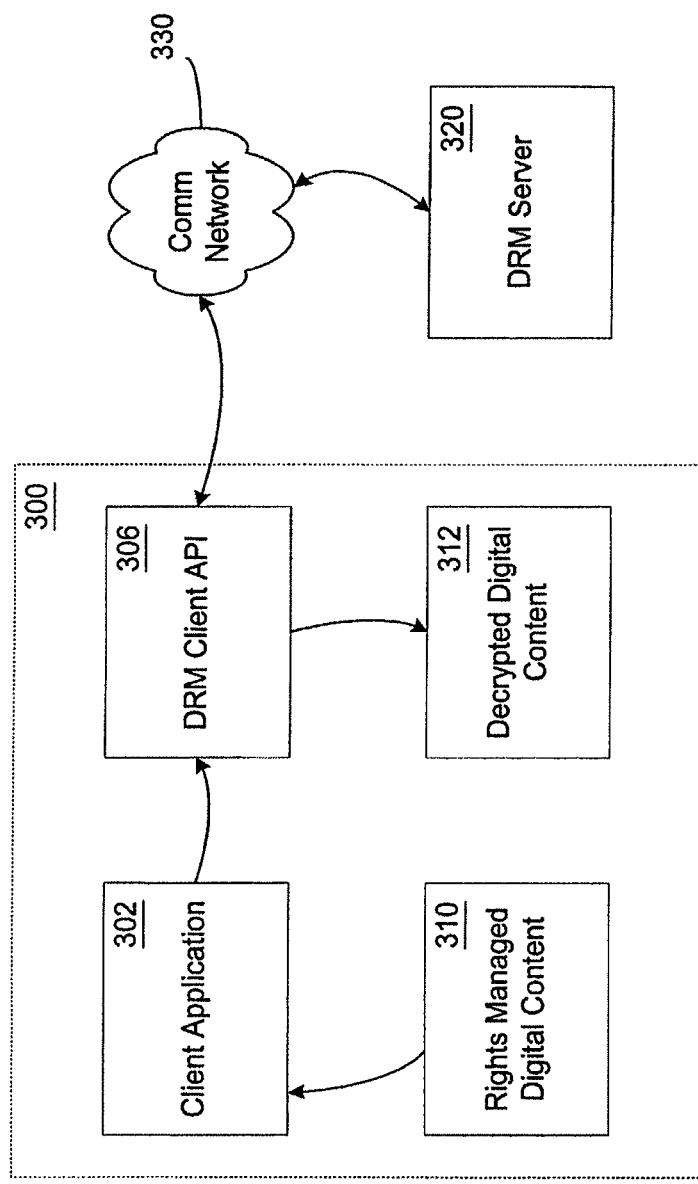
FIG. 5 is a block diagram of a preferred embodiment of a system and method according to the invention for licensing rights managed digital content.

Referring now to FIG. 5, a system and method for licensing rights managed digital content is shown. "Licensing," as that term is used herein, refers to a process that an application or service follows to request and receive a license that will enable an entity named in the license to consume the content in accordance with the terms specified in the license. Inputs to the licensing process can include the signed rights label (SRL) 308 associated with the content for which a license is being requested, and the public key certificate(s) of the entity(s) for which the license is being requested. Note that the entity requesting a license need not necessarily be the entity for which the license is being requested. Typically, a license includes the rights description from the SRL 308, an encrypted key that can decrypt the encrypted content, and a digital signature over the rights description and the encrypted key to assert legitimacy and prevent tampering.

Preliminarily, the client API 306 forwards the signed rights label 308 of the rights managed content 310 to the DRM server 320 via the communication network 330. As described above, the rights label 308 contains the content key (CK) encrypted according to the public key of the DRM server 320 (PU-DRM) (i.e., (PU-DRM(CK))). In the process of issuing a license, then, the DRM server 320 applies (PR-DRM) to (PU-DRM(CK)) to obtain (CK). It then uses the public key (PU-ENTITY) in the public key certificate that is passed up in the license request to re-encrypt (CK) (i.e., (PU-ENTITY (CK))). The newly encrypted (PU-ENTITY(CK)) is then placed into the license. Thus, the license can be returned to the caller without risk of exposing (CK), since only the holder of the private key (PR-ENTITY) corresponding to (PU-ENTITY) can recover (CK) from (PU-ENTITY(CK)). The client API 306 then uses (CK) to decrypt the encrypted content to form decrypted digital content 312. The client application 302 can then use the decrypted digital content 312 according to the rights that are provided in the license.

Alternatively, and as set forth below in more detail, a client such as the publishing client can for example issue a use license to itself to consume the content.

Figure 6A:
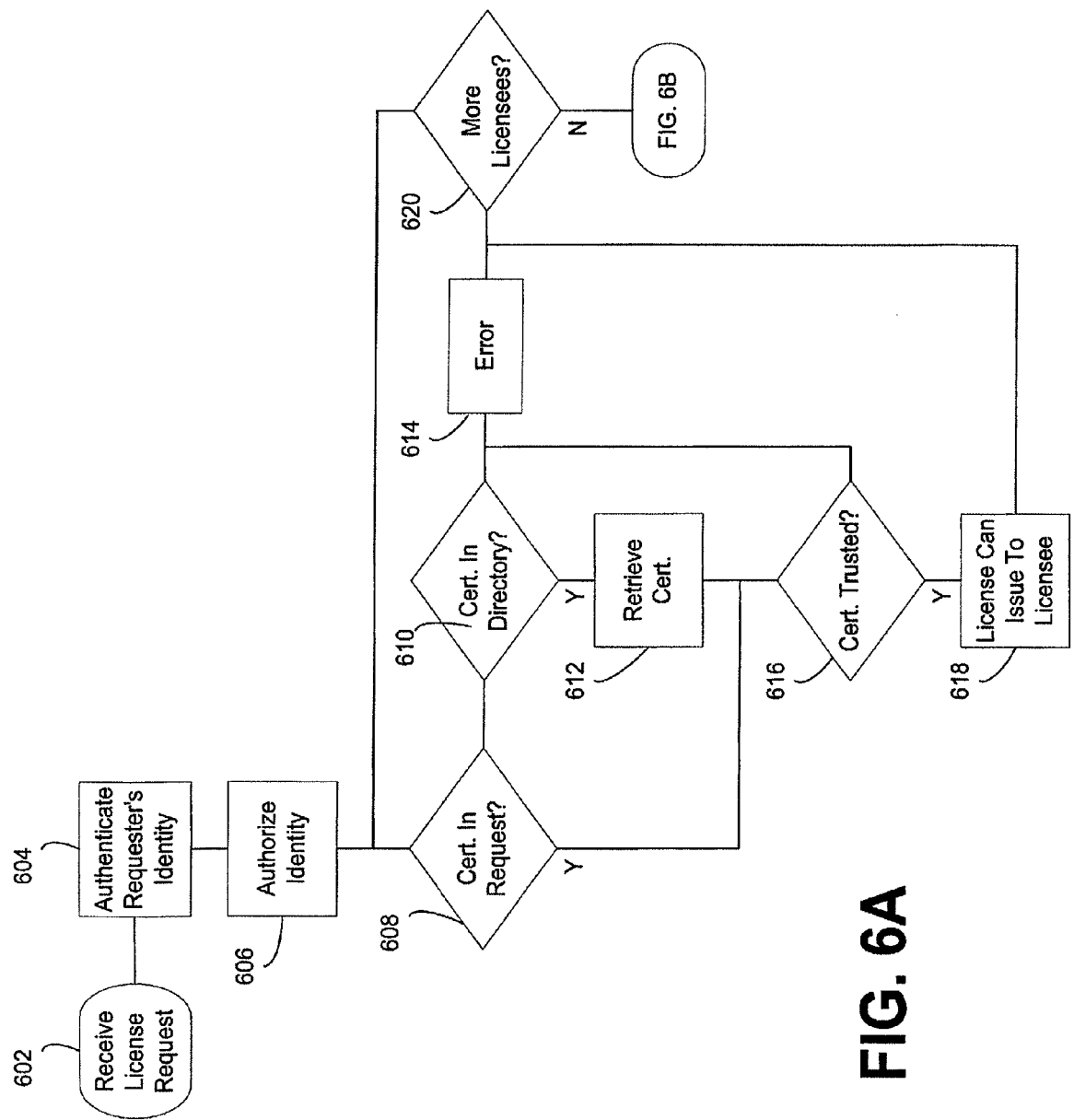
FIGS. 6A and 6B are flowcharts of a preferred embodiment of a method according to the invention for licensing rights managed digital content.
Figure 6B:
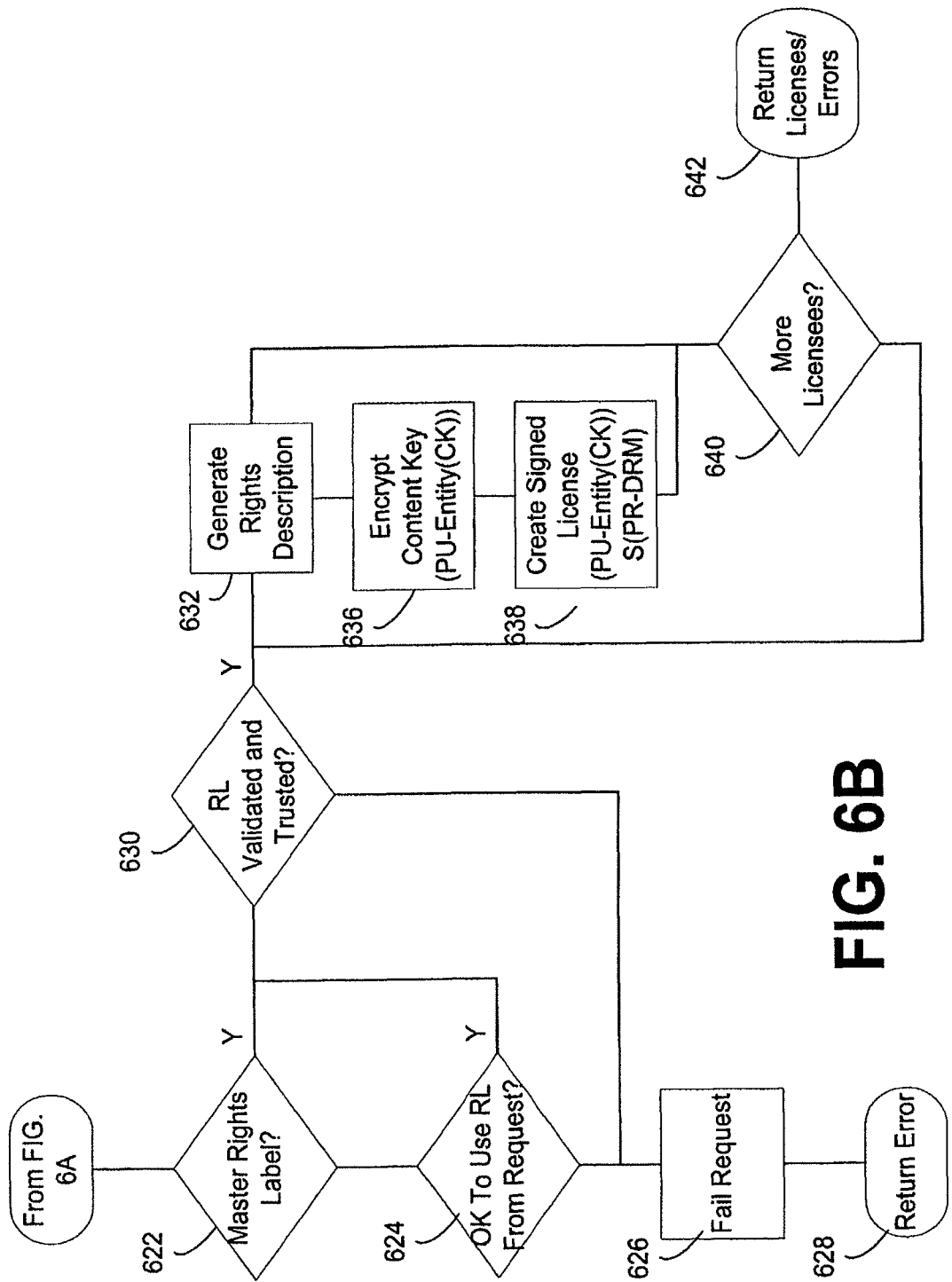

Turning now to FIGS. 6A and 6B, a method for licensing rights managed digital content is shown. At step 602, a license issuing entity such as a DRM server 320 receives a license request including either a public key certificate or an identity for each of one or more requested licensees. Presumably, if am identity is specified, the DRM server 320 can procure a corresponding public key certificate from a directory, a database, or the like. If a license is requested for only one licensee, only one certificate or identity is named. If a license is requested for a plurality of licensees, a certificate or an identity can be named for each potential licensee. At step 604, the requesting entity (i.e., the entity making the license request) is authenticated, if desired. At step 606, it is determined whether the entity is allowed to request a license, again if desired.

If, at step 608, the issuing entity determines that the public key certificate is not included in the license request, then the issuing entity uses the specified identity to perform a lookup in a directory service or database for the appropriate public key certificate. If, at step 610, the issuing entity determines that the certificate is in the directory, then, at step 612, the certificate is retrieved. If a certificate cannot be found for a given potential licensee, either in the request or in the directory, then the license server does not generate a license for that potential licensee and, at step 614, an error is returned to the requesting entity.

Assuming the DRM server 320 has a public key certificate for at least one potential licensee, then, at step 616, such DRM server 320 validates the trust of each licensee certificate. If not validated, the DRM server 320 determines that the issuer of the licensee certificate is not in the list of trusted issuers, then the request fails for that licensee, and an error is generated at step 614. Thus, any potential licensee whose certificate is not issued by a trusted issuer would not receive a license.

Additionally, the DRM server 320 preferably performs digital signature validation on all entities in the certificate chain going from the trusted issuer certificates to the individual licensee public key certificates. The process of validating the digital signatures in a chain is a well-known algorithm. If the public key certificate for a given potential licensee does not validate, or a certificate in the chain does not validate, the potential licensee is not trusted, and a license, therefore, is not issued to that potential licensee. Otherwise, at step 618, a license can issue. The process repeats at step 620 until all entities for which a license has been requested have been processed.

As shown in FIG. 6B, the DRM server 320 proceeds to validate the signed rights label 308 that is received in the license request. In one embodiment, the DRM server 320 has a master copy of every rights label signed thereby. At license time (at step 622), then, the DRM server 320 may retrieve a copy of the master rights label. The master rights label could be more up to date than the copy of the rights label sent in the license request, and therefore will be the rights label employed to produce the requested license. If no master rights label is found the DRM server 320, at step 624, determine according to pre-defined policy whether to issue a license based on the rights label in the request. If the policy does not allow, the license request fails at step 626, and an error is returned to the API 306 at step 628.

At step 630, the DRM server 320 validates the SRL 308 and specifically the digital signature thereof. If the SRL 308 does not validate, the license request fails at step 626, and an error is returned to the API 306 at step 628.

After all the validations have occurred, the DRM server constructs a license for each approved license based on the SRL 308. At step 632, the DRM server 320 generates a respective rights description for the license to be issued to each licensee. For each licensee, the DRM server 320 evaluates the identity named in the public key certificate of that licensee against the identities named in the rights description in the rights label. At step 636, the DRM server 320 obtains (PU-DRM(K2)) and (K2(CK)) from the SRL 308 and applies (PR-DRM) to obtain (CK). The issuing entity then re-encrypts (CK) using (PU-ENTITY) from the licensee's public key certificate to result in (PU-ENTITY(CK)). At step 638, the DRM server 320 concatenates the generated rights description with (PU-ENTITY(CK)) and digitally signs the resulting data structure using (PR-DRM) (i.e., S (PR-DRM)). The signed data structure is thus the license for this particular licensee.

At step 640, the DRM server 320 determines that there are no more licenses to generate for the particular request. The generated licenses are then returned to the requesting entity, at step 642, along with an appropriate certificate chain that ties the licenses back to a trusted authority.

Self-Publishing the Signed Rights Label 308

In one embodiment of the present invention, the SRL 308 may be signed by the requesting/publishing user itself. Accordingly, such user need not contact the DRM server 320 to obtain an SRL 308 for an associated piece of content. As a result, self-publishing may also be referred to as off-line publishing. In such embodiment, the publishing user should also be able to issue itself a publisher license, especially inasmuch as the self-published content is now DRM-protected and such a publisher license is required to allow the publishing user to render the now-protected content. It should also be understood that a publishing user may be enabled to issue licenses to other users.

Figure 7:
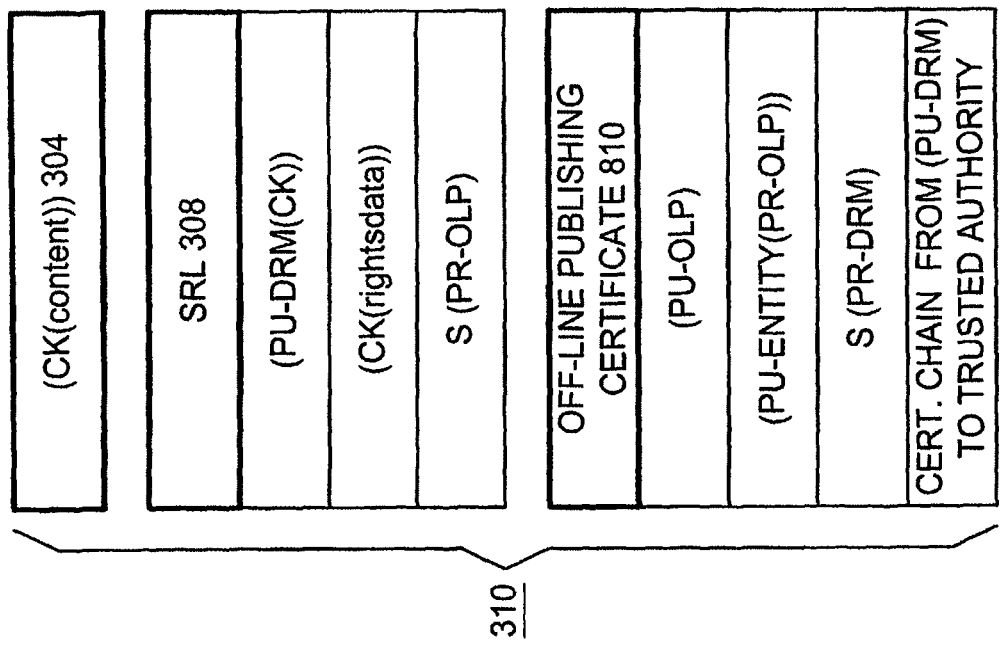
FIG. 7 is a block diagram showing a certificate issued by a DRM server to a user to allow the user to perform off-line publishing in accordance with one embodiment of the present invention.

In particular, and referring now to FIG. 7, in the embodiment, an off-line publishing user is first provisioned to off-line publish by receiving from a DRM server 320 an off-line publishing (OLP) certificate 810 including a public key (PU-OLP) and a corresponding private key (PR-OLP) encrypted according to a public key directly or indirectly accessible to the trusted component 18 (FIG. 11) of the user (PU-ENTITY) to result in (PU-ENTITY(PR-CERT)). Note that (PU-ENTITY) may for example be the public key of the trusted component 18, or may be a public key of the user which is accessible by way of the public key of the trusted component 18. The OLP certificate 810 should be signed by the private key of the DRM server 320 (PR-DRM) so that such DRM server 320 can verify such OLP certificate, as will be discussed in more detail below.

In addition, the OLP certificate 810 should include a certificate chain from (PU-DRM) back to a trusted authority that is trusted by the trusted component 18 of the publishing user or of another user so that such trusted component 18 can verify such OLP certificate 810 and any other certificate or license that is associated with such OLP certificate 810, as will be discussed below. Briefly, and as should be understood, a chain of certificates begins with a root certificate signed by the private key of a trusted authority and having the public key of the next certificate in the chain. Each intermediate certificate in the chain, then, is signed by the private key corresponding to the public key of the previous certificate in the chain, and has the public key of the next certificate in the chain. Finally, the certificate or license to which the chain is attached is signed by the private key corresponding to the public key of the last certificate in the chain.

Thus, to verify the certificate or license to which the chain is attached, knowledge of the public key corresponding to the private key of the trusted authority is gained, and such public key of the trusted authority is employed to verify the signature of the root certificate in the chain. Presuming the root certificate signature verifies, then, the public key from the root certificate is obtained and employed to verify the signature of the first intermediate certificate in the chain. The process repeats serially through the chain until every signature thereof is verified, and then the public key from the last intermediate certificate in the chain is obtained and employed to verify the signature of the certificate or license to which the chain is attached.

As should be appreciated, the OLP certificate 810 creates a link in the chain of trust between content 304 that is to be published off-line and the DRM server 320 that will issue a license for the content 304. The OLP certificate 810 may be created based on an XML/XrML language or any other appropriate language.

As should also be appreciated, the OLP certificate 810 and attached certificate chain authorizes the publishing user to self-publish. As may further be appreciated, the key pair (PU-OLP, PR-OLP) are separate from (PU-ENTITY, PR-ENTITY), and are employed specifically for self-publishing. Note that the key pair (PU-OLP, PR-OLP) may be dispensed with, in which case the DRM certificate 810 includes only the public key of the user (PU-ENTITY) and is signed by the private key of the DRM server 320 (PR-DRM) so that such DRM server 320 can verify same.

Self-publishing differs from publishing as shown in FIG. 4 in that the user essentially takes the place of the DRM server 320 with regard to steps performed thereby. Significantly, the user signs the submitted rights label including (PU-DRM (K2)) and (K2(rightsdata)) or including (PU-DRM(CK)) and (CK(rightsdata)) (the latter being shown in FIGS. 7 and 8) with (PR-OLP) as obtained from the DRM certificate 810 (i.e., S (PR-OLP)) to result in the signed rights label (SRL) 308. The trusted component 18 client in using the OLP certificate 810 typically verifies same based on the attached certificate chain. As should be appreciated, the trusted component 18 of the user obtains (PR-OLP) from the OLP certificate 810 by obtaining (PU-ENTITY(PR-OLP)) from such OLP certificate 810 and applying (PR-ENTITY) thereto. Note, though, that the publishing user cannot verify that the DRM server 320 can enforce the rights in a self-published SRL 308. Accordingly, the DRM server 320 itself should perform the verification at the time a license is requested based on the self-published SRL 308.

Once the publishing user self-publishes the SRL 308, the user concatenates such self-published SRL 308 and the OLP certificate 810 employed to produce same to the content 304, and such content 304 with SRL 308 and DRM certificate 810 is distributed as the rights managed content 310 to another user. Thereafter, the other user requests and obtains a license for the content 304/310 from the DRM server 320 in substantially the same manner as shown in FIGS. 6A and 6B. Here, though, the license-requesting user submits to the DRM server 320 both the self-published SRL 308 and the OLP certificate 810 as concatenated to the content 304. The DRM server 320 then verifies S (PR-DRM) in the OLP certificate 810 based on the corresponding (PU-DRM), and obtains (PU-OLP) from the DRM certificate 810. The DRM server 320 then verifies S (PR-OLP) in the SRL 308 based on the obtained (PU-CERT), and continues as before. Note, though, that since the publishing user did not verify that the DRM server 320 can enforce the rights in the SRL 308, and as was set forth above, the DRM server 320 itself should perform the verification at this time.

Note, too, that the DRM server 320 need only verify S (PR-DRM) in the OLP certificate 810, since presumably it trusts itself. Accordingly, the associated certificate chain from the OLP certificate 810 need not necessarily be sent to the DRM server 320 along with such OLP certificate 810, unless of course the chain is otherwise necessary, such as for example if the chain itself is at least partially the basis for S (PR-DRM).

Importantly, though, the publishing user ought to be able to render the now-protected content 304/310 without having to go to the DRM server 320 for a license. Put another way, a publishing user that off-line publishes content 304/310 without going to the DRM server 320 based on an OLP certificate 810 ought to be able to also issue itself a license in an off-line manner without going to the DRM server 320 so that such user can render the off-line published content 304/310. Accordingly, a publishing user can continue to work with self-published content 310 without any connectivity to a DRM server 320.

Figure 8:
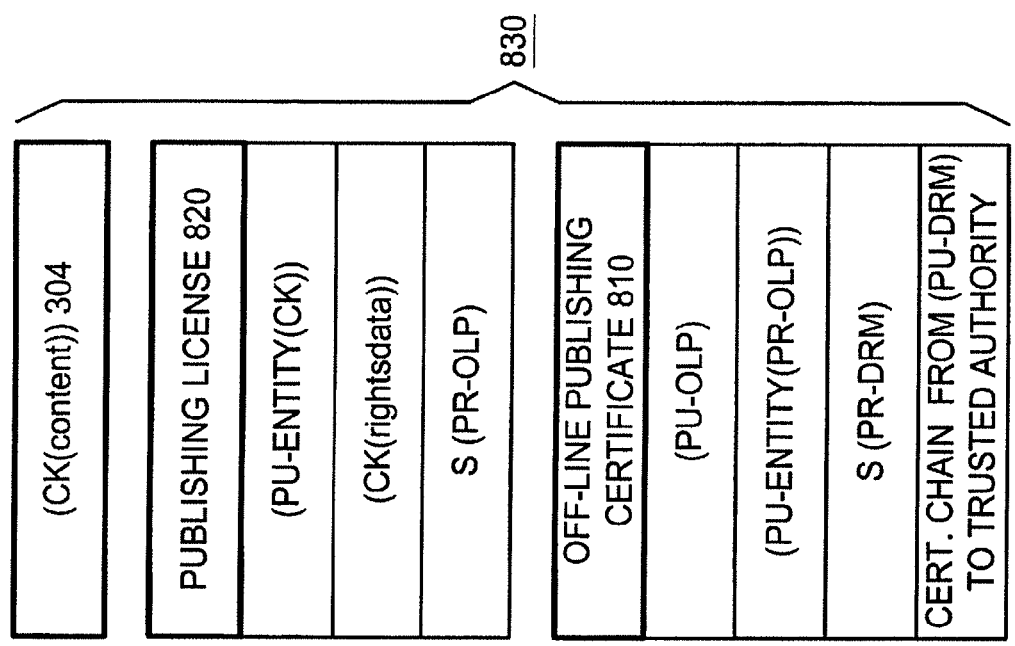
FIG. 8 is a block diagram showing the certificate of FIG. 7 along with a publisher license that allows a publishing user to render content off-line published thereby in accordance with one embodiment of the present invention.

In one embodiment of the present invention, then, and turning now to FIG. 8, a publishing user issues itself an off-line publisher license 820 signed by (PR-OLP) and based on the self-published SRL 308, and including the OLP certificate 810 and certificate chain thereof. Presumably, the publisher license 820 grants the publishing user full access to the self-published content 310, although a lesser amount of access could also be granted. The publisher license 820 may be written in an XML/XrML language or another language, as is the case with other DRM licenses. As should be appreciated, the publisher license 820 includes the content key (CK) encrypted according to (PU-ENTITY), which may be obtained by the trusted component 18 of the user's computing device 14, to form (PU-ENTITY(CK)).

The chain for the publisher license 820 thus goes from such license 820 to the OLP certificate 810 and then back to a root certificate from a trusted authority, perhaps by way of one or more intermediate certificates. Since the trusted component 18 of the user presumably can gain the public key corresponding to the private key of the trusted authority that was employed to sign the root certificate, the trusted component 18 can itself verify the publisher license 820 by way of the certificate chain thereof, and upon verification can then obtain (PU-ENTITY(CK)) therefrom, apply (PR-ENTITY) thereto to obtain (CK), and apply (CK) to (CK(content)) to result in the content 304 for purposes of rendering thereof. As a result, the publishing user can continue to work with content 310 off-line published thereby while remaining offline.

Figure 9:
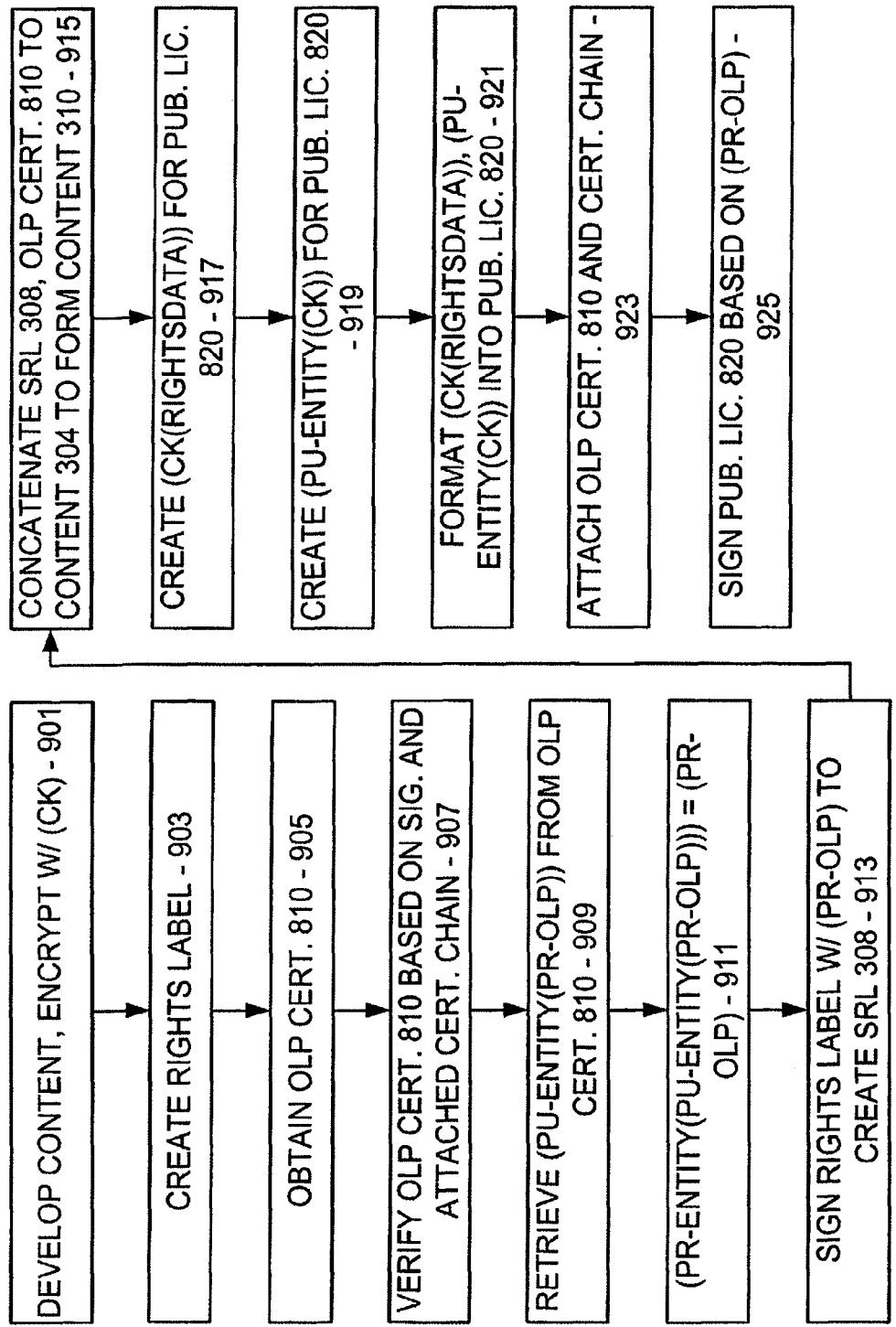
FIG. 9 is a flow chart showing key steps performed by the publishing user to obtain the publishing license of FIG. 8 in accordance with one embodiment of the present invention.

In accordance with the above, then, and referring now to FIG. 9, a publishing user off-line publishes content 304/310 and issues itself an off-line publisher license 820 for such content 304/310 in the following manner.

Preliminarily, and as should be appreciated, the content 304 is developed in an appropriate manner and encrypted according to a content key (CK) (step 901), and the publishing user creates a rights label for the content 304 with appropriate information {(PU-DRM(CK)) and (CK(rightsdata)), e.g.} (step 903). Thereafter, the publishing user, which presumably is already in possession of an OLP certificate 810 from the DRM server 320, obtains such OLP certificate 810 (step 905) and verifies same based on the signature thereof and the chain of certificates that lead back to the root authority (step 907). As should be appreciated, such verification is actually performed by a trusted component 18 on a computing device 14 of the publishing user. Assuming the verification is successful, then, the publishing user/trusted component 18 (hereinafter 'the publishing user') retrieves (PU-ENTITY(PR-OLP)) from the OLP certificate 810 step 909), applies (PR-ENTITY) to (PU-ENTITY(PR-OLP)) to obtain (PR-OLP) (step 911), and then signs the created rights label with such (PR-OLP) to create an SRL 308 (step 913).

Thereafter, the publishing user concatenates such SRL 308 and the OLP certificate 810 employed to produce same to the content 304 to form the self-published content 310 (step 915), and such rights managed content 310 is therefore able to be distributed to another user. For the publishing user to continue using or rendering the content 310, however, such publishing user must issue itself a corresponding off-line publisher license 820.

Thus, the publishing user creates a publisher license 820 by defining appropriate rights data for itself and encrypting same according to the content key (CK) to result in (CK(rightsdata)) (step 917). Note here that such rights data may be obtained from the SRL 308 from the content 310, may be some default set of rights data granting the publishing user partial or full access to the self-published content 310, or may be derived from another source. In addition, the publishing user encrypts the content key (CK) according to (PU-ENTITY) to form (PU-ENTITY(CK)) (step 919). Such (CK(rightsdata)) and (PU-ENTITY(CK)) are then formatted into the publisher license 820 (step 921), the OLP certificate 810 and chain of certificates thereof is attached (step 923) and such publisher license 820 is signed based on (PR-OLP) as was obtained in step 911 (step 925). Note here that the content 304 (i.e., (CK(content))), the publishing license 820, and the OLP certificate in combination form a chain 830 of digital items back to the trusted authority.

Figure 10:
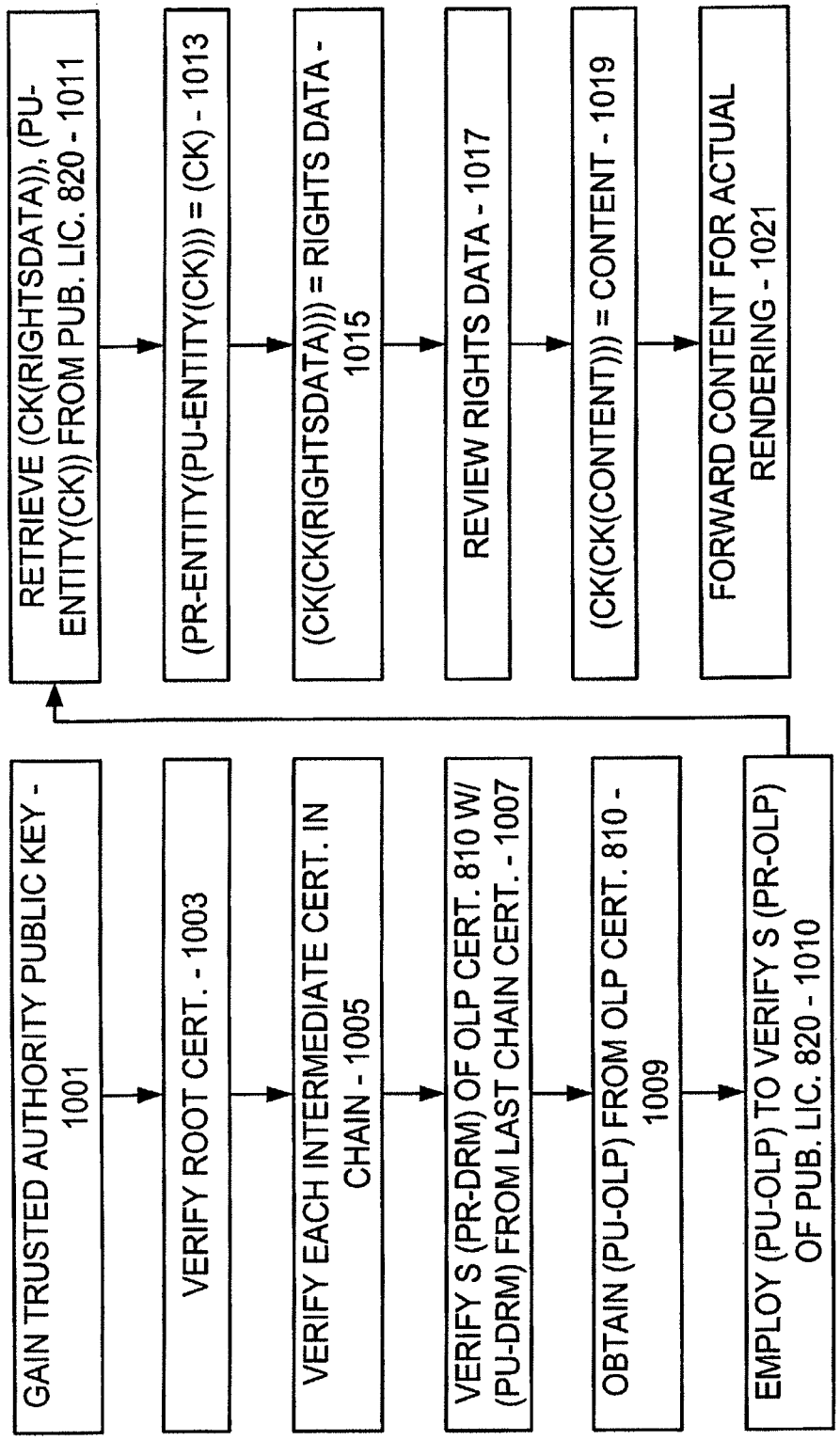
FIG. 10 is a flow chart showing key steps performed by the publishing user to employ the obtained publishing license of FIG. 9 to render the corresponding content in accordance with one embodiment of the present invention.

For the publishing user to render the published content 310, then, and turning now to FIG. 10, such publishing user need not contact the DRM server 320, but instead gains the public key corresponding to the private key of the trusted authority that was employed to sign the root certificate (step 1001), verifies the root certificate (step 1003), and then verifies each intermediate certificate in the chain (step 1005) by, for each such intermediate certificate, obtaining the public key from the previous certificate and employing same to verify the signature of such certificate. Thereafter, (PU-DRM) from the last certificate in the chain is employed to verify the signature of the OLP certificate 810 (i.e., S (PR-DRM)) (step 1007), (PU-OLP) is obtained from the OLP certificate 810 (step 1009), and such (PU-OLP) is employed to verify the signature of the publisher license 820 (i.e., S (PR-OLP)) (step 1010).

Once the publisher license 820 is verified, then, (CK (rightsdata)) and (PU-ENTITY(CK)) are retrieved from same (step 1011), (PR-ENTITY) is applied to (PU-ENTITY(CK)) to result in (CK) (step 1013), and (CK) is applied to (CK (rightsdata)) to result in the rights data (step 1015). As should now be appreciated, the rights data is reviewed by the trusted component 18 of the computing device 14 of the publishing user to determine that such rights data allows rendering in the manner sought (step 1017), such trusted component 18 thus applies (CK) to (CK(content)) from the content 310 to result in the content (step 1019), and such content is then forwarded to an appropriate rendering application for actual rendering (step 1021). Thus, the steps of FIG. 10 in effect traverse the chain 830 of digital items from the trusted authority to the content 304.

Note that the trusted component 18 could conceivably apply (CK) to (CK(content)) to result in the content without first reviewing the rights data and regardless of what the rights data may allow or disallow, but is trusted and has been constructed to in fact produce the content only after reviewing the rights data and satisfying itself that the rights data allows the rendering of such content. Once again, as a result of having the publisher license 820, the publishing user can continue to work with content 310 off-line published thereby while remaining offline inasmuch as the DRM server 320 need not be contacted.

Enrollment and Sub-Enrollment of DRM Servers

In the architecture as seen in FIG. 3, only a single DRM server 320 is shown. However, and as may be appreciated, such architecture can and likely does include multiple DRM servers 320. In particular, and in one embodiment of the present invention, such architecture includes a distributed network of DRM servers 320. Each of such DRM servers 320 may have any particular function and all of the DRM servers 320 may be organized in any appropriate manner without departing from the spirit and scope of the present invention.

Figure 12:
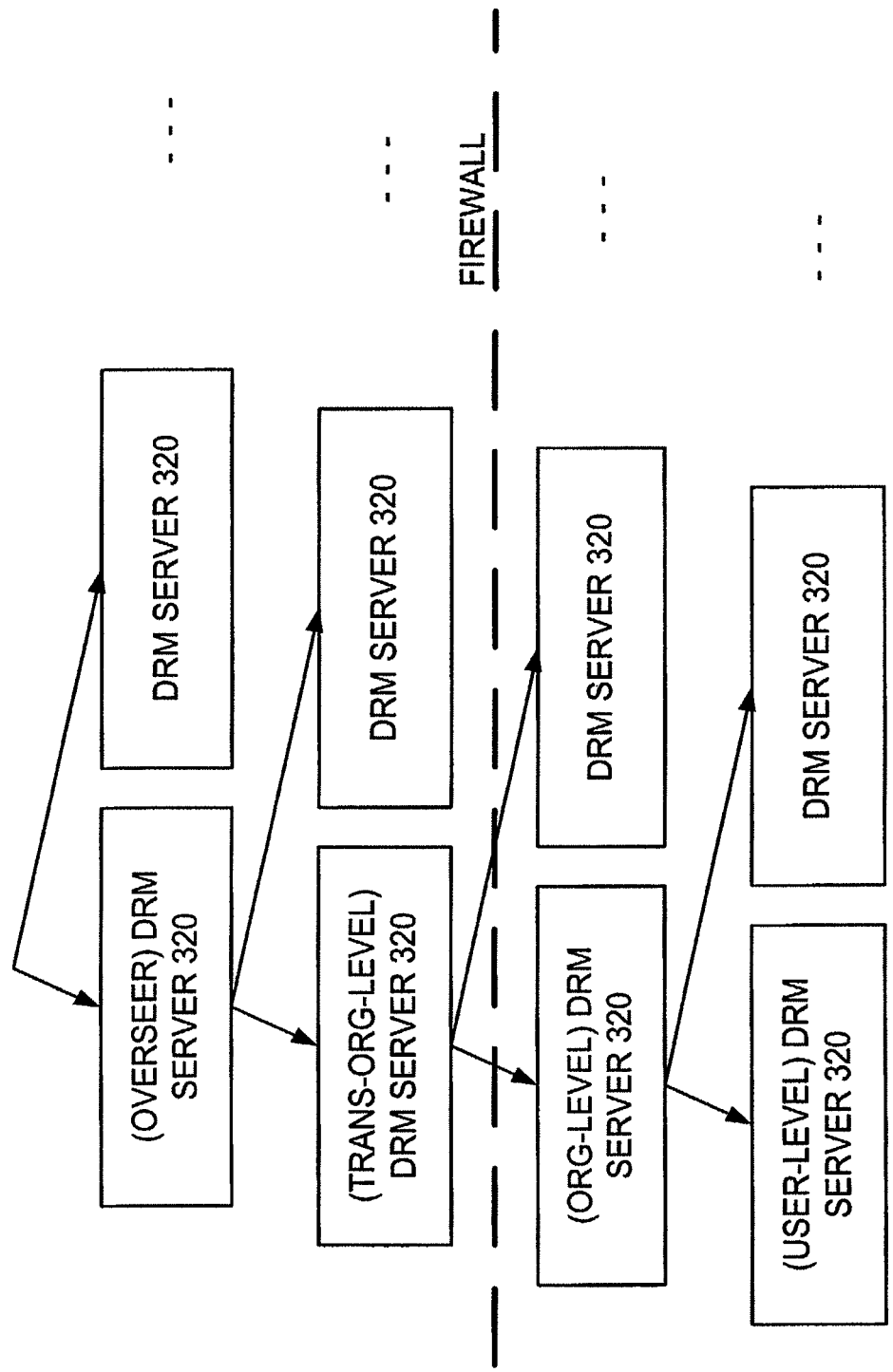
FIG. 12 is a block diagram showing a plurality of DRM servers such as may exist in the architecture of the present invention, where each (entering) DRM server is enrolled or sub-enrolled into the architecture by another (enrolling) DRM server issuing same an enrollment certificate.

For example, and turning now to FIG. 12, a particular organization may have one or more user-level DRM servers 320 for the purpose of signing rights labels to produce SRLs 308, issuing licenses 16, granting publishing licenses 320, issuing certificates to users, issuing certificates to computing devices 14, and the like. Each such user-level DRM server 320 may be geographically assigned or may be assigned based on function or load, for example. Likewise, to oversee multiple user-level DRM servers 320, an organization may have one or more management DRM servers 320. Such organization-based DRM servers 320 may be located behind an organization firewall if so desired.

In addition to organization-based DRM servers 320, there may also be trans-organization DRM servers 320 that facilitate inter-organization DRM functionality. For example, such trans-organization DRM servers 320 may allow a pair of organizations to share certain DRM content 12. Also, there may be a network of overseer DRM servers 320 that enable all other DRM servers 320. For example, such overseer DRM servers 320 may oversee and maintain all other DRM servers 320 and provide appropriate linkage for all other DRM servers 320 back to the root or trusted authority that is the basis for the chain of certificates set forth previously. Such non-organization-based DRM servers 320 are likely not located behind any organization firewall.

Critically, each DRM server 320 in the architecture of FIG. 12 must be able to prove that it is to be trusted. Thus, and as should now be appreciated from the above chain of certificates discussion, each DRM server 320 upon entering the architecture is provided with an enrollment certificate 1310, as is seen from FIG. 13. Significantly, and in one embodiment of the present invention, the enrollment certificate 1310 is provided to the entering DRM server 320 (hereinafter "the DRM-E server 320") by another 'enrolling' DRM server 320 already in the architecture (hereinafter "the DRM-R server 320"). Also significantly, attached to the provided enrollment certificate 1310 from the enrolling DRM-R server 320 is a chain of certificates 1320 including the enrollment certificate 1310 of the enrolling DRM server 320, the enrollment certificate 1310 of the DRM server 320 that enrolled the enrolling DRM-R server 320, and so on all the way back to a root DRM server 320. Such root DRM server 320 may represent the root or trusted authority, or the chain of certificates 1320 may extend beyond to reach the root or trusted authority. As should now be appreciated, such enrollment certificate 1310 and the chain of certificates 1320 in combination form the chain of certificates that are attached to an OLP certificate 810 provided by an enrolled or entered DRM-E server 320 to a publishing user, such as that shown in FIG. 8.

In one embodiment of the present invention, the enrollment certificate 1310 provided to a DRM-E server 320 by a DRM-R server 320 is in a form such as an XrML 1.2 based certificate. As may be appreciated, such type of certificate 1310 is not independently proffered by any third party, and thus such type of certificate 1310 does not represent any sort of independent vouching by a third party for the holder of such certificate 1310.

In one embodiment of the present invention, the method with which a particular DRM-E server 320 is enrolled into the architecture depends on whether the enrolling DRM-R server 320 knows or has reason to trust the entering DRM-E server 320. If not, the DRM-E server 320 should be required to prove to the DRM-R server 320 that it is trustworthy and will enforce the DRM architecture. If so, the DRM-E server 320 should not be required to prove to the DRM-R server 320 that it is trustworthy, at least not to the same degree. Thus, a non-trusting/non-knowing DRM-R server 320 'enrolls' a DRM-E server 320, while a knowing/trusting DRM-R server 320 'sub-enrolls' a DRM-E server 320.

Typically, a DRM-R server 320 knows/trusts a DRM-E server 320 if both are operated by or for the benefit of the same organization, although knowledge/trust may also arise from other situations without departing from the spirit and scope of the present invention. Thus, the method with which a particular DRM-E server 320 is enrolled into the architecture typically depends on whether the enrolling DRM-R server 320 is organizationally based or non-organizationally based. As a result, a non-organizationally based DRM-R server 320 'enrolls' a DRM-E server 320, while an organizationally based DRM-R server 320 'sub-enrolls' a DRM-E server 320.

Enrollment

Figure 14:
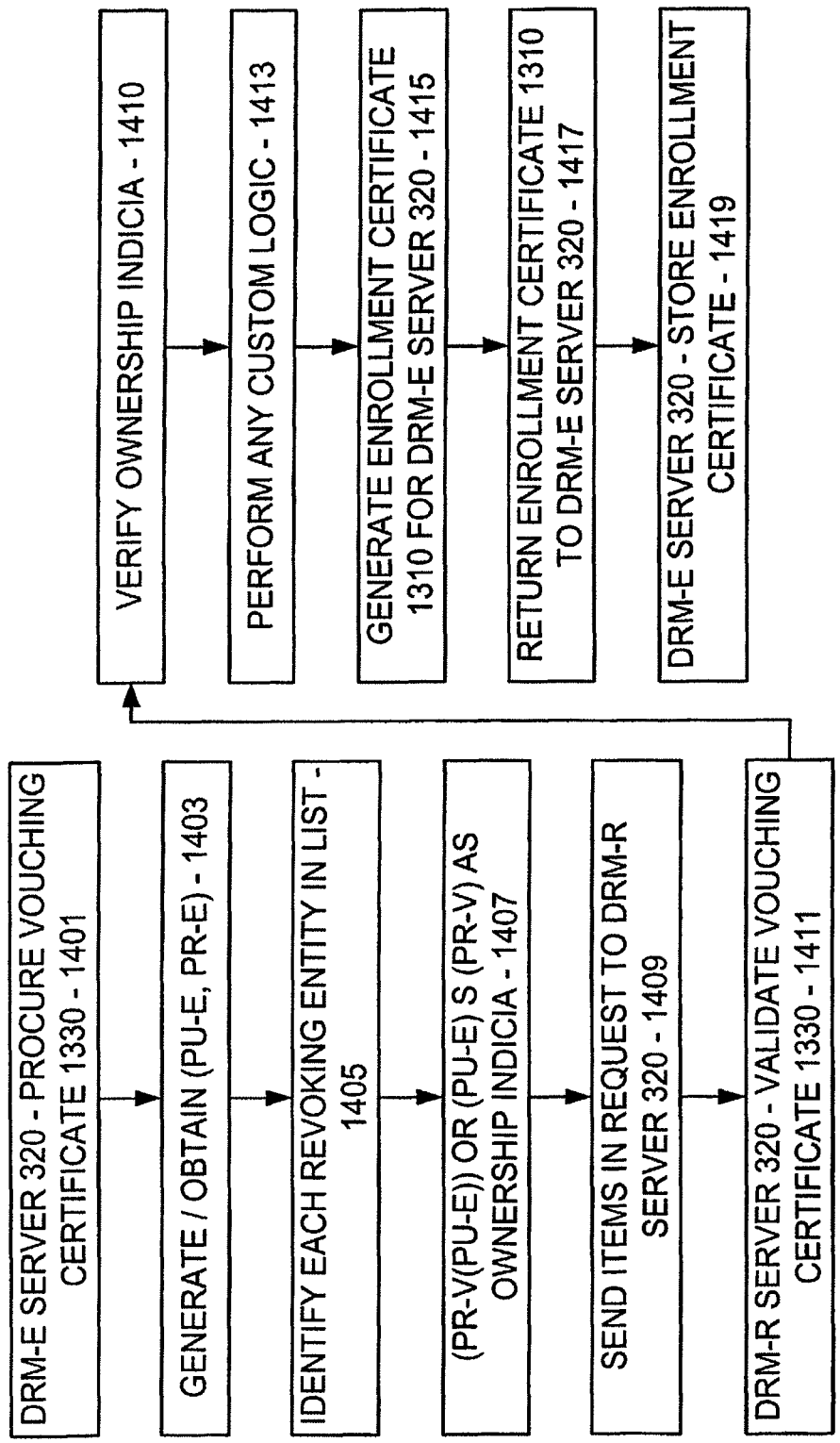
FIGS. 14 and 15 are flow diagrams showing key steps performed by the enrolling and entering DRM servers of FIGS. 13 and 14 to enroll (FIG. 14) or sub-enroll (FIG. 15) the entering DRM server.

In one embodiment of the present invention, and turning now to FIG. 14, a non-knowing/non-trusting DRM-R server 320 enrolls a DRM-E server 320 in the following manner.

Preliminary, it is to be appreciated that the DRM-E server 320 wishing to be enrolled by the non-knowing/non-trusting DRM-R server 320 is likely not known to such DRM-R server 320. Accordingly, and in one embodiment of the present invention, the DRM-E server 320 must procure a vouching certificate 1330 from a third party willing to vouch for such DRM-E server 320 (step 1401). Typically, such third party is an independent certificate-issuing agent that is trusted by the DRM-R server 320 to perform such vouching, such as for example VERISIGN Corporation of Mountain view, Calif. Such vouching certificate 1330 may for example be in a form such as an X.509 certificate. Note that in the DRM-R server 320 relying on the trusted third party to vouch for the DRM-E server 320, the liability of such DRM-R server 320 for any bad acts of the DRM-E server 320 is mitigated.

Figure 13:
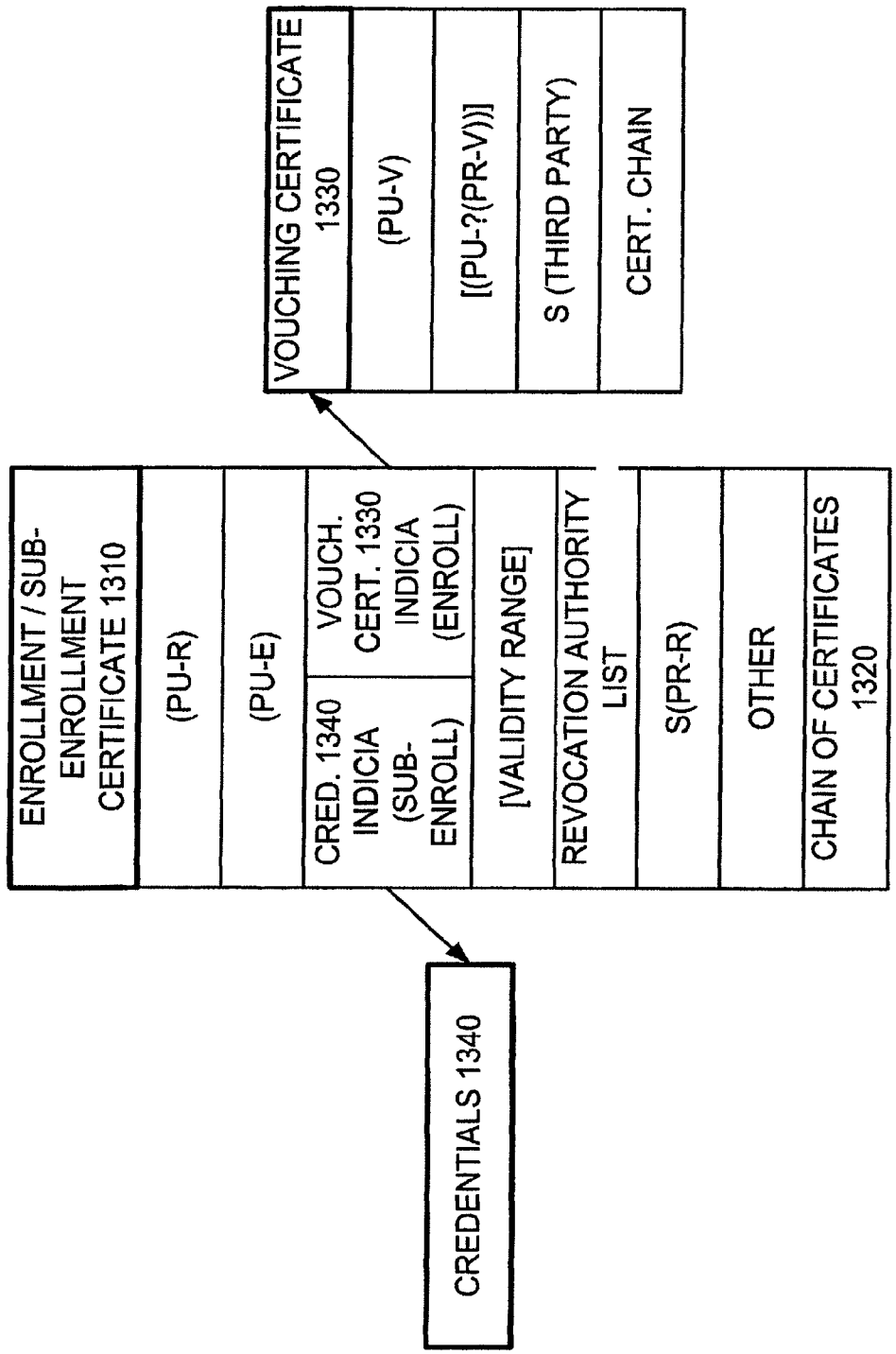
FIG. 13 is a block diagram showing the enrollment certificate of FIG. 12 along with a vouching certificate presented in at least some instances by an entering DRM server to an enrolling DRM server.

As should be appreciated and as is typical, and as is also seen in FIG. 13, the vouching certificate 1330 incorporates therein a public key (PU-V) and a corresponding private key (PR-V), is signed by the trusted third party, and may be accompanied by a chain of certificates leading to a known root for purposes of validation. As is also typical, (PR-V) within the vouching certificate 1330 is protected in a manner accessible to the vouched-for DRM-E server 320 that is the basis of the vouching certificate 1330. For example, and as seen in FIG. 13, (PR-V) could be encrypted according to an appropriate public key.

Within the DRM architecture, the entering DRM-E server 320 must have a unique identity. Here it is to be understood that the DRM identity is likely apart from (PU-V, PR-V), although the DRM identity may also coincide with such (PU-V, PR-V) without departing from the spirit and scope of the present invention. Accordingly, to establish such identity, such DRM-E server 320 generates or obtains a new public/private key pair (PU-E, PR-E) (step 1403). Also, within the DRM architecture, the enrolling DRM-E server 320 should decide which entities can revoke the authority thereof to participate. Accordingly, such DRM-E server 320 identifies each such revoking entity in a list, perhaps by way of a public key thereof (step 1405).

The DRM-E server 320 should be able to establish to the enrolling DRM-R server 320 that such DRM-E server in fact owns the vouching certificate 1330 that was obtained at step 1401. Accordingly, the DRM-E server 320 either employs (PR-V) from the vouching certificate 1330 to encrypt (PU-E) to result in (PR-V(PU-E)) as an ownership indicia, or signs (PU-E) with (PR-V) to result in (PU-E) S (PR-V) as the ownership indicia (step 1407). In either instance, applying (PU-V) to decrypt (PU-E) or verify the signature establishes possession of (PR-V) and therefore the vouching certificate 1330.

Thus far, the DRM-E server 320 has the vouching certificate 1330, (PU-E) and (PR-E), the revocation authority list, and (PR-V(PU-E)) or (PU-E) S (PR-V) as the ownership indicia. To request enrollment, then, such DRM-E server 320 sends the vouching certificate 1330, (PU-E), the revocation authority list, and (PR-V(PU-E)) or (PU-E) S (PR-V) as the ownership indicia to the DRM-R server 320 (step 1409), and the DRM-R server 320 proceeds to enroll such requesting DRM-E server 320. Note that the request or a part thereof may be in the form of a certificate signed by (PR-E).

In particular, the DRM-R server 320 validates the vouching certificate 1330 based on the signature thereof by the trusted third party and the chain of certificates leading to the known root (step 1411). Thus, the DRM-R server 320 establishes that the DRM-E server 320 has been vouched for. Also, the DRM-R server 320 verifies the ownership indicia by applying (PU-V) from the request to either decrypt (PU-E) or verify the signature and thus establish possession of (PR-V) and therefore the vouching certificate 1330 in the request (step 1410). In addition, and significantly, the DRM-R server 320 performs any custom logic necessary to decide whether to honor the request (step 1413). Such custom logic may be any appropriate logic without departing from the spirit and scope of the present invention, and may for example include a background check on the DRM-E server 320 and/or its operator, a determination of whether the DRM-E server 320 has a current trusted component 18 and/or operating system or the like, a determination of whether the DRM-E server 320 is on a revocation list or other watch list, and the like.

Assuming the custom logic permits the request to be honored, then, and in one embodiment of the present invention, the DRM-R server 320 generates the enrollment certificate 1310 for the DRM-E server 320 (step 1415). In particular, and as seen in FIG. 13. the DRM-R server 320 incorporates within the enrollment certificate 1310:

an identifier of the DRM-R server 320, such as a public key thereof (PU-R);
an identifier of the DRM-E server 320, such as (PU-E);
identifying indicia from the vouching certificate 1330 including the trusted third party that issued same, a serial number from the vouching certificate 1330, and the issuee as identified within the vouching certificate 1330;

any validity range information specifying a range during which the enrollment certificate 1310 is valid, such as for example a date range;

the revocation authority list;

a signature based on a private key of the DRM-R server 320 (PR-R) corresponding to (PU-R);

and any other appropriate information.

Such other appropriate information may include but is not limited to: the time the certificate was issued; an indication of what sort of DRM activities an enrolled server is allowed to perform such as for example all activities, account activation only, sign rights labels only, issue content licenses only, and combinations thereof; and an allowed time-range for performing DRM activities. Note that the allowed time-range is different from the validity range in that the current time must lie within the validity range to honor any certificate that includes the enrollment certificate 1310 in the certificate chain. In contrast, the issued time of child certificates must fall within allowed time-range of the parent certificate to perform DRM activities.

As should be appreciated, in generating the enrollment certificate 1310, the DRM-R server 320 may initially generate certificate information and then allow custom logic to generate additional information or modify existing information. Such custom logic may for example ensure that the DRM-R server 320 includes appropriate information, or may enforce pre-defined DRM architecture policy. Of course, the signature of the enrollment certificate 1310 is created after any such custom logic is performed. As should also be appreciated, the DRM-R server 320 attaches the chain of certificates 1320 that leads back to the trusted root authority to the generated enrollment certificate 1310 so that the generated enrollment certificate 1310 may be validated based on such chain of certificates 1320.

Note in particular that the identifying indicia from the vouching certificate 1330 as placed within the enrollment certificate 1310 will always travel with such enrollment certificate 1310 and acts as a bridge to the vouching certificate 1330. Thus, and again, such identifying indicia shows to the world that the DRM-R server 320 is relying on the trusted third party issuer of the vouching certificate 1330 to vouch for the DRM-E server 320, and the liability of such DRM-R server 320 for any bad acts of the DRM-E server 320 is mitigated.

Once the DRM-R server 320 has successfully generated the enrollment certificate 1310 with the attached chain of certificates 1320, the DRM-R server 320 then returns same to the requesting DRM-E server 320 (step 1417), and the now-enrolled DRM-E server 320 stores same in an appropriate location for future use (step 1419). As was alluded to above, (PU-E) in the enrollment certificate 1310 and the corresponding (PR-E) are the public / private key pair that the DRM-E server 320 will use as (PU-DRM) and (PR-DRM) when signing a rights label to produce an SRL 308, issuing an OLP certificate 810, and otherwise participating within the DRM architecture. Accordingly, such enrollment certificate 1310 and the chain of certificates 1320 in combination form the chain of certificates that are attached to such OLP certificate 810 and the like.

Sub-Enrollment

Figure 15:
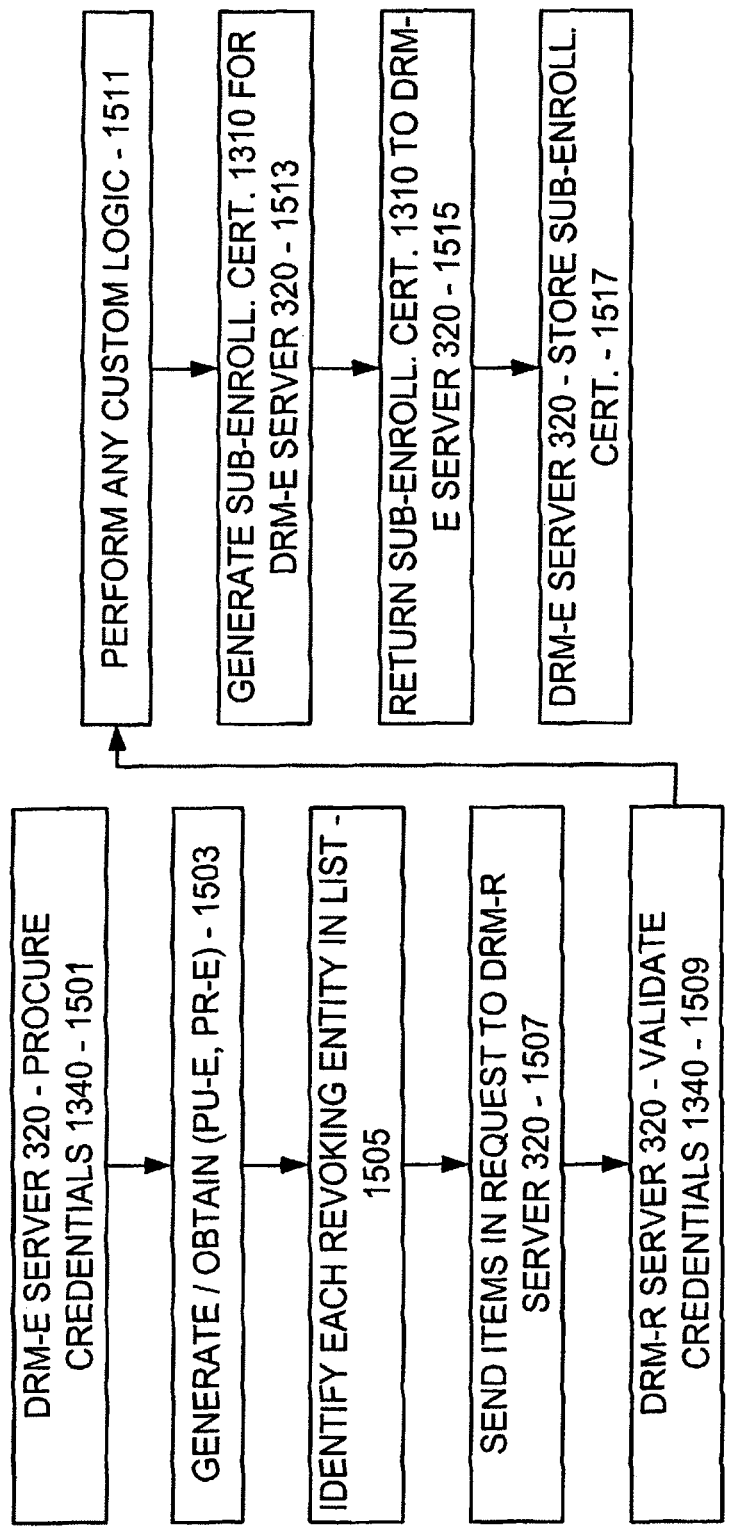

In one embodiment of the present invention, and turning now to FIG. 15, a knowing/trusting DRM-R server 320 sub-enrolls a DRM-E server 320 in the following manner.

Preliminary, it is to be appreciated that the DRM-E server 320 wishing to be sub-enrolled by the knowing/trusting DRM-R server 320 should still be required to identify itself to such DRM-R server 320 inasmuch as such knowledge or trust may not be complete. However, such identification requirement need not rise to the level of a proffer by a trusted third party inasmuch as the DRM-R server 320 does have some knowledge/trust of the DRM-E server. Accordingly, and in one embodiment of the present invention, the DRM-E server 320 obtains or is provided with some sort of credentials 1340 (FIG. 13) that are recognizable by and expected to be honored by the DRM-R server 320, and that identify the DRM-E server 320 to the satisfaction of the DRM-R server 320 (step 1501).

If both the DRM-R and DRM-E servers 320 are within the same organization, such credentials 1340 may be organization-based credentials, such as for example a network ID if both servers 320 are on a common network, a domain ID if both servers 320 share a common domain, or the like. If both the DRM-R and DRM-E servers 320 are not within the same organization, such credentials 1340 may still be a network ID if both servers 320 are on a common network, a domain ID if both servers 320 share a common domain, or the like, or may be other credentials such as for example credentials issued by a third party and recognized by the DRM-R server 320.

Note that in the present situation, the DRM-R server 320 is not relying on a trusted third party to vouch for the DRM-E server 320, and therefore the liability of such DRM-R server 320 for any bad acts of the DRM-E server 320 is not as mitigated. Nevertheless, the DRM-R server 320 is willing to take such a risk based on knowledge of or trust in the DRM-E server 320 to not in fact perform such bad acts.

As before, within the DRM architecture, the entering DRM-E server 320 must have a unique identity. Here it is to be understood that the DRM identity is likely apart from the credentials 1340, although the DRM identity may also coincide with the credentials 1340 without departing from the spirit and scope of the present invention. Accordingly, to establish such identity, such DRM-E server 320 generates or obtains a new public/private key pair (PU-E, PR-E) (step 1503). Also as before, within the DRM architecture, the sub-enrolling DRM-E server 320 should decide which entities can revoke the authority thereof to participate. Accordingly, such DRM-E server 320 identifies each such revoking entity in a list, perhaps by way of a public key thereof (step 1505).

Thus far, the DRM-E server 320 has the credentials 1340, (PU-E) and (PR-E), and the revocation authority list. To request sub-enrollment, then, such DRM-E server 320 sends the credentials 1340, (PU-E), and the revocation authority list to the DRM-R server 320 (step 1507), and the DRM-R server 320 proceeds to sub-enroll such requesting DRM-E server 320. Note that as before, the request or a part thereof may be in the form of a certificate signed by (PR-E).

In particular, the DRM-R server 320 validates the credentials 1340 based on whatever logic or resources are necessary and available to so validate (step 1509). Thus, the DRM-R server 320 establishes based on the validated credentials 1340 that the DRM-E server 320 is to be trusted to honor and obey the DRM architecture. In addition, and as before, the DRM-R server 320 performs any custom logic necessary to decide whether to honor the request (step 1511).

Assuming the custom logic permits the request to be honored, then, and in one embodiment of the present invention, the DRM-R server 320 generates a sub-enrollment certificate 1310 for the DRM-E server 320 (step 1513). In particular, and as seen in FIG. 13. the DRM-R server 320 incorporates within the sub-enrollment certificate 1310:

an identifier of the DRM-R server 320, such as a public key thereof (PU-R);

an identifier of the DRM-E server 320, such as (PU-E);

the credentials 1340 or a reference thereto;

any validity range information specifying a range during which the sub-enrollment certificate 1310 is valid, such as for example a date range;

the revocation authority list;

a signature based on a private key of the DRM-R server 320 (PR-R) corresponding to (PU-R);

and any other appropriate information.

As before, in generating the sub-enrollment certificate 1310, the DRM-R server 320 may initially generate certificate information and then allow custom logic to generate additional information or modify existing information. Again, the signature of the sub-enrollment certificate 1310 is created after any such custom logic is performed. As before, the DRM-R server 320 attaches the chain of certificates 1320 that leads back to the trusted root authority to the generated sub-enrollment certificate 1310 so that the generated sub-enrollment certificate 1310 may be validated based on such chain of certificates 1320.

Note here that the credentials 1340 or reference thereto are not believed to be especially necessary, but may nevertheless be included for completeness. Note too that the sub-enrollment certificate 1310 contains no identifying indicia from a vouching certificate 1330 inasmuch as no vouching certificate was required in the present sub-enrollment scenario.

Once the DRM-R server 320 has successfully generated the sub-enrollment certificate 1310 with the attached chain of certificates 1320, the DRM-R server 320 then returns same to the requesting DRM-E server 320 (step 1515), and the now-sub-enrolled DRM-E server 320 stores same in an appropriate location for future use (step 1517). As before, (PU-E) in the sub-enrollment certificate 1310 and the corresponding (PR-E) are the public/private key pair that the DRM-E server 320 will use as (PU-DRM) and (PR-DRM) when signing a rights label to produce an SRL 308, issuing an OLP certificate 810, and otherwise participating within the DRM architecture. Accordingly, such sub-enrollment certificate 1310 and the chain of certificates 1320 in combination form the chain of certificates that are attached to such OLP certificate 810 and the like.

Conclusion

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the present invention, a digital rights management (DRM) and enforcement architecture and method allow the controlled rendering or playing of arbitrary forms of digital content, where such control is flexible and definable by the content owner/developer of such digital content. The architecture allows and facilitates such controlled rendering, especially in an office or organization environment or the like where documents are to be shared amongst a defined group of individuals or classes of individuals. Such architecture allows content to be published without first gaining approval from a server and allows the publishing individual to issue itself a use license to render the published content without contacting the server for approval.

It should be appreciated that changes could be made to the embodiments described above without departing from the inventive concepts thereof. For example, if a license or rights label is signed based on rights data therein, such rights data need not necessarily be encrypted. Likewise, in requesting and constructing an enrollment or sub-enrollment certificate 1310, the revocation authority list and other similar information need not necessarily be employed. It should be understood, therefore, that this invention is not limited to the particular embodiments disclosed, but it is intended to cover modifications within the spirit and scope of the present invention as defined by the appended claims.

The invention claimed is:

1. A method for acquiring an off-line publishing (OLP) certificate by a first computing device, the OLP certificate issued by a server enrolled in a Digital Rights Management (DRM) system, the method comprising:

requesting, by the first computing device, an OLP certificate from the enrolled server having an enrollment certificate, wherein the enrollment certificate comprises a public key of the enrolled server (PU-DRM) and revocation information;

receiving the OLP certificate from the enrolled server, wherein the OLP certificate comprises a public key (PU-OLP) and a private key (PR-OLP), and wherein the OLP certificate is signed with a private key of the enrolled server (PR-DRM);

encrypting content according to a content key (CK), wherein the content comprises one or more of: audio, video, text, data, and multimedia;

encrypting the content key with the public key of the enrolled server (PU-DRM);

generating rights data defining rules for rendering the encrypted content;

signing the rights data and the encrypted content key with the private key (PR-OLP);

concatenating the signed rights data and the encrypted content key to the encrypted content;

forwarding, by the first computing device without contacting the enrolled server, the encrypted content concatenated with the signed rights data and the encrypted content key to a second computing device; and issuing, by the first computing device without contacting the enrolled server, a use license for accessing the encrypted content by the first computing device, wherein the use license is signed with the private key (PR-OLP).

2. The method as defined in claim 1, further comprising decrypting the encrypted content key using a private key of a publishing user (PR-ENTITY) to obtain a decrypted content key.

3. The method as defined in claim 2, further comprising decrypting the encrypted content using the decrypted content key.

4. The method as defined in claim 1, wherein the revocation information comprises a listing of revoking entities able to revoke authority of the enrolled server to provide DRM services.

5. The method as defined in claim 1, wherein the private key (PR-OLP) of the OLP certificate is encrypted with the public key of a publishing user (PU-ENTITY).

6. The method as defined in claim 1, wherein the enrollment certificate comprises a time-range wherein the enrolled server is authorized to provide DRM services.

7. The method as defined in claim 1, wherein the use license is based on the signed rights data published by the first computing device.

* * * * *